US012700618B1

(12) United States Patent
Turcheniuk et al.

(10) Patent No.: US 12,700,618 B1
(45) Date of Patent: Aug. 4, 2026

(54) ELECTROLYTES FOR LITHIUM-ION BATTERY CELLS WITH VOLUME-CHANGING ANODE PARTICLES

(71) Applicant: Sila Nanotechnologies, Inc., Alameda, CA (US)

(72) Inventors: Kostiantyn Turcheniuk, Oakland, CA (US); William Gent, San Francisco, CA (US); Gleb Yushin, Atlanta, GA (US); Xiujun Yue, Redwood City, CA (US); Viacheslav Iablokov, Alameda, CA (US); Katherine Harry, San Francisco, CA (US); Natasha Teran, San Leandro, CA (US); Judith Kim, San Leandro, CA (US); Fezzeh Pouraghajansarhamami, Alameda, CA (US); Mikito Nagata, San JoseC, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 742 days.

(21) Appl. No.: 18/058,085

(22) Filed: Nov. 22, 2022

Related U.S. Application Data

(60) Provisional application No. 63/264,416, filed on Nov. 22, 2021.

(51) Int. Cl.
*H01M 10/0569* (2010.01)
*H01M 4/36* (2006.01)
(Continued)

(52) U.S. Cl.
CPC ....... *H01M 10/0569* (2013.01); *H01M 4/364* (2013.01); *H01M 4/386* (2013.01);
(Continued)

(58) Field of Classification Search
CPC ......... H01M 10/0525; H01M 10/0567; H01M 10/0568; H01M 10/0569; H01M 4/36;
(Continued)

(56) References Cited

U.S. PATENT DOCUMENTS

| | | | |
|---|---|---|---|
| 2010/0028786 A1* | 2/2010 | Takahashi | H01M 10/0567 429/247 |
| 2018/0151884 A1* | 5/2018 | Yushin et al. | H01M 4/134 |

(Continued)

*Primary Examiner* — Kevin P Kerns
(74) *Attorney, Agent, or Firm* — Muncy, Geissler, Olds & Lowe, P.C.; Daniel Podhajny

(57) ABSTRACT

A lithium-ion battery electrolyte includes $LiPF_6$ and an organic compound composition. The organic compound composition includes (1) vinylene carbonate (VC), (2) fluoroethylene carbonate (FEC), and (3) at least one ester (ES). A mole fraction of the $LiPF_6$ in the electrolyte is approximately $c(LiPF_6)$ mol. %. A mole fraction of the VC in the electrolyte is approximately $c(VC)$ mol. %. A mole fraction of the FEC in the electrolyte is approximately $c(FEC)$ mol. %. A mole fraction of the ES in the electrolyte is approximately $c(ES)$ mol. %. In some embodiments, the mole fractions $c(LiPF_6)$, $c(VC)$, $c(FEC)$, and $c(ES)$ satisfy the following relations:

$$8 \leq c(LiPF_6) \leq 16;$$

$$0.5 \leq c(VC) \leq 5;$$

$$10 \leq c(FEC) \leq 26; \text{ and}$$

$$40 \leq c(ES) \leq 75.$$

47 Claims, 14 Drawing Sheets

(51) Int. Cl.

| | |
|---|---|
| *H01M 4/38* | (2006.01) |
| *H01M 4/587* | (2010.01) |
| *H01M 10/0525* | (2010.01) |
| *H01M 10/0567* | (2010.01) |
| *H01M 10/0568* | (2010.01) |
| *H01M 4/02* | (2006.01) |

(52) U.S. Cl.

CPC ....... *H01M 4/587* (2013.01); *H01M 10/0525* (2013.01); *H01M 10/0567* (2013.01); *H01M 10/0568* (2013.01); *H01M 2004/027* (2013.01); *H01M 2300/0034* (2013.01); *H01M 2300/004* (2013.01)

(58) Field of Classification Search

CPC ........ H01M 4/364; H01M 4/38; H01M 4/386; H01M 4/587

USPC ......................................................... 429/331

See application file for complete search history.

(56)  References Cited

U.S. PATENT DOCUMENTS

| | | | |
|---|---|---|---|
| 2019/0267673 A1* | 8/2019 | Park et al. ............ | H01M 4/587 |
| 2022/0255135 A1* | 8/2022 | Umezu et al. .... | H01M 10/0525 |

* cited by examiner

N≡C⎯⎯⎯⎯⎯C≡N (with central branch N≡C)

Table 1

| | ELY #1 | ELY #2 | ELY #3 |
|---|---|---|---|
| Electrolyte composition (mol.%) | 7.4% LiPF$_6$, 14.7% FEC, 4.2% VC, 44.3% EP, 0.4% LFO, 1.8% LiFSI, 0.4% ADN, 0.3% HTCN, 7.3% DEC, 13.3% EC, 5.8% PC | 8.7% LiPF$_6$, 14.8% FEC, 4.2% VC, 56.4% EP, 0.4% LFO, 1.8% LiFSI, 0.4% ADN, 0.3% HTCN, 13.0% EC | 9.4% LiPF$_6$, 16.0% FEC, 4.5% VC, 67.1% EP, 0.5% LFO, 1.9% LiFSI, 0.4% ADN, 0.3% HTCN |
| Conductivity, mS cm$^{-1}$ | 12.8 | 13.3 | 13.8 |
| DCR Ω-cm$^2$ | 27.7 | 26.9 | 26 |
| Relative discharge capacity at 2C discharge, % | 84.4 | 85.6 | 87.1 |
| Cycle life, cycles | 1113 | 1104 | 1314 |

FIG. 7

Table 2

| | ELY #3 | ELY #4 |
|---|---|---|
| Electrolyte composition (mol.%) | 9.4% LiPF$_6$, 16.0% FEC, 4.5% VC, 67.1% EP, 0.5% LFO, 1.9% LiFSI, 0.4% ADN, 0.3% HTCN | 9.5% LiPF$_6$, 16.0% FEC, 2.2% VC, 69.3% EP, 0.5% LFO, 1.8% LiFSI, 0.4% ADN, 0.3% HTCN |
| DCR, $\Omega$-cm$^2$ | 26 | 25.1 |
| Relative discharge capacity at 2C discharge, % | 87.1 | 87.6 |

FIG. 8

Table 3

| | ELY #5 | ELY #6 | ELY #7 |
|---|---|---|---|
| Electrolyte composition (mol.%) | 10.8% $LiPF_6$, 15.5% FEC, 2.2% VC, 70.5% EP, 0.9% LFO | 10.2% $LiPF_6$, 14.5% FEC, 2.1% VC, 33.1% EP, 39.2% EA, 0.9% LFO | 8.8% $LiPF_6$, 7.7% FEC, 1.9% VC, 56.4% DMC, 3.5% EMC, 20.9% EC, 0.8% LFO |
| Conductivity mS $cm^{-1}$ | 14 | 15.9 | 12.8 |
| Density, $g/cm^3$ | 1.1 | 1.1 | 1.28 |
| Viscosity, cP (25°C) | 2.22 | 1.90 | 3.39 |
| DCR $\Omega\text{-cm}^2$ | 23.1 | 24.3 | 24.6 |
| Cycle life, cycles | 1238 | 1297 | 1210 |

FIG. 9

Table 4

| | ELY #4 | ELY #8 | ELY #9 |
|---|---|---|---|
| Electrolyte composition (mol.%) | 9.5% $LiPF_6$, 16.0% FEC, 2.2% VC, 69.3% EP, 0.5% LFO, 1.8% LiFSI, 0.4% ADN, 0.3% HTCN. | 8.7% $LiPF_6$, 14.9% FEC, 2.0% VC, 33.0% EP, 38.5% EA, 0.5% LFO, 1.7% LiFSI, 0.4% ADN, 0.2% HTCN | 8.7% $LiPF_6$, 7.9% FEC, 1.8% VC, 56.0% DMC, 3.5% EMC, 20.6% EC, 0.8% LFO, 0.7% ADN |
| Conductivity mS $cm^{-1}$ (25 °C) | 13.5 | 15.0 | 12.1 |
| Density, $g/cm^3$ (20°C) | 1.09 | 1.09 | 1.27 |
| Viscosity, cP (25°C) | 2.20 | 1.95 | 3.39 |
| Relative discharge capacity at 2C discharge, % | 92.4 | 92.7 | 91.3 |
| Cycle life, cycles | 1097 | 1056 | 908 |

FIG. 10

Table 5

| | ELY #1 | ELY #7 | ELY #10 |
|---|---|---|---|
| Electrolyte composition (mol.%) | 7.4% LiPF$_6$, 14.7% FEC, 4.2% VC, 44.3% EP, 0.4% LFO, 1.8% LiFSI, 0.4% ADN, 0.3% HTCN, 7.3% DEC, 13.3% EC, 5.8% PC | 8.8% LiPF$_6$, 7.7% FEC, 1.9% VC, 56.4% DMC, 3.5% EMC, 20.9% EC, 0.8% LFO | 11.1% LiPF$_6$, 17.0% FEC, 2.3% VC, 34.8% EP, 33.6% EA, 0.5% LFO, 0.4% ADN, 0.3% HTCN |
| Conductivity, mS cm$^{-1}$ (25°C) | 12.8 | 12.8 | 15.5 |
| Density, g/cm$^3$ (25°C) | 1.2 | 1.28 | 1.1 |
| DCR, Ω-Ah | 0.14 | 0.134 | 0.122 |
| Relative discharge capacity at 2C discharge, % | 84.6 | 85.5 | 88.4 |
| Cycle life, cycles | 980 | 1000 | 1050 |

FIG. 11

Table 6

| | ELY #11 | ELY #12 |
|---|---|---|
| Electrolyte composition (mol.%) | 10.6% LiPF$_6$, 15.1% FEC, 4.4% VC, 66.5% EP, 1.0% LiDFOB, 0.8% ADN, 0.5% HTCN, 1.1% PES | 12.0% LiPF$_6$, 18.4% FEC, 0.6% VC, 25.3 mol.% PP, 41.5% DEC, 0.5% SN, 0.3% ADN, 0.2% HTCN, 0.4% PS, 0.3% EGBE, 0.4% CA |
| Relative discharge capacity at 0.2C discharge at -20°C, % | 83.0 | 63.0 |
| Cycle life, cycles | 600 | 450 |

FIG. 12

Table 7

| | ELY #13 | ELY #14 |
|---|---|---|
| Electrolyte composition (mol.%) | 11.2% $LiPF_6$, 16.4% FEC, 4.7% VC, 34.3% EP, 29.7% EI, 1.0% LiDFOB, 0.9% ADN, 0.6% HTCN, 1.2% PES | 11.1% $LiPF_6$, 16.3% FEC, 4.6% VC, 35.2% EP, 30.1% EI, 1.0% LiDFOB, 1.7% ADN |
| Cycle life at 45 °C, cycles | 580 | 370 |
| Cycle life at 10 °C, cycles | 620 | 720 |

FIG. 13

Table 8

| | ELY #5 | ELY #15 | ELY #16 | ELY #17 |
|---|---|---|---|---|
| Electrolyte composition (mol.%) | 10.8% $LiPF_6$, 15.5% FEC, 2.2% VC, 70.5% EP, 0.9% LFO | 10.9% $LiPF_6$, 16.1% FEC, 2.2% VC, 69.4% EP, 0.9% LFO, 0.5% sulfolane | 10.9% $LiPF_6$, 16.2% FEC, 2.2% VC, 69.2% EP, 0.9% LFO, 0.6% DTD | 10.9% $LiPF_6$, 16.0% FEC, 2.2% VC, 69.6% EP, 1.0% LFO, 0.3% TMSPi |
| DCR $\Omega\text{-cm}^2$ | 25.0 | 24.2 | 24.1 | 24.6 |
| Volume change, % | 17.8 | 13.8 | 6.9 | 11.7 |
| Cycle life, cycles | 1261 | 1305 | 1281 | 1310 |

FIG. 14

ELECTROLYTES FOR LITHIUM-ION BATTERY CELLS WITH VOLUME-CHANGING ANODE PARTICLES

CROSS-REFERENCE TO RELATED APPLICATIONS

The present Application for Patent claims the benefit of U.S. Provisional Application No. 63/264,416, entitled "ELECTROLYTES FOR LITHIUM-ION BATTERY CELLS WITH VOLUME-CHANGING ANODE PAR-TICLES," filed Nov. 22, 2021, assigned to the assignee hereof, and expressly incorporated herein by reference in its entirety.

BACKGROUND

Field

Aspects of the present disclosure relate generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for applications in low- or zero-emission, hybrid-electrical or fully-electrical vehicles, consumer electronics, wearable devices, energy-efficient cargo ships and locomotives, drones, aerospace applications, and power grids. In particular, further improvements are desired for various rechargeable batteries, such as rechargeable Li and Li-ion batteries, rechargeable Na and Na-ion batteries, and rechargeable K and K-ion batteries, to name a few.

A broad range of electrolyte compositions may be utilized in the construction of Li and Li-ion batteries and other metal and metal-ion batteries. However, for improved cell performance (e.g., low and stable resistance, high cycling stability, high rate capability, good thermal stability, long calendar life, etc.), the optimal choice of electrolyte needs to be developed for specific types and specific sizes of active particles in both the anode and cathode, specific total battery cell capacities as well as the specific operational conditions (e.g., temperature, charge rate, discharge rate, voltage range, capacity utilization, etc.). In many cases, the choice of electrolyte components and their ratios is not trivial and may be counter-intuitive.

In certain types of Li metal and Li-ion rechargeable batteries, charge storing anodes may comprise silicon (Si)-comprising anode particles with gravimetric capacities in the range from about 800 mAh/g to about 3000 mAh/g (per mass of Si-comprising anode particles in a Li-free state). A subset of such anodes includes anodes with the electrode layer exhibiting capacity in the range from about 400 mAh/g to about 2800 mAh/g (per mass of the electrode layer, not counting the mass of the current collector, in a Li-free state). Such a class of charge-storing anodes offers great potential for increasing gravimetric and volumetric energy of rechargeable batteries. Unfortunately, Li and Li-ion battery cells with such anodes and conventional electrolytes often require the use of such large amounts of conventional solid electrolyte interphase (SEI)-building additives to maintain acceptable cycle stability that prevents their use at elevated or low temperatures or undesirably limits their calendar life or does not allow such cells to be charged to high voltages (e.g., above about 4.1-4.3 V). Performance of such battery cells may become particularly poor when the cells are charged to above about 4.3-4.4 V and even more so when the cells are charged to above about 4.5 V. Higher cell voltage, broader operational temperature window and longer cycle life, however, are advantageous for most applications. Such cells may suffer from excessive capacity degradation (e.g., above about 5%), large volume expansion (e.g., above about 10%) and significant gassing (e.g., above about 10% thickness change in pouch cells) when exposed to high temperatures (e.g., above about 50-90° C.) in a fully charged state (e.g., about 90-100% state-of-charge, SOC) for a prolonged time (e.g., about 12-168 hours). Passing such elevated temperature charging tests is often required for most applications. Performance of such cells may also become particularly poor when the anode capacity loading (areal capacity) becomes moderate (e.g., about 2-4 mAh/cm$^2$) and even more so when the areal capacity becomes high (e.g., about 4-12 mAh/cm$^2$). Higher capacity loading, however, is advantageous for increasing cell energy density and reducing cell manufacturing costs.

In certain types of rechargeable batteries, charge storing anode materials may be produced as high-capacity (nano) composite powders, which exhibit moderately high volume changes (e.g., about 8-180 vol. %) during the first charge-discharge cycle and moderate volume changes (e.g., about 5-50 vol. %) during the subsequent charge-discharge cycles. A subset of such charge-storing anode particles includes anode particles with an average size (e.g., diameter or thickness) in the range of about 0.2 to about 40 microns. Such a class of charge-storing particles offers great promises for scalable manufacturing and achieving high cell-level energy density and other performance characteristics. Unfortunately, such particles are relatively new and their use in cells using conventional electrolytes may result in relatively poor cell performance characteristics and limited cycle stability. Performance of such battery cells may become particularly poor when the cells are charged to above about 4.1-4.3 V, more so when the cells are charged to above about 4.3-4.4V and even more so when the cells are charged to above about 4.5 V. Higher cell voltage, broader operational temperature window and longer cycle life, however, is advantageous for most applications. Such cells may suffer from excessive capacity degradation (e.g., above about 5%), large volume expansion (e.g., above about 10%) and significant gassing when exposed to high temperatures (e.g., above about 50-90° C.) in a fully charged state (e.g., about 90-100% state-of-charge, SOC) for a prolonged time (e.g., about 12-168 hours). Passing such elevated temperature charging tests is often required for most applications. Cell performance may also become particularly poor when the high-capacity (nano)composite anode capacity loading (areal capacity) becomes moderate (e.g., about 2-4 mAh/ cm$^2$) and even more so when the areal capacity becomes high (e.g., about 4-12 mAh/cm$^2$). Higher capacity loading, however, is advantageous for increasing cell energy density and reducing cell manufacturing costs. Similarly, cell performance may degrade when the porosity of such an anode (e.g., the volume occupied by the spacing between the (nano)composite active anode particles in the electrode and filled with electrolyte) becomes moderately small (e.g., about 25-35 vol. % after the first charge-discharge cycle) and more so when the porosity of the anode becomes small (e.g., about 5-25 vol. % after the first charge-discharge cycle) or when the amount of a binder and conductive additives in the electrode becomes moderately small (e.g., about 5-15 wt. %) and more so when the amount of the binder and conductive additives in the electrode becomes small (e.g., about 0.5-5 wt. %). Higher electrode density and lower binder and conductive additive content, however, are advantageous for increasing cell energy density and reducing cost. Lower binder content may also be advantageous for increasing cell rate performance.

Examples of materials that exhibit moderately high volume changes (e.g., about 8-180 vol. %) during the first charge-discharge cycle and moderate volume changes (e.g., about 5-50 vol. %) during the subsequent charge-discharge cycles include (nano)composites comprising so-called conversion-type (which includes both so-called chemical transformation and so-called "true conversion" subclasses) and so-called alloying-type active electrode materials. In the case of metal-ion batteries (such as Li-ion batteries), examples of such conversion-type active electrode materials include, but are not limited to, metal fluorides (such as lithium fluoride, iron fluoride, copper fluoride, bismuth fluoride, their mixtures and alloys, etc.), metal chlorides, metal iodides, metal bromides, metal chalcogenides (such as sulfides, including lithium sulfide and other metal sulfides), sulfur, selenium, metal oxides (including but not limited to lithium oxide and silicon oxide), metal nitrides, metal phosphides (including lithium phosphide), metal hydrides, and others. In the case of metal-ion batteries (such as Li-ion batteries), examples of such alloying-type electrode materials include, but are not limited to, silicon, germanium, antimony, aluminum, magnesium, zinc, gallium, arsenic, phosphorus, silver, cadmium, indium, tin, lead, bismuth, their alloys, and others. These materials typically offer higher gravimetric and volumetric capacity than so-called intercalation-type electrodes commonly used in commercial metal-ion (e.g., Li-ion) batteries. Alloying-type electrode materials are particularly advantageous for use in certain high-capacity anodes for Li-ion batteries. Silicon-based alloying-type anodes may be particularly attractive for such applications.

An example of low swelling particles may comprise the mixture of conversion silicon-based (or, broadly, silicon-comprising) anode materials with graphite, so-called silicon-graphite blends. In some examples of a blended anode, the Si-comprising anode material may be Si-comprising and C-comprising nanocomposite (referred to herein as Si-C composite or Si-C nanocomposite or Si-C composite (or nanocomposite) particles, even if it comprises elements other than Si and C in relatively small quantities of less than about 10-20 at. %) is from about 20 to 80% by capacity, while the rest of the capacity is from graphite. (In other examples, the Si-C composite (e.g., Si-C composite particles) may contribute more than about 80% or less than about 20% of the anode's capacity). Such anodes offer much higher volumetric and gravimetric energy density than the intercalation-type graphite anodes commonly used in commercial Li-ion batteries. In addition, in such blended anode, the graphite may be composed of natural, artificial or a mixture of natural and artificial graphites. In some designs, it is more advantageous to use natural graphite or a mixture of natural and artificial graphites since such graphite particles are able to accommodate stresses caused by the high-swelling (during Li insertion) Si-based (e.g., Si-C) particles. Such properties of Si-C nanocomposite-graphite blends may offer overall moderate volume changes during the first cycle and low volume changes during the subsequent charging cycles. Such properties are advantageous for high-capacity loading anode particles, which also comes with the reduced cost of manufacturing of such battery cells. The development of electrolytes and additives for such silicon-graphite blends may leverage cell performance due to (i) slower capacity degradation due to lower swelling, (ii) reduced outgassing at high temperatures ("high-temperature outgassing") (e.g., about 50-90° C. or higher) in a fully charged state (e.g., state-of-charge, SOC, of about 90-100%) for a prolonged time (e.g., about 12-168 hours), and/or (iii) reduced cell resistance due to the lower use of additives.

Accordingly, there remains a need for improved batteries, components, and other related materials and manufacturing processes.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a lithium-ion battery electrolyte includes $LiPF_6$; and an organic compound composition comprising (1) vinylene carbonate (VC), (2) fluoroethylene carbonate (FEC), and (3) at least one ester (ES); wherein: a mole fraction of the $LiPF_6$ in the lithium-ion battery electrolyte is approximately $c(LiPF_6)$ mol. %; a mole fraction of the VC in the lithium-ion battery electrolyte is approximately $c(VC)$ mol. %; a mole fraction of the FEC in the lithium-ion battery electrolyte is approximately $c(FEC)$ mol. %; a mole fraction of the ES in the lithium-ion battery electrolyte is approximately $c(ES)$ mol. %; and $c(LiPF_6)$, $c(VC)$, $c(FEC)$, and $c(ES)$ satisfy Relations A1 through A4: $8 \leq c(LiPF_6) \leq 16$ (Relation A1).

In an aspect, a lithium-ion battery electrolyte includes $LiPF_6$; and an organic compound composition comprising (1) vinylene carbonate (VC), (2) fluoroethylene carbonate (FEC), (3) ethylene carbonate (EC), and (4) at least one linear carbonate (LC); wherein: a molar average molecular weight of the LC is 95 or lower; a mole fraction of the $LiPF_6$ in the lithium-ion battery electrolyte is approximately $c(LiPF_6)$ mol. %; a mole fraction of the VC in the lithium-ion battery electrolyte is approximately $c(VC)$ mol. %; a mole fraction of the FEC in the lithium-ion battery electrolyte is approximately $c(FEC)$ mol. %; a mole fraction of the EC in the lithium-ion battery electrolyte is approximately $c(EC)$ mol. %; a mole fraction of the LC in the lithium-ion battery electrolyte is approximately $c(LC)$ mol. %; and $c(LiPF_6)$, $c(VC)$, $c(FEC)$, $c(EC)$, and $c(LC)$ satisfy Relations B1 through B5: $6 \leq c(LiPF_6) \leq 15$ (Relation B1).

Embodiments disclosed herein address the above stated needs by providing improved batteries, components, and other related materials and manufacturing processes.

An aspect is directed to a lithium-ion battery electrolyte, comprising $LiPF_6$, vinylene carbonate (VC), fluoroethylene carbonate (FEC), and at least one ester (ES). In some implementations, a mole fraction of the ES may be in a range of about 26 mol. % to about 75 mol. %. In some implementations, the ES mole fraction may be in a range of about 40 mol. % to about 75 mol. %. In some implementations, the ES mole fraction may be in a range of about 50 mol. % to about 75 mol. %. In some implementations, the ES mole fraction may be in a range of about 60 mol. % to about 75 mol. %. In some implementations, a mole fraction of the VC may be in a range of about 0.5 mol. % to about 5 mol. %. In some implementations, the VC mole fraction may be in a range of about 0.5 mol. % to about 3 mol. %. In some implementations, a mole fraction of the FEC may be in a range of about 10 mol. % to about 26 mol. %. In some implementations, the FEC mole fraction may be in a range of about 14 mol. % to about 20 mol. %. In some implementations, the electrolyte comprises a lithium salt additive (LSA), a nitrile additive (NA), and/or a sulfur-comprising additive (SA).

Another aspect is directed to a lithium-ion battery, including an anode, cathode, a separator interposed between the anode and the cathode, and the foregoing electrolyte ionically coupling the anode and the cathode.

Yet another aspect is directed to a lithium-ion battery electrolyte, comprising $LiPF_6$, vinylene carbonate (VC), fluoroethylene carbonate (FEC), ethylene carbonate (EC), and at least one linear carbonate (LC). In some implementations, a molar average molecular weight of the LC is 95 or lower. In some implementations, a molar average molecular weight of the LC is 93 or lower. In some implementations, a molar average molecular weight of the LC is 92 or lower. In some implementations, a molar average molecular weight of the LC is 91 or lower. In some implementations, a mole fraction of the VC may be in a range of about 0.3 mol. % to about 3.0 mol. %. In some implementations, a mole fraction of the FEC may be in a range of about 5 mol. % to about 26 mol. %. In some implementations, a mole fraction of the EC may be in a range of about 10 mol. % to about 30 mol. %. In some implementations, a mole fraction of the LC may be in a range of about 50 mol. % to about 75 mol. %. In some implementations, the electrolyte comprises a lithium salt additive (LSA), a nitrile additive (NA), and/or a sulfur-comprising additive (SA).

Yet another aspect is directed to a lithium-ion battery, including an anode, cathode, a separator interposed between the anode and the cathode, and the foregoing electrolyte ionically coupling the anode and the cathode.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 4 illustrates examples of ester compounds which may be used in electrolytes.

FIG. 5 illustrates examples of nitrile additive compounds.

FIG. 7 shows Table 1 which shows battery cell performance characteristics of ester-carbonate and ester-based electrolytes.

FIG. 8 shows Table 2 which shows battery cell performance characteristics of ester-based electrolytes having different vinylene carbonate (VC) mole fractions.

FIG. 9 shows Table 3 which shows battery cell performance characteristics of ester-based and carbonate-based electrolytes.

FIG. 10 shows Table 4 which shows battery cell performance characteristics of ester-based and carbonate-based electrolytes.

FIG. 11 shows Table 5 which shows battery cell performance characteristics of ester-carbonate, carbonate-based, and ester-based electrolytes.

FIG. 12 shows Table 6 which shows battery cell performance characteristics of an ester-based electrolyte and an ester-carbonate electrolyte.

FIG. 13 shows Table 7 which shows battery cell performance characteristics of ester-based electrolytes comprising different additive compositions.

FIG. 14 shows Table 8 which shows battery cell performance characteristics of ester-based electrolytes comprising different additive compositions.

DETAILED DESCRIPTION

Figure 1:
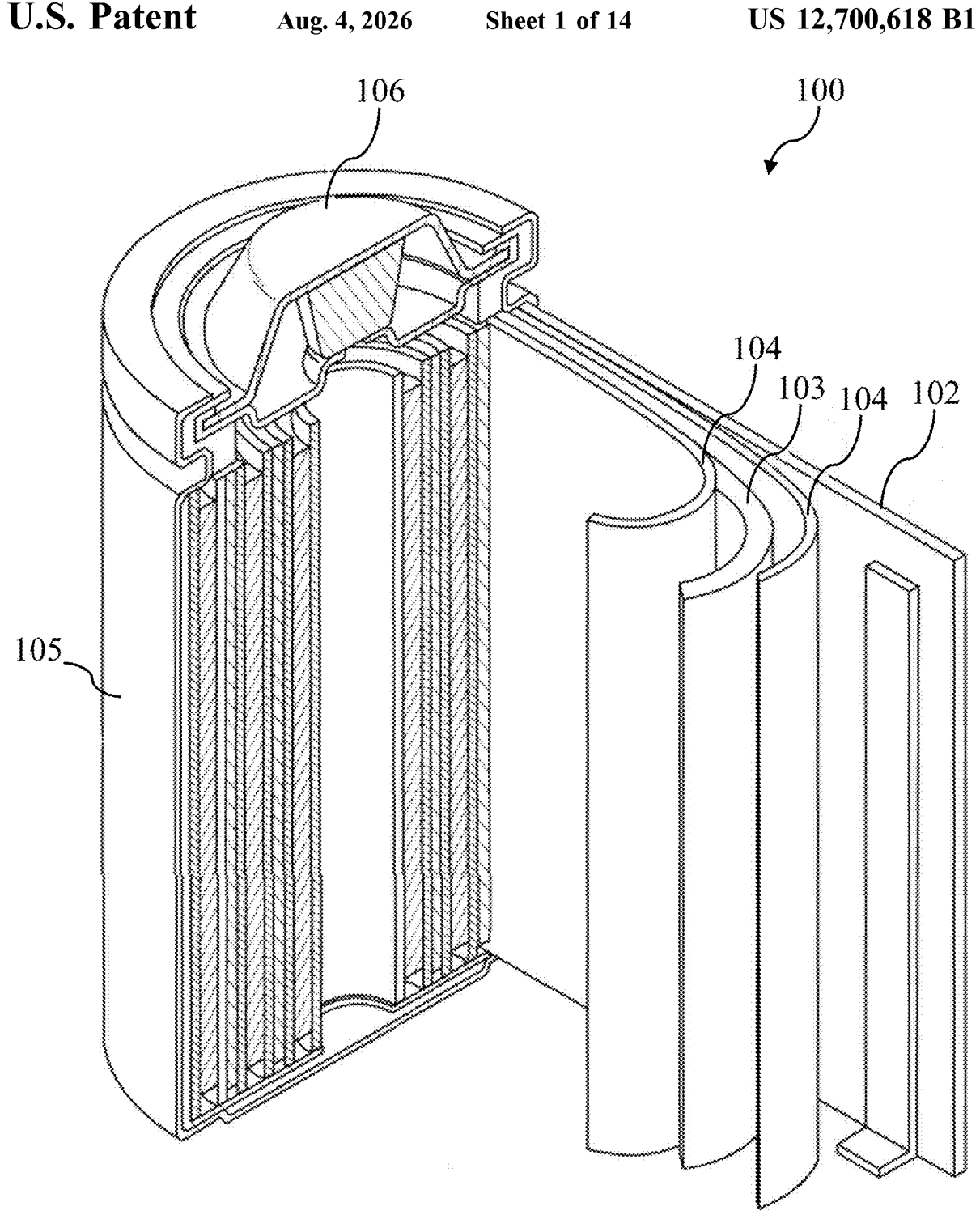
FIG. 1 illustrates an example Li-ion battery in which the components, materials, methods, and other techniques described herein may be implemented.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

It will be appreciated that the level of precision of any particular measurement, threshold or other inexact parameter may vary based on various factors such as measurement instrumentation, environmental conditions, and so on. Below, reference to such measurements or thresholds may thereby be interpreted as a respective value assuming a pseudo-exact level of precision (e.g., a threshold of 80% comprises 80.0000 . . . %). Alternatively, reference to such measurements or thresholds may be described via a qualifier that captures pseudo-exact value(s) plus a range that extends above and/or below the pseudo-exact value(s). For example, the above-noted threshold of 80% may be interpreted as "about", "approximately", "around", "≈" or "~" 80%, which encompasses "exactly" 80% (e.g., 80.0000 . . . %) plus some range around 80%. In some designs, the range encompassed around a measurement or threshold via the "about", "approximately", "around" or "~" qualifier may encompass the level of precision for which the respective measurement or threshold is capable of being measured by the most accurate commercially available instrumentation as of the priority date of the subject application.

While the description below may describe certain examples in the context of Li metal and Li-ion batteries (for brevity and convenience, and because of the current popularity of Li technology), it will be appreciated that various aspects may be applicable to other rechargeable and primary batteries (such as Na and Na-ion, Mg and Mg-ion, K and K-ion, Ca and Ca-ion, and other metal and metal-ion batteries, etc.).

While the description below may also describe certain examples of the material formulations in a Li-free state (for example, as in silicon-comprising nanocomposite anodes or metal fluoride cathodes), it will be appreciated that various aspects may be applicable to Li-comprising electrodes and active materials (for example, partially or fully lithiated Si-comprising anodes or partially or fully lithiated Si-comprising anode particles, partially or fully lithiated metal fluoride comprising cathodes (such as a mixture of LiF and metals such as Cu, Fe, Ni, Bi, and various other metals and metal alloys and mixtures of such and other metals, etc.) or partially or fully lithiated metal halide comprising cathode particles, partially or fully lithiated chalcogenides (such as $Li_2S$, $Li_2S$/metal mixtures, $Li_2Se$, $Li_2Se$/metal mixtures, $Li_2S$—$Li_2Se$ mixtures, various other compositions comprising lithiated chalcogenides etc.), partially or fully lithiated metal oxides (such as $Li_2O$, $Li_2O$/metal mixtures, etc.), partially or fully lithiated carbons, among others). In some designs, various material properties (e.g., at particle level, at inter-particle level, at electrode level, etc.) may change based on whether active material particle(s) are in a Li-free state, a partially lithiated state, or a fully lithiated state. Such Li-dependent material properties may include particle pore volume, electrode pore volume, and so on. Below, unless stated or implied otherwise, reference to such Li-dependent material properties (e.g., at particle level, at inter-particle level, at electrode level, etc.) may be assumed to be provided as if the active material particles are in the Li-free state.

While the description below may describe certain examples in the context of Si-C composite anode materials, it will be appreciated that various aspects may be applicable to other types of high-capacity silicon-comprising active anode materials (including but not limited to, for example, various silicon-comprising or silicon oxide-comprising or silicon nitride-comprising or silicon oxy-nitride comprising or silicon phosphide-comprising particles or particles comprising a mixture or alloy or other combinations of such active materials, various other types of Si-comprising composites including, but not limited to core-shell or hierarchical or nanocomposite particles, etc.).

While the description below may describe certain examples in the context of some specific alloying-type and conversion-type chemistries of anode and cathode active materials for Li-ion batteries (such as silicon-comprising anodes or metal fluoride-comprising or lithium sulfide-comprising cathodes), it will be appreciated that various aspects may be applicable to other chemistries for Li-ion batteries (other conversion-type and alloying-type electrodes as well as various intercalation-type anodes and cathodes) as well as to other battery chemistries. In the case of metal-ion batteries (such as Li-ion batteries), examples of other suitable conversion-type electrodes include, but are not limited to, metal fluorides, metal chlorides, metal iodides, metal bromides, sulfur, metal sulfides (including, but not limited to lithium sulfide), selenium, metal selenide (including, but not limited to lithium sulfide), metal oxides, metal nitrides, metal phosphides, metal hydrides, their various mixtures, composites (including nanocomposites) and alloys and others.

During battery (such as a Li-ion battery) operation, conversion materials change (convert) from one crystal structure to another (hence the name "conversion"-type). This process is also accompanied by breaking chemical bonds and forming new ones. During (e.g., Li-ion) battery operation, Li ions are inserted into alloying type materials forming lithium alloys (hence the name "alloying"-type). Sometimes, "alloying"-type electrode materials are considered to be a subclass of "conversion"-type electrode materials.

In one or more embodiments of the present disclosure, a preferred anode for a battery cell may comprise a mixture of Si—C nanocomposite (particles) and graphite (particles) as the anode active material, a so-called blended anode. In addition to the anode active material particles, an anode may comprise inactive material, such as binder(s) (e.g., polymer binder) and other functional additives (e.g., surfactants, electrically conductive additives). In some implementations, the anode active material may be in a range of about 90 wt. % to about 98 wt. % of the anode. For example, the anode active material particles may be about 95.5 wt. % of the anode. In some implementations, blended anodes may comprise Si—C nanocomposites (e.g., particles) ranging from about 7 wt. % to about 75 wt. % of the anode and the graphite (e.g., particles) making up the remainder of the mass (the weight) of the anode active material particles. In some implementations in which the anode active material particles are about 95.5 wt. % of the blended anode, the blended anode (including active material particles and inactive material) may comprise about 7 wt. % of Si—C nanocomposite and about 88.5 wt. % of graphite particles. In some implementations in which the anode active material particles are about 95.5 wt. % of the blended anode, the blended anode (including active material particles and inactive material) may comprise about 19 wt. % of Si—C nanocomposite and about 76.5 wt. % of graphite particles. In some implementations in which the anode active material particles are about 95.5 wt. % of the blended anode, the blended anode (including active material particles and inactive material) may comprise about 35 wt. % of Si—C nanocomposite and about 60.5 wt. % of graphite particles. In some implementations in which the anode active material particles are about 94.5 wt. % of the blended anode, the blended anode (including active material particles and inactive material) may comprise about 50 wt. % of Si—C nanocomposite and about 44.5 wt. % of graphite particles. In some implementations in which the anode active material particles are about 92.5 wt. % of the blended anode, the blended anode (including active material particles and inactive material) may comprise about 69.4 wt. % of Si—C nanocomposite and about 23.1 wt. % of graphite particles. In some designs, a higher fraction of Si—C composite particles in the blended anode may benefit from a higher fraction of inactive material to attain superior cycle stability and other performance characteristics.

While the descriptions below may also describe certain examples of the blended anode formulations expressed as mass (wt. %) of Si—C nanocomposite, it will be appreciated that various aspects of this disclosure may be applicable to blended anode formulations expressed as wt. % of Si in the anode. In some implementations, a blended anode composition of about 7 wt. % of Si—C nanocomposite may correspond, for example, to about 3 wt. % of Si in the blended anode. In some implementations, a blended anode composition of about 19 wt. % of Si—C nanocomposite corresponds to about 8 wt. % of Si in the blended anode. In some implementations, a blended anode composition of about 35 wt. % of Si—C nanocomposite corresponds to about 15 wt. % of Si in the blended anode. In some implementations, a blended anode composition of about 50 wt. % of Si—C nanocomposite corresponds to about 21 wt. % of Si in the blended anode. In respective implementations, blended anodes may be obtained in which the mass (weight) of the silicon is in a range of about 3 wt. % to about 30 wt. % of a total mass of the anode.

While the descriptions below may also describe certain examples of the blended anode formulations expressed as mass (wt. %) of Si—C nanocomposite, it will be appreciated that various aspects of this disclosure may be applicable to blended anode formulations attributing a fraction (e.g., %) of the total capacity of the blended anode to the capacity of the Si. In some implementations, about 25% of the total capacity of the blended anode is obtained from the Si—C nanocomposite in a blended anode composition of about 7 wt. % of Si—C nanocomposite. In some other implementations, about 50% of the total capacity of the blended anode is obtained from the Si—C nanocomposite in a blended anode composition of about 19 wt. % of Si—C nanocomposite. In some other implementations, about 70% of the total capacity of the blended anode is obtained from the Si—C nanocomposite in a blended anode composition of about 35 wt. % of Si—C nanocomposite. In some other implementations, about 80% of the total capacity of the blended anode is obtained from the Si—C nanocomposite in a blended anode composition of about 50 wt. % of Si—C nanocomposite.

While the description below may describe certain examples of suitable intercalation-type graphites to be used in combination with Si—C nanocomposite in a blend, it will be appreciated that various aspects of this disclosure may be applicable to soft-type synthesis graphite, hard-type synthesis graphite, and pitch coat natural graphite; including but not limited to those which exhibit discharge capacity from about 350 to about 362 mAh/g; including but not limited to those which exhibit low, moderate and high swelling; including but not limited to those which exhibit good and poor compression, including but not limited to those which exhibit Brunauer-Emmett-Teller (BET) surface area of about 1 to about 4 $m^2/g$; including but not limited to those which exhibit lithiation efficiency of about 90% and more; including but not limited to those which exhibit particle sizes from about 8 $\mu m$ to about 18 $\mu m$; including but not limited to those which exhibit densities ranging from about 1.5 $g/cm^3$ to about 1.8 $g/cm^3$; including but not limited to those which exhibit poor, moderate, or good cycle life; including but not limited to those which are coated and comprise coatings with coating thickness to appreciably improve compression and springing during cycling.

While the description below may describe certain examples of suitable intercalation-type cathodes (including high voltage cathodes) in the context of lithium nickel cobalt aluminum oxides (NCA), lithium nickel cobalt manganese aluminum oxides (NCMA), lithium nickel oxides (LNO), lithium manganese oxides (LMO), lithium nickel manganese cobalt oxides (NCM), lithium cobalt oxide (LCO), lithium cobalt aluminum oxides (LCAO), lithium iron phosphate (LFP), lithium cobalt phosphate (LCP), lithium manganese phosphate (LMP), lithium manganese iron phosphate (LMFP), lithium nickel phosphate ($LiNiPO_4$), lithium vanadium fluoro phosphate ($LiVFPO_4$), lithium iron fluoro sulfate ($LiFeSO_4F$), various Li excess materials (e.g., lithium excess (rocksalt) transition metal oxides and oxy-fluorides such as $Li_{1.211}Mo_{0.467}Cr_{0.3}O_2$, $Li_{1.3}Mn_{0.4}Nb_{0.3}O_2$, $Li_{1.2}Mn_{0.4}Ti_{0.4}O_2$, $Li_{1.2}Ni_{0.333}Ti_{0.333}Mo_{0.133}O_2$ and many others), various high capacity Li-ion based materials with partial substitution of oxygen for fluorine or iodine (e.g., rocksalt $Li_2Mn_{2/3}Nb_{1/3}O_2F$, $Li_2Mn_{1/2}Ti_{1/2}O_2F$, $Li_{1.5}Na_{0.5}MnO_{2.85}I_{0.12}$, among others) and many other types of Li-comprising disordered, layered, tavorite, olivine, or spinel type active materials or their mixtures comprising at least oxygen or fluorine or sulfur and at least one transition metal and other lithium transition metal (TM) oxides or phosphates or sulfates (or mixed) cathode or anode materials that rely on the intercalation of lithium (Li) and changes in the TM oxidation state (including, but not limited to those that may be doped or heavily doped; including, but not limited to those that have gradient in composition or core-shell morphology; including, but not limited to those that may be partially fluorinated or comprise some meaningful fraction of fluorine (e.g., about 0.001-10 at. %) in their composition, etc.), it will be appreciated that various aspects may be applicable to high-voltage lithium transition metal oxide (or phosphate or sulfate or mixed or other) cathodes where TMs and oxygen (O) are covalently bonded and both TM and 0 take part in electrochemical reduction-oxidation (redox) reactions during charge and discharge (including, but not limited to, those oxides or phosphate or sulfate or mixed cathodes that may comprise at least about 0.25 at. % of Mn, Fe, Ni, Co, Nb, Mg, Cr, Mo, Zr, W, Ta, Ti, Hf, Y, La, Sb, V, Sn, Si, or Ge).

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (shown implicitly) impregnating the separator 104, a battery case 105, and a sealing member 106 sealing the battery case 105.

Conventional electrolytes for Li- or Na-based batteries of this type are generally composed of an about 0.8-1.2 M (about 1M±about 0.2 M) solution of a single Li or Na salt (such as $LiPF_6$ for Li-ion batteries and $NaPF_6$ or $NaClO_4$ salts for Na-ion batteries) in a mixture of carbonate solvents with about 1-2 wt. % of other organic additives. Common organic additives may include nitriles, esters, sulfones, sulfoxides, phosphorus-based solvents, silicon-based solvents, ethers, and others. Such additive solvents may be modified (e.g., sulfonated or fluorinated).

The conventional salt used in most conventional Li-ion battery electrolytes is $LiPF_6$. Examples of less common salts (e.g., explored primarily in research publications or, in some cases, never even described in Li-ion battery electrolyte applications, but may still be applicable and useful) include: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^*)SO_2CF_2CF_3$, $CF_3SO_2N^-(Li^+)SO_2CF_2OCF_3$, $CF_3OCF_2SO_2N^-(Li)SO_2CF_2OCF_3$, $C_6F_5O_2N^-(Li)SO_2CF_3$, $C_6F_5SO_2N^-(Li^+)SO_2C_6F_5$ or $CF_3SO_2N^-(Li^+)SO_2PhCF_3$, and others), lithium difluorophosphate, and others.

Electrodes utilized in Li-ion batteries are typically produced by (i) formation of a slurry comprising active materials, conductive additives, binder solutions and, in some cases, surfactant or other functional additives; (ii) casting the slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type. Metal ions are intercalated into and occupy interstitial positions of such materials during the charge or discharge of a battery. Such anodes experience small or very small volume changes when used in electrodes. Polyvinylidene fluoride, or polyvinylidene difluoride (PVDF), and carboxymethyl cellulose (CMC) are the two most common binders used in these electrodes. Carbon black is the most common conductive additive used in these electrodes. However, such anodes exhibit relatively small gravimetric and volumetric capacities (typically less than about 370 mAh/g rechargeable specific capacity in the case of graphite- or hard carbon-based anodes and less than about 600 $mAh/cm^3$ rechargeable volumetric capacity at the electrode level without considering the volume of the current collector foils).

Alloying-type (or, more broadly, conversion-type) anode materials for use in Li-ion batteries offer higher gravimetric and volumetric capacities compared to intercalation-type anodes. For example, Earth-abundant silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si-carbon composites, Si-metal composites, Si-polymer composites, Si-ceramic composites, composites comprising various combinations of nanostructured Si, carbon, polymer, ceramic and metal or other types of porous composites comprising nanostructured Si or nanostructured or nano-sized Si particles of various shapes and forms) may reduce volume changes during Li-ion insertion and extraction, which, in turn, may lead to better cycle stability in rechargeable Li-ion cells. In some designs, Si may be doped or heavily doped with nitrogen (N), phosphorus (P), boron (B) or other elements or be allowed with metals. In addition to Si-based composites, silicon oxides ($SiO_x$) or oxynitrides ($SiO_xN_y$) or nitrides ($SiN_y$) or phosphides ($SiP_y$) or other Si element-comprising particles (including those that are partially reduced by Li or Mg) may reduce volume changes and improve cycle stability, although commonly at the expense of higher first cycle losses or faster degradation or both. In some designs, Si-comprising anode particles may exhibit high gravimetric capacities in the range from about 800 mAh/g to about 3000 mAh/g (per mass of Si-comprising anode particles in a Li-free state). Such high specific capacity is advantageous for attaining lighter batteries. However, Li-ion battery cells with anodes comprising high capacity anode particles may exhibit undesirably fast degradation in conventional electrolytes, particularly at elevated temperatures or when charged to high voltages (e.g., above about 4-4.3 V). A subset of anodes with Si-comprising anode particles includes anodes with the electrode layer exhibiting capacity in the range from about 400 mAh/g to about 2800 mAh/g (per mass of the electrode layer, not counting the mass of the current collector, in a Li-free state). Such a class of charge-storing anodes offer great potential for increasing gravimetric and volumetric energy of rechargeable batteries. However, Li-ion battery cells with anodes comprising high capacity anode particles may exhibit undesirably fast degradation in conventional electrolytes, particularly at elevated temperatures (e.g., battery operating temperatures, e.g., 50-80° C. or higher) or when charged to high voltages (e.g., above about 4-4.3 V). In addition to Si-comprising anodes, other examples of such high capacity (e.g., nanocomposite) anodes comprising alloying-type (or, more broadly, conversion-type) active materials include, but are not limited to, those that comprise germanium, antimony, aluminum, magnesium, zinc, gallium, arsenic, phosphorus, silver, cadmium, indium, tin, lead, bismuth, their alloys, and others. In addition to anodes comprising active materials in the metallic form, other interesting types of high capacity (including nanocomposite) anodes may comprise metal oxides (including silicon oxide, lithium oxide, etc.), metal nitrides (including silicon nitride, etc.), metal oxy-nitrides (including silicon oxy-nitride, etc.), metal phosphides (including lithium phosphide), metal hydrides, and others.

Li-ion cells with alloying-type (or, more broadly, conversion-type) active anode materials may exhibit undesirably fast degradation in conventional electrolytes, particularly at elevated temperatures or when charged to high voltages (e.g., above about 4-4.3 V) and stored at such voltages at elevated temperatures (e.g., above about 50-80° C.). In some designs, degradation of Li-ion cells with alloying-type (or, more broadly, conversion-type) active anode materials may become particularly undesirably fast for large cells (e.g., cells with cell capacity in the range from about 10 Ah to about 40 Ah) or ultra-large cells (e.g., cells with cell capacity in the range from about 40 Ah to about 400 Ah) or gigantic cells (e.g., cells with cell capacity in the range from about 400 Ah to about 4,000 Ah or even more). However, large, or ultra-large or gigantic cells may be particularly attractive for use in some electric transportation or grid storage applications. In some designs, degradation of Li-ion cells with alloying-type (or, more broadly, conversion-type) active anode materials may become particularly undesirably fast for cells comprising medium (e.g., about 3-4 g/Ah) or small (e.g., about 2-3 g/Ah) amount of electrolyte when normalized by total cell capacity. However, using a medium or a small amount of electrolyte may be particularly attractive for reducing cell fabrication costs or certain side reactions and for maximizing energy density of cells. One or more aspects of the present disclosure enables one to mitigate or overcome some or all of such limitations and substantially enhance performance of such Li-ion cells by using certain disclosed electrolyte compositions.

High-capacity (nano)composite anode powders (including, but not limited to those that comprise Si), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from about 0.2 to about 40 microns (for some applications, more preferably from about 0.4 to about 20 microns) may be particularly attractive for battery applications in terms of manufacturability and performance characteristics. In particular, a subclass of such anode powders with specific surface area in the range from about 0.5 $m^2$/g to about 50 $m^2$/g (in some designs, from about 0.5 $m^2$/g to about 2 $m^2$/g; in other designs, from about 2 $m^2$/g to about 12 $m^2$/g; in yet other designs, from about 12 $m^2$/g to about 50 $m^2$/g) performed particularly well in some embodiments. In some designs, electrodes with electrode areal capacity loading from moderate (e.g., from about 2 to about 4 mAh/$cm^2$) to high (e.g., from about 4 to about 12 mAh/$cm^2$) and ultra-high (above about 12 mAh/$cm^2$) are also particularly attractive for use in cells. In some designs, a near-spherical or a spheroidal or an ellipsoid (inc. oblate spheroid) shape of these composite particles may additionally be very attractive for increasing rate performance and volumetric capacity (density) of the electrodes.

In spite of some improvements that may be achieved with the formation and utilization of such alloying-type (or conversion-type) active material(s)' comprising (e.g., nanocomposite) anode materials as well as electrode formulations, however, substantial additional improvements in cell performance characteristics may be achieved with improved composition and preparation of electrolytes (e.g., liquid electrolytes), beyond what is known or shown by the conventional state-of-the-art. Unfortunately, high-capacity (nano)composite anode and cathode powders, which exhibit moderately high volume changes (e.g., about 8-about 180 vol. %) during the first charge-discharge cycle, moderate volume changes (e.g., about 4-about 50 vol. %) during the subsequent charge-discharge cycles, an average size in the range from about 0.2 to about 40 microns and relatively low density (e.g., about 0.5-3.8 g/cc), are relatively new and their performance characteristics and limited cycle stability are typically relatively poor, particularly if electrode areal capacity loading is moderate (e.g., from about 2 to about 4 mAh/$cm^2$) and even more so if it is high (e.g., from about 4 to about 12 mAh/$cm^2$) or ultra-high (e.g., above about 12 mAh/$cm^2$). Higher capacity loading, however, is advantageous for increasing cell energy density and reducing cell manufacturing costs. Similarly, the cell performance may suffer when such an electrode (e.g., anode) porosity (volume occupied by the spacing between the (nano)composite active anode particles in the electrode and filled with electrolyte) becomes moderately small (e.g., about 25-about 35 vol. %) and more so when it becomes small (e.g., about 5-about 25 vol. %) or when the amount of the binder and conductive additives in the electrode becomes moderately small (e.g., about 6-about 15 wt. %, total) and more so when it becomes small (e.g., about 0.5-about 5 wt. %, total).

Higher electrode density and lower binder content, however, are advantageous for increasing cell energy density and reducing cost in certain applications. Lower binder content may also be advantageous for increasing cell rate performance. Larger volume changes lead to inferior performance in some designs, which may be related to damages in the solid electrolyte interphase (SEI) layer formed on the anode, to the non-uniform lithiation and delithiation of the electrode particles within the electrodes, and other factors. Unfortunately, Li and Li-ion battery cells with such anodes and conventional electrolytes often require the use of such large amounts of conventional SEI-building additives to maintain acceptable cycle stability that prevents their use at elevated or low temperatures or undesirably limits their calendar life or does not allow such cells to be charged to high voltages (e.g., above about 4.1-4.3 V). Performance of such battery cells may become particularly poor when the cells are charged to above about 4.3-4.4 V and even more so when the cells are charged to above about 4.5 V.

Higher cell voltage, broader operational temperature window and longer cycle life, however, are advantageous for most applications. Such cells may suffer from excessive capacity degradation (e.g., above about 5%), large volume expansion (e.g., above about 10%) and significant gassing when exposed to high temperatures (e.g., above about 50-90° C.) in a fully charged state (e.g., about 90-100% state-of-charge, SOC) for a prolonged time (e.g., about 12-168 hours). Passing such elevated temperature charging tests is often required for most applications. In some designs, degradation of Li-ion cells comprising high-capacity (nano)composite anode powders, which exhibit moderately high volume changes during the first charge-discharge cycle, moderate volume changes during the subsequent charge-discharge cycles and an average size in the range from about 0.2 to about 40 microns may become particularly undesirably fast for large cells (e.g., cells with cell capacity in the range from about 10 Ah to about 40 Ah) or ultra-large cells (e.g., cells with cell capacity in the range from about 40 Ah to about 400 Ah) or gigantic cells (e.g., cells with cell capacity in the range from about 400 Ah to about 4,000 Ah or even more). In some designs, Li-ion cells with such volume changing anode particles may degrade particularly undesirably fast for cells comprising medium (e.g., about 3-4 g/Ah) or small (e.g., about 2-3 g/Ah) amount of electrolyte when normalized by total cell capacity. One or more embodiments of the present disclosure enables one to mitigate or overcome some or all of such limitations and substantially enhance performance of such Li-ion cells by using certain disclosed electrolyte compositions.

One or more embodiments of the present disclosure overcome some or all of the above-discussed challenges of various types of metal-ion (e.g., Li-ion) cells comprising high-capacity nanocomposite anode materials (for example, materials comprising conversion-type or alloying-type active materials) that may comprise Si in their composition, may experience certain volume changes during cycling (for example, moderately high volume changes (e.g., about 8-about 160 or about 180 vol. %) during the first charge-discharge cycle and moderate volume changes (e.g., about 4-about 50 vol. %) during the subsequent charge-discharge cycles), may exhibit an average particle size in the range from about 0.2 to about 40 microns and a specific surface area in the range from about 0.5 to about 50 $m^2/g$ (in some designs, from about 0.5 to about 2 $m^2/g$; in other designs, from about 2 to about 12 $m^2/g$; in yet other designs, from about 12 to about 50 $m^2/g$), may be formulated with such electrodes in moderate (e.g., about 2-about 4 mAh/cm$^2$) and high areal capacity loadings (e.g., about 4-about 12 mAh/cm$^2$) with high packing density (electrode porosity filled with electrolyte in the range from about 5 to about 35 vol. % after the first charge-discharge cycle) and relatively low binder content (e.g., about 0.5-about 14 wt. %), may comprise moderate or small amount of electrolyte per cell capacity (e.g., less than about 4 g/mAh), may be charged to moderately high (e.g., above about 4.1-4.3 V) or high (e.g., above about 4.3-4.4 V) or very high (e.g., above about 4.5-4.8 V) voltages, may be exposed to temperatures above about 40° C. at high state of charge (e.g., about 70-100% SOC) during testing or operation, may be produced as large cells (e.g., cells with cell capacity in the range from about 10 Ah to about 40 Ah) or ultra-large cells (e.g., cells with cell capacity in the range from about 40 Ah to about 400 Ah) or gigantic cells (e.g., cells with cell capacity in the range from about 400 Ah to about 4,000 Ah or even more).

Conventional cathode materials utilized in Li-ion batteries are of an intercalation-type and commonly crystalline and polycrystalline. Such cathodes typically exhibit a highest charging potential of less than about 4.3 V vs. Li/Li, gravimetric capacity of less than about 190 mAh/g (based on the mass of active material) and volumetric capacity of less than about 800 mAh/cm$^3$ (based on the volume of the electrode and not counting the volume occupied by the current collector foil). For given anodes, higher energy density in Li-ion batteries may be achieved either by using high-voltage cathodes (cathodes with a highest charging potential from about 4.3 V vs. Li/Li$^+$ to about 5.1 V vs. Li/Li) or by using so-called conversion-type cathode materials (including, but not limited to those that comprise F or S in their composition). Some high-voltage intercalation-type cathodes may comprise nickel (Ni). Some high-voltage intercalation-type cathodes may comprise manganese (Mn). Some high-voltage intercalation-type cathodes may comprise vanadium (V). Some high-voltage intercalation-type cathodes may comprise iron (Fe). Some high-voltage intercalation-type cathodes may comprise cobalt (Co). Some high-voltage intercalation-type cathodes may comprise aluminum (Al). Some high-voltage intercalation-type cathodes may comprise titanium (Ti). Some high-voltage intercalation-type cathodes may comprise niobium (Nb). Some high-voltage intercalation-type cathodes may comprise molybdenum (Mo). Some high-voltage intercalation-type cathodes may comprise silicon (Si), tin (Sn), antimony (Sb) or germanium (Ge) or their various combinations. In some designs, high-voltage intercalation-type cathode particles may comprise fluorine (F) in their structure or the surface layer. Some high-voltage intercalation-type cathodes may comprise phosphorus (P). Some high-voltage intercalation-type cathodes may comprise sulfur (S). Some high-voltage intercalation-type cathodes may comprise selenium (Se). Some high-voltage intercalation-type cathodes may comprise tellurium (Te). Some high-voltage intercalation-type cathodes may comprise iron (Fe). Some high-voltage intercalation-type cathodes may comprise magnesium (Mg). Some high-voltage intercalation-type cathodes may comprise zirconium (Zr). Combination of such (or similar) types of higher energy density cathodes with high-capacity (e.g., Si based) anodes may result in high cell-level energy density. Unfortunately, the cycle stability and other performance characteristics of such cells may not be sufficient for some applications, at least when used in combination with conventional electrolytes.

One or more embodiments of the present disclosure are thereby directed to electrolyte compositions that work well for a combination of high voltage intercalation cathodes (cathodes with the highest charging potential in the range from about 4.0-4.2 V to about 4.5 V vs. Li/Li and, in some cases, from about 4.5 V vs. Li/Li to about 5.1 V vs. Li/Li) with a subclass of high-capacity moderate volume changing anodes (e.g., anodes comprising (nano)composite anode powders, which exhibit moderately high volume changes (e.g., about 8-about 160 or about 180 vol. %) during the first charge-discharge cycle, moderate volume changes (e.g., about 4-about 50 vol. %) during the subsequent charge-discharge cycles), which exhibit an average particle size (e.g., average diameter) in the range from about 0.2 to about 40 microns and specific surface area in the range from about 0.5 to about 50 $m^2/g$ (when normalized by the mass of the composite electrode particles) and, in the case of Si-comprising anodes, specific capacities in the range from about 400 to about 2800 mAh/g (when normalized by the total mass of all the anode particles, conductive or other additives and binders, but does not include the weight of the current collectors) or in the range from about 650-800 to about 3000 mAh/g (when normalized by the mass of the Si-comprising anode particles only). In at least one embodiment, a particular electrolyte composition may be selected based on the value of the highest cathode charge potential or the highest operating temperature or the longest calendar life requirement.

Examples of high specific and high volumetric capacity conversion-type cathode materials include, but are not limited to, fluorides, chlorides, sulfides, selenides, their various mixtures, composites and others. For example, fluoride-based cathodes may offer outstanding technological potential due to their very high capacities, in some cases exceeding about 300 mAh/g (greater than about 1200 mAh/cm$^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; $ZnF_2$ offers a theoretical specific capacity of 519 mAh/g. AgF and $AgF_2$ also offer theoretical specific capacities and additionally exhibit very high lithiation potential. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). The use of metal fluorides mixed with metals may also sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of the overall reversible reactions of the conversion-type metal fluoride cathodes may include $2Li^+CuF_2 \leftrightarrow 2LiF+Cu$ for $CuF_2$-based cathodes or $3Li^+FeF_3 \leftrightarrow 3LiF+Fe$ for $FeF_3$-based cathodes. It will be appreciated that metal fluoride-based cathodes may be prepared in Li-free or partially lithiated or fully lithiated states. Another example of a promising conversion-type cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of $S/Li_2S$ electrodes, one may utilize formation of porous S, $Li_2S$, porous S—C composites, $Li_2S$—C composites, porous S-polymer composites, or other composites comprising S or $Li_2S$, or both.

Note that in some designs, different electrolyte compositions may offer the most favorable performance for cells comprising identical anodes (e.g., Si-comprising nanocomposite anodes) and different cathodes (e.g., intercalation-type, high voltage intercalation-type, conversion type comprising S, conversion-type comprising F, etc.). In some designs, the operating temperature range and calendar life requirements may similarly significantly alter the electrolyte selection.

Unfortunately, many conversion-type electrodes used in Li-ion batteries suffer from performance limitations. Formation of (nano)composites may, at least partially, overcome such limitations. For example, certain (nano)composites may provide reduced voltage hysteresis, improved capacity utilization, improved rate performance, improved mechanical and sometimes improved electrochemical stability, reduced volume changes, and/or other positive attributes. Examples of such composite fluoride-based cathode materials include, but are not limited to, LiF—Cu—Fe—C nanocomposites, LiF—Cu—Fe—Ag—C nanocomposites, LiF—Cu—Fe—Ti—C nanocomposites, LiF—Cu—Fe—Mn—C nanocomposites, $FeF_2$—C nanocomposites, $FeF_3$—C nanocomposites, $CuF_2$—C nanocomposites, $CuF_2$—C—$AlF_3$ nanocomposites, $CuF_2$—C—$Al_2O_3$ nanocomposites, LiF—Cu—C nanocomposites, LiF—Cu-C-polymer nanocomposites, LiF—Cu-another metal-C-polymer nanocomposites, LiF—Cu-another metal oxide-C-polymer nanocomposites, LiF—Cu-another metal fluoride-C-polymer nanocomposites, LiF—Cu-metal-polymer nanocomposites, LiF—Fe—C-polymer nanocomposites, LiF—Fe-another metal-C-polymer nanocomposites, LiF—Fe-another metal oxide-C-polymer nanocomposites, LiF—Fe-another metal fluoride-C-polymer nanocomposites, LiF—Fe-another metal-polymer nanocomposites, LiF—Fe-another metal—C-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, $ZnF_2$, AgF, $AlF_3$, $AgF_2$ or other metal fluorides or their alloys and mixtures, as well as Fe, Mn, Cu, Ni, Pb, Bi, Nb, Cr, W, Ti, V, Co, Sn, Sb, Cd, Zn, Ag, Al or other metals or their alloys and mixtures. In some designs, such composites may also comprise oxides or oxyfluorides and may comprise conductive (mostly $sp^2$-bonded) carbon. In some examples, metal fluoride nanoparticles may be infiltrated into the pores of porous carbon (for example, into the pores of activated carbon particles) to form these metal fluoride-C or mixed metals-LiF-another metal oxide or metal fluoride—C nanocomposites, among other related compositions. Examples of such composite sulfur-based cathode materials include, but are not limited to, S—C nanocomposites, S-polymer nanocomposites, S—Se—C nanocomposites, S-metal-C nanocomposites, S-metal-C-polymer nanocomposites, S—Se-metal-C nanocomposites, S—Se-metal-polymer nanocomposites, S—Se-metal-C-polymer nanocomposites, S-metal sulfide-C nanocomposites, S-metal selenide-C nanocomposites, S-metal telluride-C nanocomposites, S-metal oxide-C nanocomposites, S-metal nitride-C nanocomposites, S—C nanocomposites, S-polymer nanocomposites, S—Se—C nanocomposites, $Li_2S$-metal-C nanocomposites, $Li_2S$-metal-C-polymer nanocomposites, $Li_2S$—$Li_2Se$-metal-C nanocomposites, $Li_2S$—$Li_2Se$-metal-polymer nanocomposites, $Li_2S$-$Li_2Se$-metal-C-polymer nanocomposites, $Li_2S$-metal sulfide-C nanocomposites, $Li_2S$-metal oxide-C nanocomposites, $Li_2S$-metal nitride-C nanocomposites, $Li_2S$-metal oxy-nitride-C nanocomposites, where metals (or semimetals, in some designs) may be selected from the group comprising Li, Na, Mg, K, Ca, Cs, Ti, V, Fe, Cr, W, Nb, Mn, Ni, Co, Cu, Zn, Zr, Al, Sn, Sb, or their alloys and mixtures, among other related compositions.

In some designs, high-capacity (nano)composite cathode particles (e.g., powders), which exhibit moderately high (for a cathode) volume changes (e.g., about 5-about 100 vol. %) during the first charge-discharge cycle, moderate volume changes (e.g., about 3-about 40 vol. %) during the subsequent charge-discharge cycles, and an average size (for example, a diameter, in the case of spherical particles or, a thickness, in the case of flattened particles or diameter, in case of fiber-shaped particles or, an average dimension, in the case of randomly-shaped particles) in the range from about 0.2 micron to about 40 microns may be particularly attractive for battery applications in terms of manufacturability and performance characteristics. In some designs, a near-spherical or a spheroidal or an ellipsoid (e.g., an oblate spheroid) shape of the composite cathode particles is additionally very attractive for optimizing rate performance and volumetric capacity of the electrodes. Despite some improvements that may be achieved with the formation and utilization of such conversion-type nanocomposite cathode materials and electrode optimization, however, additional improvements in cell performance characteristics may be achieved with the improved composition and preparation of electrolytes, beyond what is known or shown or suggested by the conventional state-of-the art.

One or more embodiments of the present disclosure are thereby directed to electrolyte compositions that work well for a combination of (i) a subclass of high-capacity moderate volume changing cathodes: e.g., cathodes comprising about 5-about 100 wt. % of high capacity conversion-type (nano)composite cathode material particles (e.g., if the cathode comprises less than about 100 wt. % of high capacity conversion-type (nano)composite cathode material particles, the cathode may be characterized as a blended cathode) which exhibit moderate volume changes (e.g., about 5-about 50 vol. %) during the first charge-discharge cycle and small-to-moderate volume changes (e.g., about 3-about 40 vol. %) during the subsequent charge-discharge cycles, and an average size (for example, a diameter, in the case of spherical particles) in the range from about 0.2 to about 40 microns with (ii) a subclass of high-capacity moderate volume changing anodes: e.g., anodes comprising about 5-about 100 wt. % of (nano)composite anode powders (or particles) (e.g., if the anode comprises less than about 100 wt. % of high capacity anode powder or particles, the anode may be characterized as a blended anode), which exhibit moderately high volume changes (e.g., about 8-about 160 or about 180 vol. %) during the first charge-discharge cycle, moderate volume changes (e.g., about 4-about 50 vol. %) during the subsequent charge-discharge cycles, an average size (e.g., average diameter) in the range from about 0.2 to about 40 microns and specific surface area in the range from about 0.5 to about 50 m$^2$/g normalized by the mass of the (nano)composite anode particles and, in the case of Si-comprising anodes, specific reversible capacities in the range from about 400 to about 2800 mAh/g (when normalized by the total mass of all the active electrode particles, conductive additives and binders) or in the range from about 800 to about 3000 mAh/g (when normalized by the mass of the composite anode particles only).

One or more embodiments of the present disclosure are also directed to electrolyte compositions that work well for a combination of (i) a subclass of moderate capacity (e.g., about 140-260 mAh/g per mass of active materials, in some design), high-voltage intercalation-type cathodes (which may be layered cathodes in some designs; which may comprise Ni or Co or Mn or a combination of some of such metals in some designs, such as, for example, LCO, NCA, NCMA, LNO, LMO, LMNO, NCM, LCAO, LCP, LNP, LMP, LMFP or others), which are charged to above about 4.1 V vs. Li/Li$^+$ during full cell battery cycling (in some designs, above about 4.2 V vs. Li/Li$^+$; in other designs, above 4.3 V vs. Li/Li$^+$; in yet other designs, above about 4.4 V vs. Li/Li$^+$; in yet other designs, above about 4.5 V vs. Li/Li$^+$; in yet other designs, above about 4.6 V vs. Li/Li) with (ii) a subclass of high-capacity moderate volume changing anodes: anodes comprising about 5-about 100 wt. % of (nano)composite anode powders or particles, which exhibit moderately high volume changes (e.g., about 8-about 160 or about 180 vol. %) during the first charge-discharge cycle, moderate volume changes (e.g., about 4-about 50 vol. %) during the subsequent charge-discharge cycles, an average size (e.g., average diameter) in the range from about 0.2 to about 40 microns and specific surface area in the range from about 0.5 to about 50 m$^2$/g normalized by the mass of the (nano)composite anode particles and, in the case of Si-comprising anodes, specific reversible capacities in the range from about 400 to about 2800 mAh/g (when normalized by the total mass of all the active electrode particles, conductive additives and binders) or in the range from about 800 to about 3000 mAh/g (when normalized by the mass of the composite anode particles only).

The inventors have found that, in some designs, cells comprising anode electrodes based on high capacity nanocomposite anode particles or powders (comprising conversion- or alloying-type active anode materials) that experience certain volume changes during cycling (moderately high volume changes (e.g., an increase by about 8-about 180 vol. % or a reduction by about 8-about 70 vol. %) during the first charge-discharge cycle and moderate volume changes (e.g., about 4-about 50 vol. %) during the subsequent charge-discharge cycles) and an average size in the range from about 0.2 to about 40 microns (such as Si-based nanocomposite anode powders, among many others) may benefit from specific compositions of electrolytes that provide significantly improved performance (particularly for high capacity loadings or small electrolyte fractions or large cells).

For example, (i) continuous volume changes in high capacity nanocomposite particles during cycling in combination with (ii) electrolyte decomposition on the electrically conductive electrode surface at electrode operating potentials (e.g., mostly electrochemical electrolyte reduction in the case of Si-based anodes) may lead to a continuous (even if relatively slow) growth of a solid electrolyte interphase (SEI) layer on the surface of the nanocomposite anode particles and the resulting irreversible losses in cell capacity. In some designs, the addition of some known SEI-forming additives may improve SEI stability during cycling, but may lower electrolyte conductivity and may induce undesirable electrolyte oxidation on the cathode (particularly at higher voltages or elevated temperature), resulting in gassing, cell swelling and reduced cycle and calendar life. In some designs, the addition of some known cathode solid electrolyte interphase (CEI)-forming additives may induce protective film formation on the cathode, reducing further electrolyte oxidation and gassing, but often at the expense of reduced SEI stability on the anode or other undesirable effects.

In some designs, swelling of binders in electrolytes depends not just on the binder composition, but may also depend on the electrolyte compositions. Furthermore, in some designs, such swelling (and the resulting performance reduction) often correlates with the reduction in elastic modulus upon exposure of binders to electrolytes. In this sense, the smaller the reduction in modulus in certain electrolytes, the more stable the binder-linked (nano)composite active particles/conductive additives interface becomes. In some designs, the reduction in binder modulus by over about 15-20% may result in a noticeable reduction in performance. In an example, the reduction in the binder modulus by about two times (2×) may result in a substantial performance reduction. In a further example, the reduction in modulus by about five or more times (e.g., about 5×-500×) may result in a very significant performance reduction. Therefore, selecting an electrolyte composition that does not induce significant binder swelling may be highly preferential for certain applications. In some examples, it may be preferred to select an electrolyte composition that reduces the binder modulus by less than about 30% (more preferably, by no more than about 10%) when exposed to electrolyte. In anodes which comprise more than one binder composition, in some designs, it may be preferred to select an electrolyte composition where at least one binder does not reduce the modulus by over about 30% (more preferably, by no more than about 10%) when exposed to electrolyte.

In one or more embodiments of the present disclosure, a preferred battery cell includes a lithium cobalt oxide (LCO) as a cathode material. In another one or more embodiments of the present disclosure, a preferred battery cell includes a lithium nickel cobalt manganese oxide (NCM) as a cathode material. In another one or more embodiments of the present disclosure, a preferred battery cell includes a lithium nickel cobalt manganese aluminum oxide (NCMA) as a cathode material. In another one or more embodiments of the present disclosure, a preferred battery cell includes a lithium nickel cobalt aluminum oxide (NCA) as a cathode material. In another one or more embodiments of the present disclosure, a preferred battery cell includes a high voltage spinel (e.g., lithium nickel manganese oxide (LNMO) or lithium manganese oxide (LMO)) as a cathode material. In some designs, LCO, NCM, NCMA, NCA, LNMO or LMO cathode materials may include the majority (e.g., over 50 wt. %) of single-crystalline powder (or a powder with grain size above around 500 nm; in some designs, above around 1 micron). In some of the preferred examples a surface of LCO, NCM, NCMA, NCA, LMO or LMNO may be coated with a layer of ceramic material. Illustrative examples of a preferred coating material for such cathodes include, but are not limited to, titanium oxide (e.g., $TiO_2$), aluminum oxide (e.g., $Al_2O_3$), tungsten oxide (e.g., WO), chromium oxide (e.g., $Cr_2O_3$), niobium oxide (e.g., NbO or $NbO_2$) and zirconium oxide (e.g., $ZrO_2$) and their various mixtures. In some designs, such ceramic materials may additionally comprise lithium (Li)—e.g., as lithium titanium oxide, lithium aluminum oxide, lithium tungsten oxide, lithium chromium oxide, lithium niobium oxide, lithium zirconium oxide and their various alloys, mixtures and combinations. In other preferred examples, LCO, NCM, NCMA, NCA, LMFP, LMP, LMO or LMNO may be doped with Al, Ti, Mg, Nb, Zr, Cr, Hf, Ta, W, Mo or La. In some designs, a preferred cathode current collector material is aluminum or aluminum alloy. In some designs, a preferred battery cell includes a polymer separator. In some of the preferred examples, a polymer separator is made of or comprises polyethylene, polypropylene or a mixture thereof. In some of the preferred examples, a surface of a polymer separator is coated with a layer of ceramic material. Examples of a preferred coating material for polymer separators may include, but not limited to titanium oxide ($TiO_2$), aluminum oxide ($Al_2O_3$), aluminum hydroxide or oxyhydroxide, zirconium oxide ($ZrO_2$), magnesium oxide (MgO) or magnesium hydroxide or oxyhydroxide. In some designs, a preferred battery cell may include a silicon- and carbon-comprising nanocomposite (e.g., as used herein, a nanocomposite or (nano)composite is at least partially comprised of active material nanomaterials or nanostructures or nanoparticles, irrespective of whether the nanocomposite or (nano)composite itself is a nanomaterial) or silicon ($SiO_x$, x≥0) or natural or synthetic graphite or soft carbon or hard carbon or their various mixtures and combinations in its anode composition. In some of the preferred examples, the anode material includes a mixture of silicon- and carbon-comprising nanocomposite (sometimes abbreviated herein as Si—C nanocomposite) and graphite (e.g., the graphite being separate from the C-part of the Si—C nanocomposite). In some implementations, a Si—C nanocomposite comprises composite particles, which may include Si nanoparticles embedded in pores of a porous carbon scaffold particle. Such a porous carbon scaffold particle may comprise (e.g., curved or defective) graphene material and/or graphite material. In some designs, a preferred anode current collector may comprise copper or copper alloy.

In one or more embodiments of the present disclosure, a preferred anode for a battery cell may comprise a mixture of Si—C nanocomposite (particles) and graphite (particles) as the anode active material, a so-called blended anode. In addition to the anode active material, an anode may comprise inactive material, such as binder(s) (e.g., polymer binder) and other functional additives (e.g., surfactants, electrically conductive additives). In some implementations, the anode active material (particles) may be in a range of about 90 wt. % to about 98 wt. % of the anode. For example, the anode active material (particles) may be about 95.5 wt. % of the anode, in some designs.

In some designs, a blended anode may comprise from about 7 wt. % of Si—C nanocomposite to about 97 wt. % of the Si—C nanocomposite. While the descriptions below may also describe certain examples of the blended anode formulations expressed as mass (wt. %) of Si—C nanocomposite, it will be appreciated that various aspects of this disclosure may be applicable to blended anode formulations expressed as wt. % of Si in the anode. For example, in some implementations, a blended anode composition of about 7 wt. % of Si—C nanocomposite corresponds to about 3 wt. % of Si in the blended anode. In some implementations, a blended anode composition of about 19 wt. % of Si—C nanocomposite corresponds to about 8 wt. % of Si in the blended anode. In some implementations, a blended anode composition of about 35 wt. % of Si—C nanocomposite may correspond to about 15 wt. % of Si in the blended anode. In some implementations, a blended anode composition of about 50 wt. % of Si—C nanocomposite may correspond to about 21 wt. % of Si in the blended anode. In respective implementations, blended anodes may be obtained in which the mass (weight) of the silicon is in a range of about 3 wt. % to about 30 wt. % of a total mass of the anode. Herein, the term "total mass of the anode" is used to refer to the mass of the anode only, excluding any anode current collector foil or separator. The masses of the current collector and the separator are excluded from the mass of the anode even if the current collector and the separator are attached to the anode.

In some designs, a blended anode may comprise Si—C nanocomposite that provides from about 25% of to about 99.5% of the total anode capacity. While the descriptions below may also describe certain examples of the blended anode formulations expressed as mass (wt. %) of Si—C nanocomposite, it will be appreciated that various aspects of this disclosure may be applicable to blended anode formulations attributing a fraction (e.g., %) of the total capacity of the blended anode to the capacity of the Si. For example, in some implementations, about 25% of the total capacity of the blended anode may be obtained from the Si—C nanocomposite in a blended anode composition of about 7 wt. % of Si—C nanocomposite. In some other implementations, about 50% of the total capacity of the blended anode may be obtained from the Si—C nanocomposite in a blended anode composition of about 19 wt. % of Si—C nanocomposite. In some other implementations, about 70% of the total capacity of the blended anode may be obtained from the Si—C nanocomposite in a blended anode composition of about 35 wt. % of Si—C nanocomposite. In some other implementations, about 80% of the total capacity of the blended anode may be obtained from the Si—C nanocomposite in a blended anode composition of about 50 wt. % of Si—C nanocomposite.

In some implementations, blended anodes may comprise Si—C nanocomposites (e.g., particles) ranging from about 7 wt. % to about 99 wt. % of the anode active material particles and the graphite particles making up the remainder of the mass (the weight) of the anode active material particles. In some implementations in which the anode active material particles are about 95.5 wt. % of the blended anode, the blended anode (including active material particles and inactive material) may comprise about 7 wt. % of Si—C nanocomposite and about 88.5 wt. % of graphite, about 19 wt. % of Si—C nanocomposite and about 76.5 wt. % of graphite, about 35 wt. % of Si—C nanocomposite and about 60.5 wt. % of graphite, or about 50 wt. % of Si—C nanocomposite and about 45.5 wt. % of graphite (the graphite being separate from the C-part of the Si—C nanocomposite in all cases). In some of the preferred examples in which the anode active material particles are about 90 wt. % or more of the blended anode, the anode active material composition contains a small (e.g., about 1-20 wt. %, preferably about 1-10 wt. %, and even more preferably about 1-5 wt. %) fraction of graphite (the graphite being separate from the C-part of the Si—C nanocomposite).

In some of the illustrative examples in which the anode active material particles are about 90 wt. % of the anode, the anode active material particle composition may consist almost entirely of Si—C nanocomposite and is substantially free of graphite (e.g., <about 1 wt. %) (the graphite being separate from the C-part of the Si—C nanocomposite).

In some of the illustrative examples in which the anode active material particles are about 96.5 wt. % of the anode, the anode active material particle composition may consist almost entirely of graphite and is substantially free of Si—C nanocomposite (e.g., <about 1 wt. %).

In one or more embodiments of the present disclosure, a preferred electrolyte for a lithium-ion battery includes $LiPF_6$. In some designs, a mole fraction of $LiPF_6$ in the electrolyte may preferably be in a range of approximately 8 mol. % to approximately 15 mol. %. In some designs, it may be advantageous to use a mole fraction of $LiPF_6$ from approximately 10 mol. % to approximately 12 mol. %. In such mole fraction range, the battery electrolyte may exhibit advantageously high ionic conductivity, low viscosity, high cycle life, decreased battery direct-current resistance (DCR), decreased cell resistance and improved high-temperature (HT) outgassing (e.g., reduced HT outgassing). Direct-current resistance is sometimes referred to herein as DCR. Reduced DCR may reduce the heat generated by a battery during operation, which may further improve cycle life by reducing electrolyte decomposition reaction rates. DCR may be expressed in either units of $\Omega cm^2$ or units of $\Omega Ah$. When DCR is expressed in $\Omega cm^2$, DCR normalizes for different cell capacities, assuming similar capacity loadings [mAh/$cm^2$]. When DCR is expressed in $\Omega Ah$, DCR normalizes using the actual cell capacity in Ah. In yet other designs, it may be advantageous to use a mole fraction of $LiPF_6$ from approximately 12 mol. % to approximately 15 mol. %. In such mole fraction range, the battery electrolyte may exhibit advantageously reduced charge-transfer anode resistance and high Li-ion transference number which may be beneficial for low temperature performance (e.g., performance at temperatures such as at +10° C., 0° C., –10° C. or –20° C.), fast charge applications (e.g., applications in which charging time is 15 min or less to charge from 10% to 80% state of charge (SOC)), and reduced HT outgassing (e.g., smaller degree of HT outgassing such as 15% or lower volume change at the cell level). Higher salt concentration may also lead to increased electrolyte density and cost in some designs, which may be undesirable for some applications. The optimal salt mole fraction may depend on the particular cell design and electrolyte composition.

Figure 2:
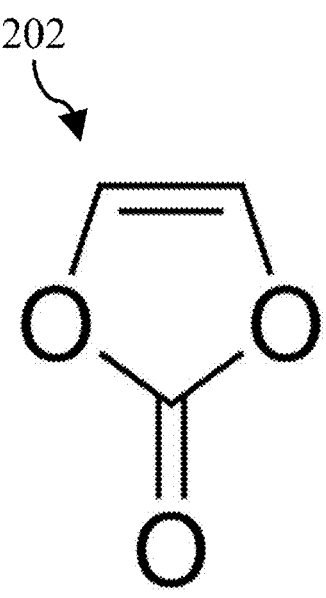
FIG. 2 illustrates examples of cyclic carbonate compounds which may be used in electrolytes.
Figure 2:
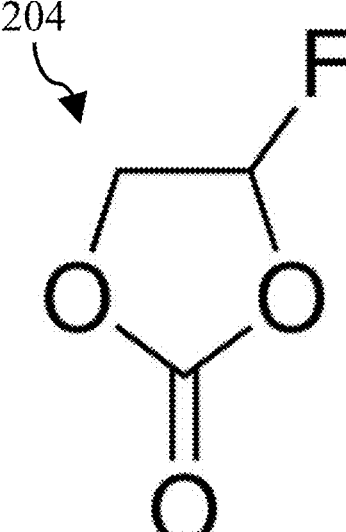
Figure 2:
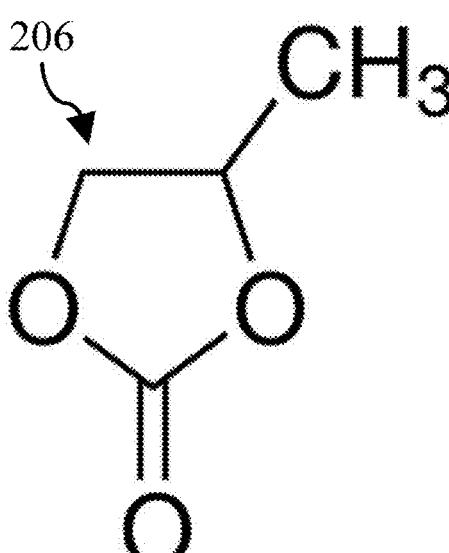
Figure 2:
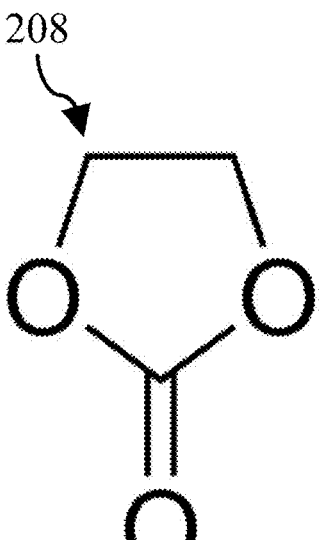
Figure 3:
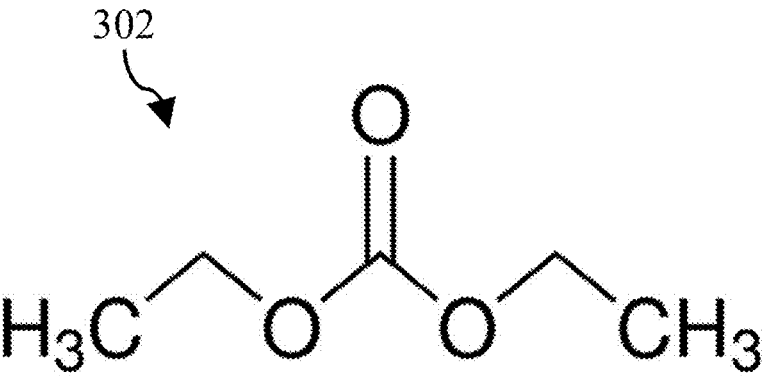
FIG. 3 illustrates examples of linear carbonate compounds which may be used in electrolytes.
Figure 3:
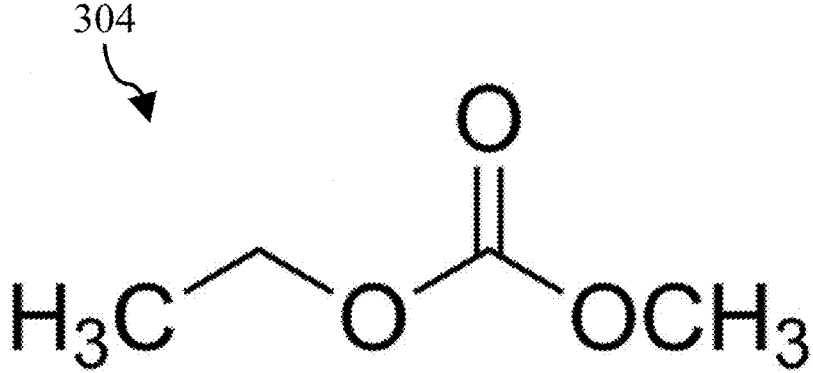
Figure 3:
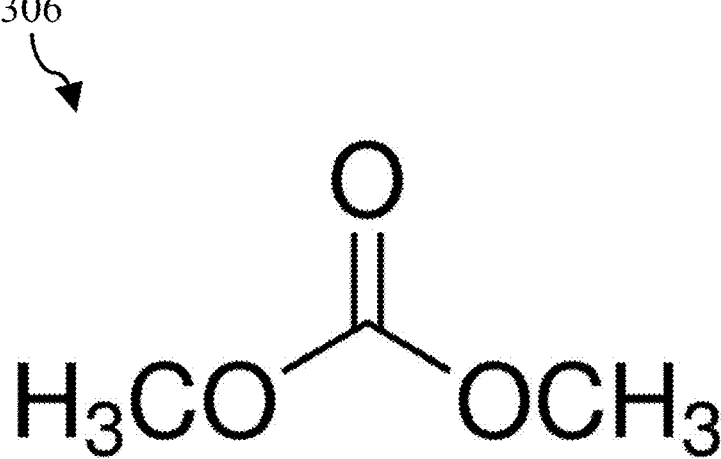

FIG. 2 shows four examples of cyclic carbonates that are employed in electrolytes: vinylene carbonate (VC) (202), fluoroethylene carbonate (FEC) (204), propylene carbonate (PC) (206), and ethylene carbonate (EC) (208). FIG. 3 shows three examples of linear carbonates that are employed in electrolytes: diethyl carbonate (DEC) (302), ethyl methyl carbonate (EMC) (304), and dimethyl carbonate (DMC) (306). These linear carbonates are notable for their relatively low viscosities (e.g., approximately 0.59 cP for DEC and approximately 0.65 cP for EMC, at 25° C.).

In one or more embodiments of the present disclosure, a preferred electrolyte for a Li-ion battery includes cyclic carbonates that promote the formation of a robust solid electrolyte interphase (SEI). FIG. 2 shows two examples of such preferred SEI "builders": vinylene carbonate (VC) (202) and fluoroethylene carbonate (FEC) (204). In some embodiments, both VC and FEC are preferably present in the electrolyte. In some designs, both VC and FEC may also be very efficient in repairing damaged SEI (e.g., damaged due to volume expansion in Si-comprising or other anode particles). In some designs, the mole fraction of VC is smaller than the mole fraction of FEC, in some designs by two times or more (in some designs, by four times or more; in some designs, by eight times or more; in yet some designs by sixteen times or more).

In some designs, a mole fraction of VC in the electrolyte may preferably be in a range of approximately 0.5 mol. % to approximately 5 mol. %. Within this preferred mole fraction range, in some designs, the presence of VC in the electrolyte may contribute to a good balance among good Li-ion battery cycle life, good ionic conductivity, high discharge voltage, reduced DCR, reduced charge-transfer resistance, and sufficiently low high-temperature outgassing. In some designs, when the mole fraction of VC in the electrolyte is less than approximately 0.5 mol. %, the cycle life may degrade (e.g., in case of Si-comprising anode) because of insufficient SEI formation (or insufficiently robust SEI). In some designs, when the mole fraction of VC in the electrolyte is greater than approximately 4 mol. % (or greater than about 5 mol. % in some implementations), an increased cell resistance and an excessive HT outgassing may be induced. In some implementations, it may be possible to set the VC mole fraction in a certain range (e.g., about 0.5 mol. % to about 5 mol. % in some cases) to achieve a balance among some concurrent trends. For example, when the mole fraction of VC is in a certain range (e.g., about 0.5 mol. % to about 5 mol. % in some cases), the VC concentration may be sufficiently high, thereby (i) enabling a more stable SEI and (ii) enabling a higher ionic conductivity electrolyte (due to high dielectric constant ($\varepsilon=126$ at 25° C.) of VC). Concurrently, when the VC mole fraction is in a certain range (e.g., about 0.5 mol. % to about 5 mol. % in some cases), the VC concentration may be sufficiently low, thereby (iii) precluding inferior rate performance of a battery cell under low-temperature conditions, (iv) precluding excessive gassing when the battery cell is exposed to elevated temperatures, and (v) decreasing cell resistance and DCR.

In some designs, a mole fraction of FEC in the electrolyte may preferably be in a range of approximately 5 mol. % to approximately 26 mol. % (in some designs, from about 10 mol. % to about 26 mol. %, in some other designs, from about 5 mol. % to about 12 mol. %. in some other designs from about 12 mol. % to about 20 mol. %. in some other designs from about 20 mol. % to about 26 mol. %). In some designs (e.g., for anodes with higher Si wt. %, particularly for anodes comprising higher-volume changing Si-comprising particles), when the mole fraction of FEC in the electrolyte is less than approximately 5 mol. %, the cycle life may degrade because of insufficient SEI formation or insufficient SEI stability (e.g., in case of Si-comprising anode). In some designs, a higher FEC concentration leads to a more stable SEI, but excessive FEC content may increase electrolyte viscosity (and reduce electrolyte conductivity), reduce rate performance, increase cell resistance, increase DCR, and lower average cell voltage (and thus lower volumetric energy density, sometimes abbreviated as VED) and/or undesirably increase gassing upon cell exposure to elevated temperatures and high cut-off voltages. For these reasons, in some designs, the FEC mole fraction should preferably not exceed approximately 26 mol. %. In some designs, the FEC mole fraction in the electrolyte may thus preferably be in a range of approximately 12 mol. % to approximately 18 mol. %. In some designs, the FEC mole fraction in the electrolyte may thus preferably be in a range of approximately 14 mol. % to approximately 20 mol. %. Within these preferred mole fraction ranges, in some designs, the presence of FEC in the electrolyte may contribute to a good balance among high cycle life, high ionic conductivity, low viscosity, low DCR, low cell resistance, low anode charge-transfer resistance, high discharge voltage, reduced high-temperature outgassing, and/or excellent low-temperature performance.

In some designs, for FEC mole fractions in a range of approximately 5 mol. % to about 26 mol. %, or in a range of about 10 mol. % to about 20 mol. %, high-temperature outgassing may be mitigated by addition of certain additives or by utilizing certain esters in the electrolyte as discussed herein below. In some designs, high temperature outgassing in the cell is a result of heat treatment of the cell charged to a high state-of-charge for a certain period of time. In a specific example, the heat treatment may be performed at about 80° C. In another specific example, the heat treatment may be conducted at about 72° C. In yet another specific example, the heat treatment may be conducted at about 60° C. In some designs, high temperature outgassing may be strongly impacted by the passing of time. In a specific illustrative example, the cell may be heat treated for about 10 days. In another example, the cell may be heat treated for about 7 days. In yet another example, the cell may be treated for about 3 days. In yet another example, the cell may be treated for 1 day. In yet another example, the cell may be treated for about 12 hours.

In one implementation, the measurement of the volume of the gasses formed in the cell constitute the metrics for the high temperature outgassing test. In a specific example, the volume of the gas at the atmospheric pressure measured about 1 h after the cell has been cooled to about 25° C. should preferably not exceed about 10% of the starting volume of the cell. In another specific example, the volume of the gas at the atmospheric pressure measured about 1 h after the cell has been cooled to about 25° C. should preferably not exceed about 3% of the starting volume of the cell (e.g., a pouch cell). In a more specific example, the volume of the gas at the atmospheric pressure should preferably not exceed about 1% of the starting volume of the cell measured about 1 h after the cell has been cooled to about 25° C.

In another implementation, the measurement of the volume of the cell before and after the test constitutes the metric for the high temperature outgassing test. In a specific example, the volume change of the cell measured about 1 h after the cell has been cooled to about 25° C. should not exceed about 15% of the initial cell volume. In another specific example, the volume of the cell measured 1 h after the cell has been cooled to about 25° C. should not exceed about 10% of the initial cell volume. In another specific example, the volume of the cell measured 1 h after the cell has been cooled to about 25° C. should not exceed about 3% of the initial cell volume. In another specific example, the volume of the cell measured 1 h after the cell has been cooled to about 25° C. should not exceed about 1% of the initial cell volume.

In another implementation, the measurement of the thickness change of the cell (e.g., a pouch cell) before and after the test constitutes the metric for the high temperature outgassing test. In a specific example, the thickness change should not exceed about 10% measured about 1 h after the cell has been cooled to about 25° C. In another specific example, the thickness change should not exceed about 3% measured about 1 h after the cell has been cooled to about 25° C. In a more specific example, thickness change should not exceed about 1% measured about 1 h after the cell has been cooled to about 25° C.

In another implementation, the measurement of residual capacity of the cell after the test constitutes the metric for the high temperature outgassing test. In a specific example, the residual capacity of the cell measured after the test should exceed about 80% of the cell capacity before the test. In another specific example, the residual capacity of the cell measured after the test should exceed about 90% of the cell capacity before the test. In a more specific example, the residual capacity of the cell measured after the test should exceed about 95% of the cell capacity before the test.

In another implementation, the measurement of recoverable capacity of the cell after the test constitutes the metric for the high temperature outgassing test. In a specific example, the recoverable capacity of the cell measured after the test should exceed about 80% of the cell capacity before the test. In another specific example, the recoverable capacity of the cell measured after the test should exceed about 90% of the cell capacity before the test. In a more specific example, the recoverable capacity of the cell measured after the test should exceed about 95% of the cell capacity before the test.

In another implementation, the measurement of voltage change of the cell after the test constitutes the metric for the high temperature outgassing test. In a specific example, the voltage reduction of the cell measured after the test should not exceed about 0.3V relative to the open circuit voltage of the cell before the test. In a specific example, the voltage reduction of the cell measured after the test should not exceed about 0.2V relative to the open circuit voltage of the cell before the test. In a more specific example, the voltage reduction of the cell measured after the test should preferably not exceed about 0.1V of the open circuit voltage of the cell before the test.

In some implementations, low-temperature cycling of a battery cell at a temperature at or below about 25° C. constitutes a low-temperature performance test. In some implementations, low-temperature cycling of a battery cell at a temperature at or below about 10° C. constitutes a low-temperature performance test. In some implementations, low-temperature cycling of a battery cell at a temperature at or below about 0° C. constitutes a low-temperature performance test. In some implementations, low-temperature cycling of a battery cell at a temperature at or below about 0° C. constitutes a low-temperature performance test. In some implementations, low-temperature cycling of a battery cell at a temperature at or below about −10° C. constitutes a low-temperature performance test. In some implementations, low-temperature cycling of a battery cell at a temperature at or below about −20° C. constitutes a low-temperature performance test. In one example, the residual capacity may be employed as a metric to evaluate low-temperature performance. In some implementations, the residual capacity preferably exceeds about 80% of the initial capacity after the low-temperature cycling.

In some implementations, measurement of the volume of gasses formed in cells that have degraded to about 80% of the initial reversible capacity (about 80% state-of-health) may constitute a metric for the end-of-life outgassing test. In some implementations, measurement of the volume of gasses formed in cells that have degraded to about 50% state-of-health may constitute a metric for the end-of-life outgassing test. In some implementations, measurement of the volume of gasses formed in cells that have degraded to about 20% state-of-health may constitute a metric for the end-of-life outgassing test.

In a specific example, the measured volume of the gas at atmospheric pressure should not exceed about 10% of the starting volume of the cell. In another specific example, the measured volume of the gas at atmospheric pressure should not exceed about 3% of the starting volume of the cell. In a more specific example, the measured volume of the gas at atmospheric pressure should not exceed about 1% of the starting volume of the cell.

In a specific example, the measured volume change of the cell should not exceed about 10% of the starting volume of the cell. In another specific example, the measured volume of the cell should not exceed about 3% of the starting volume of the cell. In a more specific example, the measured volume of the cell should not exceed about 1% of the starting volume of the cell.

In a specific example, the measured thickness change of a cell should not exceed about 10% of the starting thickness of the cell. In another specific example, the measured thickness change of a cell should not exceed about 3% of the starting thickness of the cell. In a more specific example, the measured thickness change of a cell should not exceed about 1% of the starting thickness of the cell.

Figure 4:
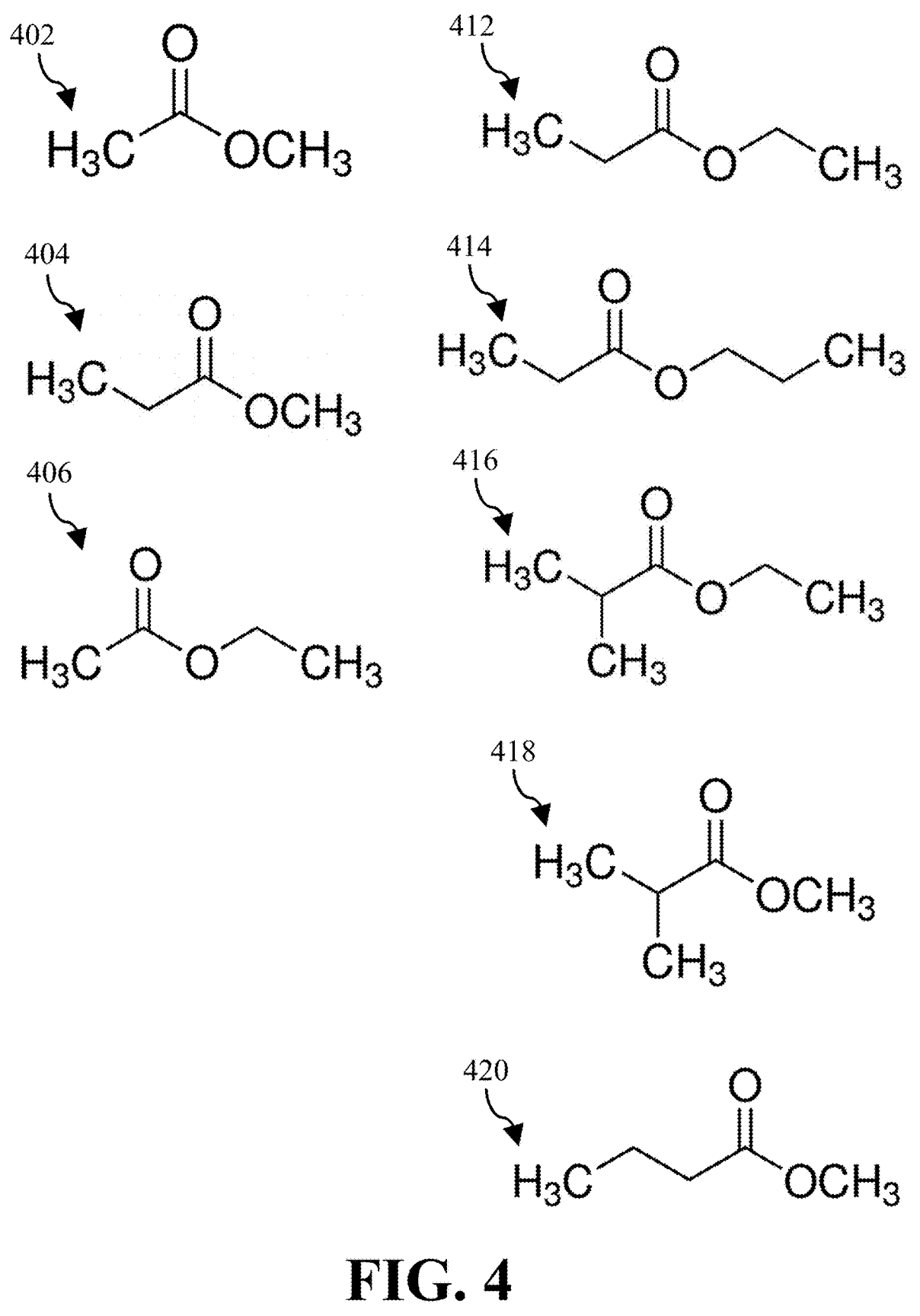

In one or more embodiments of the present disclosure, a preferred electrolyte for a lithium-ion battery includes at least one ester compound (ES). FIG. 4 shows eight examples of such esters: methyl acetate (MA) (402 in FIG. 4) (molecular weight (MW) 74), methyl propionate (MP) (404) (MW≈88), ethyl acetate (EA) (406) (MW≈88), ethyl propionate (EP) (412) (MW≈102), propyl propionate (PP) (414) (MW≈116), ethyl isobutyrate (EI) (416) (MW≈116), methyl isobutyrate (MI) (418) (MW≈102), and methyl butyrate (MB) (420) (MW≈102). Among these example ester compounds, MA (402), MP (404), EA (406), EP (412), PP (414), and MB (420) are linear esters. Among these example ester compounds, EI (416) and MI (418) are branched esters. In some designs, one or more of such esters may contribute to better ionic conductivity in the electrolyte, better discharge performance (also referred to as "C-rate performance"), and better low-temperature performance. In some designs, a larger mole fraction (higher concentration) of linear esters in electrolyte composition may be advantageously used to reduce bulk, charge-transfer and diffusion resistances, which is beneficial to reduce DCR, improve low temperature cycling performance (e.g., performance at about 10° C., about 0° C., about −10° C. or about −20° C.), and improve fast charging (e.g., attaining a charging time of about 15 min or less to charge from about 10% to about 80% SOC) without negatively affecting cycle stability to below the desired specifications. In one or more embodiments of the present disclosure, a mole fraction of ES in the electrolyte may preferably be in a range of approximately 20 mol. % to approximately 85 mol. %. In other embodiments, a mole fraction of ES in the electrolyte may preferably be in a range of about 40 mol. % to about 85 mol. %, about 40 mol. % to about 75 mol. %, about 40 mol. % to about 50 mol. %, about 50 mol. % to about 75 mol. %, about 60 mol. % to about 85 mol. %, about 60 mol. % to about 75 mol. %, or about 50 mol. % to about 60 mol. %. In some designs, it may be advantageous to use EP as a main ester co-solvent. In some other designs, it may be advantageous to use a mixture of EP and EA as a main co-solvent. In some other designs, it may be advantageous to use a mixture of EP and EI as a main co-solvent. In some other designs, it may be advantageous to use EI as a main co-solvent. The inventors have found that, in some designs, the combination of ester co-solvents may be finely tuned to enable high cycle life, reduced cell resistance, and reduced HT and EoL outgassing.

In some designs, EP (412), a linear ester, contributes to lower viscosity, higher conductivity, higher discharge voltages, higher VED, higher gravimetric energy density (GED), higher formation efficiency, better C-rate performance, better fast charge performance, higher cycle life, reduced resistance, and better low-temperature performance. The viscosity of EP is less than about 1 cP at about 20° C. In some designs, the composition of a battery electrolyte with EP as a main co-solvent may be advantageously designed to achieve viscosity of a solution of below about 2.7 cP at about 20° C. In some designs, the composition of a battery electrolyte with EP as a main co-solvent may be advantageously designed to achieve viscosity of an electrolyte solution of below about 2.5 cP at about 25° C. In some designs, the composition of a battery electrolyte with EP as a main co-solvent may be advantageously designed to achieve viscosity of an electrolyte solution of below about 2.3 cP at about 30° C. In some designs, the composition of a battery electrolyte with EP as a main co-solvent may be advantageously designed to achieve viscosity of an electrolyte solution of below about 2.1 cP at about 35° C. In some designs, the composition of a battery electrolyte with EP as a main co-solvent may be advantageously designed to achieve viscosity of an electrolyte solution of below about 2.0 cP at about 40° C. In some designs, the composition of a battery electrolyte with EP as a main co-solvent may be advantageously designed to achieve viscosity of an electrolyte solution of below about 1.9 cP at about 45° C. EP has been found to function as a superior solvent or co-solvent for certain lithium salts such as $LiPF_6$. In some designs, the composition of a battery electrolyte with EP as a main co-solvent may be advantageously designed to achieve bulk ionic conductivity of an electrolyte solution of above about 14.0 mS/cm at about 25° C. The density of EP is about 0.89 $g/cm^3$ at about 25° C. In some designs, the composition of a battery electrolyte with EP as a main co-solvent may be advantageously designed to achieve densities of an electrolyte solution of equal to or less than about 1.1 $g/cm^3$. In addition to having EP as the main co-solvent, other electrolyte compositions with other co-solvents that exhibit density of equal to or less than about 1.1 $g/cm^3$ were surprisingly offer beneficial performance characteristics. The inventors have found that, in some designs, such electrolyte formulations, with EP (in some designs, with other lightweight solvent(s)) as a main co-solvent, may be advantageously used to decrease DCR, internal cell resistance, hysteresis, bulk resistance, charge transfer resistance and diffusion resistance across different temperatures. Such electrolyte designs may be particularly useful to decrease diffusion resistance in cathode and anode coatings in automotive battery cells, which typically feature thick and dense coatings. Such electrolyte designs, with EP as a main co-solvent (in some designs, with other lightweight solvent(s)), are particularly advantageous for low-temperature cycling and for fast-charge applications. In some designs, however, electrolytes with EP as a main co-solvent may also exhibit higher high-temperature (HT) outgassing and higher end-of-life (EoL) outgassing. In some designs, it is advantageous to use electrolyte additives to reduce HT outgassing of electrolyte composition with EP as a main co-solvent. In some designs, Li salt additives may be advantageously used to reduce HT outgassing of EP-based formulations. Herein, electrolytes with EP as a main co-solvent (e.g., in some designs, the mole fraction of EP in the electrolyte is about 26 mol. % or more; in other designs, mole fraction of EP in the electrolyte is about 40 mol. % or more, in other designs, mole fraction of EP in the electrolyte is in a range of about 40 mol. % to about 85 mol. %, in other designs, mole fraction of EP in the electrolyte is in a range of about 40 mol. % to about 75 mol. %, etc.) may be referred to as EP-based electrolytes. In some designs, nitrile additives may be advantageously used to reduce HT outgassing of EP-based formulations. In some designs, sulfur-comprising additives may be advantageously used to reduce HT outgassing in EP-based formulations. In some designs, phosphorus-based additives may be advantageously used to reduce HT outgassing in EP-based formulations. The inventors have found that, in some designs, FEC and VC may be preferably used to decrease EoL outgassing in EP-based formulations. Accordingly, in some designs, a mole fraction of EP in the electrolyte may preferably be in a range of approximately 20 mol. % to approximately 85 mol. % (in some designs, from about 40 mol. % to approximately 75 mol. %). EP-based electrolyte formulations may be improved further by incorporating FEC and VC. EP-based electrolyte formulations comprising FEC and VC may be improved yet further by incorporating certain Li salt additives, certain nitrile additives, and/or certain sulfur-comprising additives, as described in greater detail herein. EP-based electrolyte formulations comprising FEC and VC may be improved yet further by decreasing to below about 20 mol. % (in some designs, to below about 10 mol. %) or, in some designs, completely eliminating linear carbonates and/or certain cyclic carbonates other than FEC and VC (e.g., propylene carbonate, ethylene carbonate). EP-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low-temperature performance. In some designs, it may be advantageous to use these electrolyte formulations in batteries characterized by mass loadings of active material (e.g., on the anode) ranging from about 2 mAh/cm$^2$ to about 12 mAh/cm$^2$ (in some designs, from about 4 mAh/cm$^2$ to about 6.5 mAh/cm$^2$). In some designs, it may be advantageous to use these electrolyte formulations in batteries which are charged at current densities ranging from about 8 to about 30 mA/cm$^2$. Such electrolyte formulations, with EP as a main co-solvent, may be advantageously used to supplant incumbent carbonate-based electrolyte recipes (which are currently used in some automotive batteries), which tend to exhibit higher viscosity, lower conductivity, higher cell resistance, higher bulk resistance, higher charge-transfer resistance, higher diffusion resistance, poorer low temperature performance, poorer cycle life, and lower formation efficiency.

In some designs, a combination (e.g., a mixture) of EA (406) and EP (412) (both are linear esters), also referred to as EA:EP herein, contributes to lower viscosity, higher conductivity, higher discharge voltages, higher VED, higher gravimetric energy density (GED), higher formation efficiency, better C-rate performance, better fast charge performance, higher cycle life, reduced resistance, and better low-temperature performance. The viscosities of EP and EA are less than about 1 cP at about 20° C., and the viscosity of EA is lower than that of EP. In some designs, the composition of a battery electrolyte with EA:EP as a main co-solvent may be advantageously designed to achieve viscosity of an electrolyte solution of below about 2.5 cP at about 20° C. In some designs, the composition of a battery electrolyte with EA:EP as a main co-solvent may be advantageously designed to achieve viscosity of an electrolyte solution of below about 2.4 cP at about 25° C. In some designs, the composition of a battery electrolyte with EA:EP as a main co-solvent may be advantageously designed to achieve viscosity of an electrolyte solution of below about 2.3 cP at about 30° C. In some designs, the composition of a battery electrolyte with EA:EP as a main co-solvent may be advantageously designed to achieve viscosity of an electrolyte solution of below about 2.2 cP at about 35° C. In some designs, the composition of a battery electrolyte with EA:EP as a main co-solvent may be advantageously designed to achieve viscosity of an electrolyte solution of below about 2.1 cP at about 40° C. In some designs, the composition of a battery electrolyte with EA:EP as a main co-solvent may be advantageously designed to achieve viscosity of an electrolyte solution of below about 1.9 cP at about 45° C. EA:EP has been found to function as a superior solvent or co-solvent for certain lithium salts such as $LiPF_6$. In some designs, the composition of a battery electrolyte with EA:EP as a main co-solvent may be advantageously designed to achieve ionic conductivity of an electrolyte solution of above about 15.5 mS/cm at about 25° C. The density of EP is about 0.89 g/cm$^3$ at about 25° C., and the density of EA is about 0.9 g/cm$^3$ at about 25° C. In some designs, the composition of a battery electrolyte with EA:EP as a main co-solvent may be advantageously designed to achieve densities of an electrolyte solution of equal to or less than about 1.1 g/cm$^3$. The inventors have found that, in some designs, such electrolyte formulations, with EA:EP as a main co-solvent, may be advantageously used to decrease DCR, internal cell resistance, hysteresis, bulk resistance, charge transfer resistance and diffusion resistance across different temperatures. Such electrolyte designs may be particularly useful to decrease diffusion resistance in cathode and anode coatings in automotive battery cells, which typically feature thick and dense coatings. Such electrolyte designs, with EA:EP as a main co-solvent, may be particularly advantageous for low-temperature cycling and for fast-charge applications. In some designs, electrolytes with EA:EP as a main co-solvent may exhibit higher high-temperature (HT) outgassing and higher end-of-life (EoL) outgassing. In some designs, it may be advantageous to use electrolyte additives to reduce HT outgassing of electrolyte composition with EA:EP as a main co-solvent. In some designs, Li salt additives may be advantageously used to reduce HT outgassing of EA:EP-based formulations. Herein, electrolytes with EA:EP (combined) as a main co-solvent (e.g., mole fraction of EA:EP in the electrolyte may be about 20-26 mol. % or more, mole fraction of EA:EP in the electrolyte may be about 40 mol. % or more, mole fraction of EA:EP in the electrolyte may be in a range of about 40 mol. % to about 85 mol. %, mole fraction of EA:EP in the electrolytes is in a range of about 40 mol. % to about 75 mol. %, etc.) may be referred to as EA:EP-based electrolytes. In some designs, nitrile additives may be advantageously used to reduce HT outgassing of EA:EP-based formulations. In some designs, sulfur-comprising additives may be advantageously used to reduce HT outgassing in EA:EP-based formulations. In some designs, phosphorus-based additives may be advantageously used to reduce HT outgassing in EA:EP-based formulations. The inventors have found that, in some designs, FEC and VC may be preferably used to decrease EoL outgassing in EA:EP-based formulations. Accordingly, in some designs, a mole fraction of EA:EP in the electrolyte may preferably be in a range of approximately 20 mol. % to approximately 85 mol. % (in some designs, from about 40 mol. % to approximately 75 mol. %). EA:EP-based electrolyte formulations (e.g., electrolyte formulations in which EA:EP is present in the electrolyte in any of the foregoing mole fractions) may be improved further by incorporating FEC and VC. EA:EP-based electrolyte formulations comprising FEC and VC may be improved yet further by incorporating certain Li salt additives, certain nitrile additives, and/or certain sulfur-comprising additives, as described in greater detail herein. EA:EP-based electrolyte formulations comprising FEC and VC may be improved yet further by decreasing or eliminating linear carbonates and/or certain cyclic carbonates other than FEC and VC (e.g., propylene carbonate, ethylene carbonate). EA:EP-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low-temperature performance. In some designs, it may be advantageous to use these electrolyte formulations in batteries characterized by mass loadings of active material (e.g., on the anode) ranging from about 2 mAh/cm$^2$ to about 12 mAh/cm$^2$ (in some designs, from about 4 mAh/cm$^2$ to about 6.5 mAh/cm$^2$). In some designs, it may be advantageous to use these electrolyte formulations in batteries which are charged at current densities ranging from about 8 to about 30 mA/cm$^2$. Such electrolyte designs, with EA:EP as a main co-solvent, may be advantageous over other non-EA or heavier ester-based formulations in automotive-type batteries with high capacity Si anodes due to reduced HT outgassing, DCR, and cell resistance without compromising other performance trade-offs such as cycle life. Such electrolyte formulations, with EA:EP as a main co-solvent, may be advantageously used to supplant incumbent carbonate-based electrolyte recipes (which are currently used in some automotive batteries), which tend to exhibit higher viscosity, lower conductivity, higher cell resistance, higher bulk resistance, higher charge-transfer resistance, higher diffusion resistance, poorer low temperature performance, poorer cycle life, and lower formation efficiency.

In some designs, MB (420), a linear ester, contributes to lower viscosity, higher conductivity, higher discharge voltages, higher VED, higher GED, higher formation efficiency, better C-rate performance, better fast charge performance, higher cycle life, reduced resistance, and better low-temperature performance. The viscosity of MB is less than about 1 cP at about 20° C. In some designs, the composition of a battery electrolyte with MB as a main co-solvent may be advantageously designed to achieve viscosity of an electrolyte solution of below about 2.6 cP at about 25° C. MB has been found to function as a superior solvent or co-solvent for certain lithium salts such as LiPF$_6$. In some designs, the composition of a battery electrolyte with MB as a main co-solvent may be advantageously designed to achieve ionic conductivity of an electrolyte solution of above about 13.5 mS/cm at about 25° C. The density of MB is about 0.9 g/cm$^3$ at about 25° C. In some designs, the composition of a battery electrolyte with MB as a main co-solvent may be advantageously designed to achieve densities of an electrolyte solution of equal to or less than about 1.1 g/cm$^3$. In some designs, such electrolyte formulations, with MB as a main co-solvent, may be advantageously used to decrease DCR, internal cell resistance, hysteresis, bulk resistance, charge transfer resistance and diffusion resistance across different temperatures. Such electrolyte designs may be particularly useful to decrease diffusion resistance in cathode and anode coatings in automotive battery cells, which typically feature thick and dense coatings. Such electrolyte designs, with MB as a main co-solvent, may be particularly advantageous for low-temperature cycling and for fast-charge applications. In some designs, electrolytes with MB as a main co-solvent, may exhibit higher high-temperature outgassing and higher end-of-life outgassing. In some designs, it may be advantageous to use electrolyte additives to reduce HT outgassing of electrolyte composition with MB as a main co-solvent. In some designs, Li salt additives may be advantageously used to reduce HT outgassing of MB-based formulations. Herein, electrolytes with MB as a main co-solvent (e.g., mole fraction of MB in the electrolyte is about 20-26 mol. % or more, mole fraction of MB in the electrolyte is about 40 mol. % or more, mole fraction of MB in the electrolyte is in a range of about 40 mol. % to about 85 mol. %, mole fraction of MB in the electrolytes is in a range of about 40 mol. % to about 75 mol. %, etc.) may be referred to as MB-based electrolytes. In some designs, nitrile additives may be advantageously used to reduce HT outgassing of MB-based formulations. In some designs, sulfur-comprising additives may be advantageously used to reduce HT outgassing in MB-based formulations. In some designs, phosphorus-based additives may be advantageously used to reduce HT outgassing in MB-based formulations. The inventors have found that, in some designs, FEC and VC may be preferably used to decrease EoL outgassing in MB-based formulations. Accordingly, in some designs, a mole fraction of MB in the electrolyte may preferably be in a range of approximately 20-26 mol. % to about 85 mol. % (in some designs, from about 40 mol. % to approximately 75 mol. %). MB-based electrolyte formulations may be improved further by incorporating FEC and VC. MB-based electrolyte formulations comprising FEC and VC may be improved yet further by incorporating certain Li salt additives, certain nitrile additives, and/or certain sulfur-comprising additives, as described in greater detail herein. MB-based electrolyte formulations comprising FEC and VC may be improved yet further by decreasing or eliminating linear carbonates and/or certain cyclic carbonates other than FEC and VC (e.g., propylene carbonate, ethylene carbonate). MB-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low-temperature performance. In some designs, it may be advantageous to use these electrolyte formulations in batteries characterized by mass loadings of active material (e.g., on the anode) ranging from about 2 to about 12 mAh/cm$^2$ (in some designs, from about 4 to about 6.5 mAh/cm$^2$). In some designs, it may be advantageous to use these electrolyte formulations in batteries which are charged at current densities ranging from about 8 to about 30 mA/cm$^2$. Such electrolyte formulations, with MB as a main co-solvent, may be advantageously used to supplant incumbent carbonate-based electrolyte recipes (which are currently used in some automotive batteries), which tend to exhibit higher viscosity, lower conductivity, higher cell resistance, higher bulk resistance, higher charge-transfer resistance, higher diffusion resistance, poorer low temperature performance, poorer cycle life, and lower formation efficiency.

In some designs, PP (414), a linear ester, contributes to lower viscosity, higher conductivity, higher discharge voltages, higher VED, higher GED, higher formation efficiency, better C-rate performance, better fast charge performance, higher cycle life, reduced resistance, and better low-temperature performance. The viscosity of PP is less than about 1 cP at about 20° C. In some designs, the composition of a battery electrolyte with PP as a main co-solvent may be advantageously designed to achieve viscosity of an electrolyte solution of below about 2.8 cP at about 25° C. In some designs, the composition of a battery electrolyte with MB as a main co-solvent may be advantageously designed to achieve ionic conductivity of a solution of above about 13.0 mS/cm at about 25° C. The density of PP is about 0.88 g/cm$^3$ at about 25° C. In some designs, the composition of a battery electrolyte with PP as a main co-solvent may be advantageously designed to achieve densities of a solution of equal to or less than about 1.1 g/cm$^3$. In some designs, such electrolyte formulations, with PP as a main co-solvent, may be advantageously used to decrease DCR, internal cell resistance, hysteresis, bulk resistance, charge transfer resistance and diffusion resistance across different temperatures. Such electrolyte designs may be particularly useful to decrease diffusion resistance in cathode and anode coatings in automotive battery cells, which typically feature thick and dense coatings. Such electrolyte designs, with PP as a main co-solvent, may be particularly advantageous for low-temperature cycling and for fast-charge applications. In some designs, electrolytes with PP as a main co-solvent may exhibit higher high-temperature outgassing and higher end-of-life outgassing. In some designs, it may be advantageous to use electrolyte additives to reduce HT outgassing of electrolyte composition with PP as a main co-solvent. In some designs, Li salt additives may be advantageously used to reduce HT outgassing of PP-based formulations. Herein, electrolytes with PP as a main co-solvent (e.g., mole fraction of PP in the electrolyte is about 20-26 mol. % or more, mole fraction of PP in the electrolyte is about 40 mol. % or more, mole fraction of PP in the electrolyte is in a range of about 40 mol. % to about 55 mol. %, mole fraction of PP in the electrolytes is in a range of about 40 mol. % to about 75 mol. %, etc.) may be referred to as PP-based electrolytes. In some designs, nitrile additives may be advantageously used to reduce HT outgassing of PP-based formulations. In some designs, sulfur-comprising additives may be advantageously used to reduce HT outgassing in PP-based formulations. In some designs, phosphorus-based additives may be advantageously used to reduce HT outgassing in PP-based formulations. The inventors have found that, in some designs, FEC and VC may be preferably used to decrease EoL outgassing in PP-based formulations. Accordingly, in some designs, a mole fraction of PP in the electrolyte may preferably be in a range of approximately 20 mol. % to about 85 mol. % (in some designs, from about 40 mol. % to approximately 75 mol. %). PP-based electrolyte formulations may be improved further by incorporating FEC and VC. PP-based electrolyte formulations comprising FEC and VC may be improved yet further by incorporating certain Li salt additives, certain nitrile additives, and/or certain sulfur-comprising additives, as described in greater detail herein. PP-based electrolyte formulations comprising FEC and VC may be improved yet further by decreasing or eliminating linear carbonates and/or certain cyclic carbonates other than FEC and VC (e.g., propylene carbonate, ethylene carbonate). PP-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low-temperature performance. In some designs, it may be advantageous to use these electrolyte formulations in batteries characterized by mass loadings of active material (e.g., on the anode) ranging about 2 to about 12 mAh/cm$^2$ (in some designs, from about 4 to about 6.5 mAh/cm$^2$). In some designs, it may be advantageous to use these electrolyte formulations in batteries which are charged at current densities ranging from about 8 to about 30 mA/cm$^2$. Such electrolyte formulations, with PP as a main co-solvent, may be advantageously used to supplant incumbent carbonate-based electrolyte recipes (which are currently used in some automotive batteries), which tend to exhibit higher viscosity, lower conductivity, higher cell resistance, higher bulk resistance, higher charge-transfer resistance, higher diffusion resistance, poorer low temperature performance, poorer cycle life, and lower formation efficiency.

In some designs, EI (416), a branched ester, contributes to lower viscosity, higher conductivity, higher discharge voltages, higher VED, higher GED, higher formation efficiency, higher cycle life, reduced HT outgassing, reduced EoL outgassing, and better low-temperature performance. In some designs, electrolytes with EI as a main co-solvent, may be advantageously used for applications which require high flash-point solvents. In some designs, the composition of a battery electrolyte with EI as a main co-solvent may be advantageously designed to achieve viscosity of a solution of below about 3.5 cP at about 25° C. In some designs, the composition of a battery electrolyte with EI as a main co-solvent may be advantageously designed to achieve ionic conductivity of an electrolyte solution of above about 9 mS/cm at about 25° C. The density of EI is about 0.87 g/cm$^3$ at about 25° C. In some designs, the composition of a battery electrolyte with EI as a main co-solvent may be advantageously designed to achieve densities of a solution of equal to or less than about 1.1 g/cm$^3$. Such electrolyte designs, with EI as a main co-solvent, are particularly advantageous for low-temperature cycling and for fast-charge applications in thin consumer coatings. In some designs, electrolytes with EI as a main co-solvent, may lead to reduced high-temperature outgassing and reduced end-of-life outgassing. In some designs, it is advantageous to use electrolyte additives to reduce resistance contributions of electrolyte composition with EI as a main co-solvent. In some designs, Li salt additives may be advantageously used to reduce resistance contributions of EI-based formulations. Herein, electrolytes with EI as a main co-solvent (e.g., mole fraction of EI in the electrolyte is about 20-26 mol. % or more, mole fraction of EI in the electrolyte is about 40 mol. % or more, mole fraction of EI in the electrolyte is in a range of about 40 mol. % to about 85 mol. %, mole fraction of EI in the electrolytes is in a range of about 40 mol. % to about 75 mol. %, etc.) may be referred to as EI-based electrolytes. In some designs, nitrile additives may be advantageously used to reduce resistance contributions of EI-based formulations. In some designs, sulfur-comprising additives may be advantageously used to reduce resistance contributions of EI-based formulations. In some designs, FEC and VC are preferably used to decrease EoL outgassing in EI-based formulations. Accordingly, in some designs, a mole fraction of EI in the electrolyte may preferably be in a range of approximately 20-26 mol. % to about 85 mol. % (in some designs, from about 40 mol. % to approximately 75 mol. %). EI-based electrolyte formulations may be improved further by incorporating FEC and VC. EI-based electrolyte formulations comprising FEC and VC may be improved yet further by incorporating certain Li salt additives, certain nitrile additives, and/or certain sulfur-comprising additives, as described in greater detail herein. EI-based electrolyte formulations comprising FEC and VC may be improved yet further by decreasing or eliminating linear carbonates and/or certain cyclic carbonates other than FEC and VC (e.g., propylene carbonate, ethylene carbonate). EI-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low-temperature performance. In some designs, it may be advantageous to use these electrolyte formulations in batteries with mass loadings of active material (e.g., on the anode) ranging from about 2 to about 4-5 mAh/cm². In some designs, it may be advantageous to use these electrolyte formulations in batteries which are charged at current densities ranging from about 5 to about 15 mA/cm². Such electrolyte designs, with EI as a main co-solvent, may be advantageous over other non-EI ester-based formulations in consumer-type batteries due to reduced HT outgassing and improved cycle life without compromising other performance trade-offs such as cell resistance and DCIR. Such electrolyte designs, with EI as a main co-solvent, may be advantageously used to supplant incumbent carbonate-based recipes (which are currently used in some consumer-type batteries), which exhibit similar or higher viscosity, similar or lower conductivity, similar or higher cell resistance, similar or higher bulk resistance, similar or higher charge-transfer resistance, similar or higher diffusion resistance, poorer low temperature performance, poorer cycle life, and lower formation efficiency.

In some designs, a combination (e.g., a mixture) of EP (412) and EI (416) (a combination of a linear ester and a branched ester), also referred to as EP:EI herein, contributes to lower viscosity, higher conductivity, higher discharge voltages, higher VED, higher GED, better fast charge performance, better C-rate performance, higher cycle life, reduced resistance, and better low-temperature performance, when compared to formulations comprising EI only as a main co-solvent. In some designs, the composition of a battery electrolyte with EP:EI as a main co-solvent may be advantageously designed to achieve viscosity of an electrolyte solution of below about 3.0 cP at about 25° C. In some designs, the composition of a battery electrolyte with EP:EI as a main co-solvent may be advantageously designed to achieve ionic conductivity of an electrolyte solution of above about 12.0 mS/cm at about 25° C. In some designs, the composition of a battery electrolyte with EP:EI as a main co-solvent may be advantageously designed to achieve densities of an electrolyte solution of equal to or less than about 1.1 g/cm³. In some designs, such electrolyte formulations, with EP:EI as a main co-solvent, may be advantageously used to decrease DCR, internal cell resistance, hysteresis, bulk resistance, charge transfer resistance and diffusion resistance across different temperatures. Such electrolyte designs may be particularly useful to decrease diffusion resistance in cathode and anode coatings in consumer battery cells, which typically feature thin coatings. Such electrolyte designs, with EP:EI as a main co-solvent, may be particularly advantageous for low-temperature cycling and for fast-charge applications in consumer-type batteries. In some designs, electrolytes with EP:EI as a main co-solvent, may lead to reduced high-temperature outgassing and reduced end-of-life outgassing. In some designs, it may be advantageous to use electrolyte additives to simultaneously reduce HT outgassing and cell resistance of electrolyte composition with EP:EI as a main co-solvent. In some designs, Li salt additives may be advantageously used to reduce HT outgassing and cell resistance of EP:EI-based formulations. Herein, electrolytes with EP:EI as a main co-solvent (e.g., mole fraction of EP:EI in the electrolyte is about 26 mol. % or more, mole fraction of EP:EI in the electrolyte is about 40 mol. % or more, mole fraction of EP:EI in the electrolyte is in a range of about 40 mol. % to about 85 mol. %, mole fraction of EP:EI in the electrolytes is in a range of about 40 mol. % to about 75 mol. %, etc.) may be referred to as EP:EI-based electrolytes. In some designs, nitrile additives may be advantageously used to reduce HT outgassing and cell resistance of EP:EI-based formulations. In some designs, sulfur-comprising additives may be advantageously used to reduce HT outgassing and cell resistance of EP:EI-based formulations. In some designs, FEC and VC may be preferably used to decrease EoL outgassing in EP:EI-based formulations. Accordingly, in some designs, a mole fraction of EP:EI in the electrolyte may preferably be in a range of approximately 20 mol. % to about 85 mol. % (in some designs, from about 40 mol. % to approximately 75 mol. %). EP:EI-based electrolyte formulations (e.g., electrolyte formulations in which EP:EI is present in the electrolyte in any of the foregoing mole fractions) may be improved further by incorporating FEC and VC. EP:EI-based electrolyte formulations comprising FEC and VC may be improved yet further by incorporating certain Li salt additives, certain nitrile additives, and/or certain sulfur-comprising additives, as described in greater detail herein. EP:EI-based electrolyte formulations comprising FEC and VC may be improved yet further by decreasing or eliminating linear carbonates and/or certain cyclic carbonates other than FEC and VC (e.g., propylene carbonate, ethylene carbonate). EP:EI-based electrolyte formulations comprising FEC and VC may be improved yet further by incorporating certain Li salt additives, certain nitrile additives, and/or certain sulfur-comprising additives, as described in greater detail herein, and decreasing or eliminating linear carbonates and/or certain cyclic carbonates other than FEC and VC (e.g., propylene carbonate, ethylene carbonate). Such improvements to the electrolyte formulations may be advantageously used to optimize performance, including high VED, high cycle life, low cell resistance, reduced HT outgassing, reduced EoL outgassing, improved fast charge, and improved low temperature performance. In some designs, it may be advantageous to use these electrolyte formulations in batteries with mass loadings of active material (e.g., on the anode) from about 2 to about 4-5 mAh/cm². In some other designs, it may be advantageous to use these electrolyte formulations in batteries which are charged at current densities ranging from about 5 to about 15 mA/cm². Such electrolyte designs, with EP:EI as a main co-solvent, may be advantageous over other non-EI ester-based formulations in consumer-type batteries due to reduced HT outgassing and improved cycle life without compromising other performance trade-offs such as cell resistance and DCIR. Such electrolyte designs, with EP:EI as a main co-solvent, may be advantageously used to supplant incumbent carbonate-based recipes (which are currently used in some consumer-type batteries), which exhibit higher viscosity, lower conductivity, higher cell resistance, higher bulk resistance, higher charge-transfer resistance, higher diffusion resistance, poorer low temperature performance, poorer cycle life, and lower formation efficiency. Some of the EP-based, EA:EP-based, MB-based, PP-Based, EI-based, and EP:EI-based electrolyte formulations introduced herein are examples of "ester-based" electrolyte formulations, as discussed further hereinbelow.

In one or more embodiments of the present disclosure, a preferred electrolyte for a lithium-ion battery may include $LiPF_6$ salt and an organic compound composition. In some designs, the organic compound composition includes: (1) vinylene carbonate (VC), (2) fluoroethylene carbonate (FEC), and (3) at least one ester (ES). A mole fraction of the $LiPF_6$ in the electrolyte is approximately $c(LiPF_6)$ mol. %. A mole fraction of the VC in the electrolyte is approximately $c(VC)$ mol. %. A mole fraction of the FEC in the electrolyte is approximately $c(FEC)$ mol. %. A mole fraction of the ES in the electrolyte is approximately $c(ES)$ mol. %. As implied by the term "mole fraction", a sum of (1) the foregoing mole fractions ($c(LiPF_6)$, $c(VC)$, $c(FEC)$, and $c(ES)$) and (2) mole fractions attributable to any other components of the electrolyte (e.g., the mole fractions of any cyclic carbonates other than VC and FEC, linear carbonates, other co-solvent compounds, lithium salt additives, nitrile additives, sulfur-comprising additives, and other additives) should be about 100%. In some designs, these foregoing mole fractions $c(LiPF_6)$, $c(VC)$, $c(FEC)$, and $c(ES)$ may satisfy Relations 1-1 through 1-4:

$$8 \leq c(LiPF_6) \leq 16 \quad \text{(Relation 1-1);}$$

$$0.5 \leq c(VC) \leq 5 \quad \text{(Relation 1-2);}$$

$$10 \leq c(FEC) \leq 26 \quad \text{(Relation 1-3); and}$$

$$40 \leq c(ES) \leq 75 \quad \text{(Relation 1-4).}$$

Electrolyte formulations that comprise $LiPF_6$ salt, VC, FEC, and ES, and satisfy the foregoing Relations 1-1 through 1-4 are sometimes referred to as ester-based electrolytes herein because of the relatively high mole fraction of the ES in the electrolyte (e.g., ranging from about 40 mol. % to about 75 mol. %.) In some implementations, certain characteristics of electrolytes may be improved by increasing the ES mole fraction, such as by setting the mole fraction of the ES in a range of about 50 mol. % to about 75 mol. %, in a range of about 60 mol. % to about 75 mol. %, or in a range of about 60 mol. % to about 85 mol. %. In some implementations, such higher ES mole fractions (e.g., about 50 mol. % to about 60 mol. %, about 60 mol. % to about 75 mol. %, or about 60 mol. % to about 85 mol. %) may enable lower viscosity, higher ionic conductivity, lower density, higher VED, higher GED, leading to reduction of DCR, reduction in cell resistance, increasing of discharge capacity, increasing of fast charging, reducing HT outgassing and improving cycle life.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte satisfying Relations 1-1 through 1-4 above. In some implementations, a preferred electrolyte may additionally be characterized by an ES mole fraction $c(ES)$ that satisfies Relation 1-5:

$$50 \leq c(ES) \leq 75 \quad \text{(Relation 1-5).}$$

In some implementations, a preferred electrolyte may additionally be characterized by an ES mole fraction $c(ES)$ that satisfies Relation 1-6:

$$60 \leq c(ES) \leq 75 \quad \text{(Relation 1-6).}$$

In some implementations, a preferred electrolyte may additionally be characterized by an ES mole fraction $c(ES)$ that satisfies Relation 1-7:

$$50 \leq c(ES) \leq 60 \quad \text{(Relation 1-7).}$$

In one or more embodiments of the present disclosure, a preferred electrolyte for a lithium-ion battery may include $LiPF_6$ salt and an organic compound composition, including VC, FEC, and ES. In some implementations, the ES may comprise one or more of the following ester compounds: methyl acetate (MA), methyl propionate (MP), ethyl acetate (EA), ethyl propionate (EP), propyl propionate (PP), ethyl isobutyrate (EI), methyl isobutyrate (MI), and methyl butyrate (MB). In addition, the ES may comprise other ester compounds such as ethyl trimethylacetate and ethyl isovalerate. Ethyl trimethylacetate and ethyl isovalerate are additional examples of branched esters. The ES (all of the ester compounds in an electrolyte may collectively be regarded as the ES) may comprise one ester compound, two ester compounds, or more than two ester compounds.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise ethyl propionate (EP), and a mole fraction of the EP in the electrolyte may be in a range of approximately 26 mol. % to approximately 85 mol. %. In some implementations, the ES may comprise no ester compounds other than EP. In some implementations, the ES may comprise one or more ester compounds other than EP. In some implementations, the EP mole fraction may be in a range of about 26 mol. % to about 40 mol. %, about 40 mol. % to about 75 mol. %, about 40 mol. % to about 50 mol. %, about 50 mol. % to about 75 mol. %, about 60 mol. % to about 75 mol. %, about 60 mol. % to about 85 mol. %. or about 50 mol. % to about 60 mol. %.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise ethyl isobutyrate (EI), and a mole fraction of the EI in the electrolyte may be in a range of approximately 26 mol. % to approximately 75 mol. %. In some implementations, the ES may comprise no ester compounds other than EI. In some implementations, the ES may comprise one or more ester compounds other than EI. In some implementations, the EI mole fraction may be in a range of about 26 mol. % to about 40 mol. %, about 40 mol. % to about 75 mol. %, about 40 mol. % to about 50 mol. %, about 50 mol. % to about 75 mol. %, about 60 mol. % to about 75 mol. %, about 60 mol. % to about 85 mol. %, or about 50 mol. % to about 60 mol. %.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise ethyl acetate (EA), and a mole fraction of the EA in the electrolyte may be in a range of approximately 20-26 mol. % to approximately 60 mol. %. In some implementations, the ES may comprise no ester compounds other than EA. In some implementations, ES may comprise one or more ester compounds other than EA. In some implementations, the EA mole fraction may be in a range of about 26 mol. % to about 40 mol. %, about 40 mol. % to 60 mol. %, about 40 mol. % to about 50 mol. %, about 50 mol. % to about 60 mol. %, about 60 mol. % to about 75 mol. %, or about 60 mol. % to about 85 mol. %.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise ethyl acetate (EA) and ethyl propionate (EP), and a molar ratio of the EA to the EP may be in a range of 1:4 to 4:1, 1:2 to 2:1, or 1:1.2 to 1.2:1. In some implementations, the ES may comprise no ester compounds other than EA and EP. In some implementations, ES may comprise one or more ester compounds other than EA and EP. In some implementations, the EA:EP (combined) mole fraction may be in a range of about 26 mol. % to about 40 mol. %, about 40 mol. % to about 75 mol. %, about 40 mol. % to about 50 mol. %, about 50 mol. % to about 75 mol. %, about 60 mol. % to about 85 mol. %, or about 50 mol. % to about 60 mol. %.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise ethyl propionate (EP) and ethyl isobutyrate (EI), and a molar ratio of the EP to the EI may be in a range of 1:4 to 4:1, 1:2 to 2:1, or 1:1.2 to 1.2:1. In some implementations, the ES may comprise no ester compounds other than EP and EI. In some implementations, ES may comprise one or more ester compounds other than EP and EI. In some implementations, the EP:EI (combined) mole fraction may be in a range of about 26 mol. % to about 40 mol. %, about 40 mol. % to about 75 mol. %, about 40 mol. % to about 50 mol. %, about 50 mol. % to about 75 mol. %, about 60 mol. % to about 85 mol. %, about 60 mol. % to about 75 mol. %, or about 50 mol. % to about 60 mol. %.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, the preferred electrolyte may additionally satisfy Relations 1-5, 1-6, or 1-7. In some implementations, the ES may comprise a first ester compound and a second ester compound. In some implementations, the first ester compound has a molecular weight of about 90 or less (e.g., methyl acetate (MA) (402 in FIG. 4) (molecular weight (MW)$\approx$74), methyl propionate (MP) (404) (MW$\approx$88), and ethyl acetate (EA) (406) (MW$\approx$88)). In some implementations, the second ester compound has a molecular weight of greater than about 90 (e.g., ethyl propionate (EP) (412) (MW$\approx$102), propyl propionate (PP) (414) (MW$\approx$116), ethyl isobutyrate (EI) (416) (MW$\approx$116), methyl isobutyrate (MI) (418) (MW$\approx$102), and methyl butyrate (MB) (420) (MW$\approx$102)). In some implementations, a molar ratio of the first ester compound to the second ester compound may be in a range of 1:4 to 4:1, 1:2 to 2:1, or 1:1.2 to 1.2:1. In some implementations, the ES may comprise no ester compounds other than the first ester compound and the second ester compound. In some implementations, ES may comprise one or more ester compounds other than the first ester compound and the second ester compound.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, a preferred electrolyte may additionally satisfy Relations 1-5, 1-6, or 1-7. In some implementations, a preferred electrolyte may additionally be characterized by an FEC mole fraction c(FEC) that satisfies Relation 1-8:

$$14 \leq c(FEC) \leq 20 \qquad \text{(Relation 1-8)}.$$

In some implementations, a preferred electrolyte may additionally be characterized by a VC mole fraction c(VC) that satisfies Relation 1-9:

$$0.5 \leq c(VC) \leq 3 \qquad \text{(Relation 1-9)}.$$

In some implementations, a preferred electrolyte may additionally satisfy Relations 1-8 and 1-9.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, a preferred electrolyte may additionally satisfy Relations 1-5, 1-6, or 1-7. In some implementations, a preferred electrolyte may not comprise any cyclic carbonate that is neither VC nor FEC. For convenience, "one or more cyclic carbonates that are neither VC nor FEC" may be referred to as CC herein. In some implementations, a preferred electrolyte may comprise CC, provided, however, that a mole fraction of the CC in the electrolyte is approximately c(CC) mol. %, and c(CC) satisfies Relation 1-10:

$$c(CC) \leq 20 \qquad \text{(Relation 1-10)}.$$

In some implementations, a preferred electrolyte may comprise CC, provided, however, that a mole fraction of the CC in the electrolyte is approximately c(CC) mol. %, and c(CC) satisfies Relation 1-11:

$$c(CC) \leq 10 \qquad \text{(Relation 1-11)}.$$

In some implementations, the CC may comprise propylene carbonate (PC). In some implementations, the CC comprises ethylene carbonate (EC). In some implementations, the CC comprises propylene carbonate (PC) and ethylene carbonate (EC).

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte satisfying Relations 1-1 through 1-4 above. In some implementations, a preferred electrolyte may additionally satisfy Relations 1-5, 1-6, or 1-7. In some implementations, a preferred electrolyte does not comprise any linear carbonate. For convenience, "one or more linear carbonates" may be referred to as LC herein. In some implementations, a preferred electrolyte may comprise LC, provided, however, that a mole fraction of the LC in the electrolyte is approximately c(LC) mol. %, and c(LC) satisfies Relation 1-12:

$$c(LC) \leq 15 \qquad \text{(Relation 1-12).}$$

In some implementations, a preferred electrolyte may comprise LC, provided, however, that a mole fraction of the LC in the electrolyte is approximately c(LC) mol. %, and c(LC) satisfies Relation 1-13:

$$c(LC) \leq 10 \qquad \text{(Relation 1-13).}$$

In some implementations, the LC may comprise one or more of the following: dimethyl carbonate (DMC), ethyl methyl carbonate (EMC), and diethyl carbonate (DEC).

Electrolyte compositions comprising LiPF$_6$ salt and an organic compound composition, including VC, FEC, and ES, that satisfy Relations 1-1 through 1-4 above, are referred to as "ester-based electrolytes" herein. However, the subclasses of ester-based electrolytes that additionally comprise CC and/or LC (e.g., Relations 1-10, 1-11, 1-12, and/or 1-13) are referred to as "ester-carbonate electrolytes" herein to better facilitate discussion of some of their technical characteristics.

In one or more embodiments of the present disclosure, a preferred electrolyte for a lithium-ion battery additionally includes a Li salt additive (LSA). Herein, Li salts that are not LiPF$_6$ may be referred to as Li salt additives (LSA). Some examples of such Li salt additives (LSA) include: lithium difluorophosphate or LiPO$_2$F$_2$ (LFO), lithium difluoro(oxalato)borate (LiDFOB), lithium tetrafluoroborate (LiBF$_4$), and lithium bis(fluorosulfonyl)imide (LiFSI). In some designs, these additive salts may reduce cell charge-transfer resistance (Rct). In some designs, reduction of Rct contributes to increasing the discharge voltage, decreasing DCR, and improving low-temperature or rate performance. In some designs, LFO may be particularly effective in reducing Rct at the anode and cathode and improving the discharge voltage of a battery cell (particularly when implemented with example electrolytes and cell compositions). In some designs, LFO also contributes to mitigation of high-temperature outgassing. In some designs, LiDFOB may be effective in increasing capacity retention at room temperature and improving low-temperature cycling. In some designs, LiDFOB may be effective in maintaining low DCR during cycling. In some designs, LiDFOB may be effective in reducing anode charge-transfer resistance. In some designs, LiDFOB exhibits a tendency for HT outgassing. In some designs, LiBF$_4$ may be effective in reducing HT outgassing. In some designs, LiBF$_4$ exhibits a tendency in reducing capacity retention at room temperature cycling. In some designs, LiFSI may be effective in increasing first cycle efficiency. In some designs, LiFSI may be effective in decreasing DCR and cell resistance. In some designs, LiFSI may be effective in improving electrolyte solution ionic conductivity. In some designs, LiFSI may be effective in reducing HT outgassing. In some designs, LiFSI may work effectively as a good charge-transfer resistance additive for use in Li-ion batteries comprising low-voltage cathodes (e.g., discharge voltage of approximately 4.2 V or less). In some designs, an exemplary application for such batteries comprising low-voltage cathodes is in powering electric vehicles (EVs). On the other hand, in some designs, LiFSI has been found to induce extensive high-temperature outgassing at voltages equal to or greater than approximately 4.4 V. In some designs, a mole fraction of lithium salt additives (LSA) in the electrolyte may preferably be in a range of approximately 0.3 mol. % to approximately 5.0 mol %. In some designs, there may be a tendency for a reduction of cycle life when the mole fraction of Li salt additives (LSA) in the electrolyte is greater than approximately 5.0 mol. %.

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, a preferred electrolyte may additionally satisfy Relations 1-5, 1-6, or 1-7. In some implementations, a preferred electrolyte may comprise at least one lithium salt additive (LSA), and a mole fraction of the LSA in the electrolyte is approximately c(LSA) mol. %. In some implementations, a preferred electrolyte may additionally be characterized by an LSA mole fraction c(LSA) that satisfies Relation 1-14:

$$0.3 \leq c(LSA) \leq 5.0 \qquad \text{(Relation 1-14).}$$

In some implementations, a preferred electrolyte may additionally be characterized by an LSA mole fraction c(LSA) that satisfies Relation 1-15:

$$0.3 \leq c(LSA) \leq 2.5 \qquad \text{(Relation 1-15).}$$

In some implementations, the LSA comprises one or more of the following: lithium difluorophosphate (LFO), lithium difluoro(oxalato)borate (LiDFOB), lithium tetrafluoroborate (LiBF$_4$), and lithium bis(fluorosulfonyl)imide (LiFSI).

In one or more embodiments of the present disclosure, a preferred electrolyte for a lithium-ion battery may include LiPF$_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte may additionally comprise at least one lithium salt additive (LSA). In some implementations, the LSA comprises LFO and a mole fraction of the LFO in the electrolyte is in a range of approximately 0.3 mol. % to approximately 1.0 mol. %. In some implementations, the LSA comprises LiFSI and a mole fraction of the LiFSI in the electrolyte is in a range of approximately 1.6 mol. % to approximately 2.0 mol. %. In some implementations, the LSA comprises LiDFOB and a mole fraction of the LiDFOB in the electrolyte is in a range of approximately 0.8 mol. % to approximately 2.0 mol. %.

Figure 5:
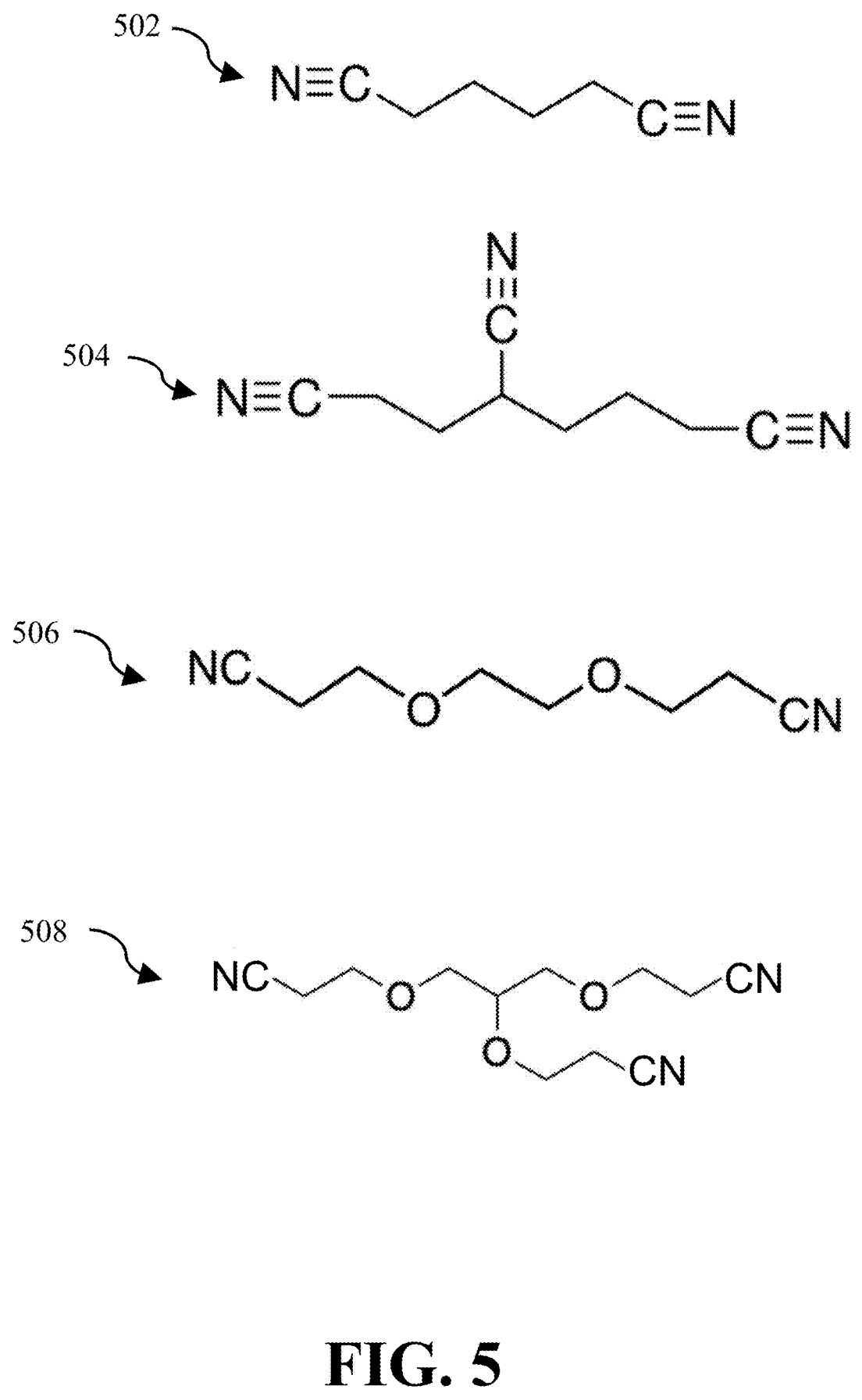

In one or more embodiments of the present disclosure, a preferred electrolyte for a Li-ion battery may additionally include one or more nitrile additives (NA). FIG. 5 shows four examples of such additives (NA): adiponitrile (ADN) (502), 1,3,6-hexanetricarbonitrile (HTCN) (504), ethyleneglycol bis(propionitrile)ether (EGBE) (506), and 3-{[1, 3-bis(2-cyanoethoxy)propan-2-yl]oxy}propanenitrile (ETCN) (508). In some designs, ADN may be effective in reducing HT outgassing. In some designs, ADN may be effective in reducing anode charge-transfer resistance. In some designs ADN may be effective in reducing cathode charge transfer resistance. In some designs, ADN may be effective in decreasing DCR. In some designs, ADN may be effective in increasing capacity retention during room temperature cycling. In some designs, ADN may be effective in reducing transition metal dissolution and Li plating on the anode. In some preferred mole fraction ranges, ADN may have a minimal effect on ionic conductivity and viscosity of the ester-based electrolyte formulations described herein. In some designs, HTCN may be effective in reducing HT outgassing. In some designs, ETCN may induce high anode and cathode charge-transfer resistances which may be beneficial for fast charge applications at high temperature cycling conditions. In some other designs, HTCN may induce high anode and cathode charge-transfer resistances which may be less preferable for low-temperature cycling. In some designs, HTCN may induce increased DCR. In some designs, HTCN may decrease capacity retention during room temperature cycling. In some designs, HTCN may be effective in reducing transition metal dissolution and Li plating on the anode. In some preferred mole fraction ranges, HTCN may have a minimal effect on ionic conductivity and viscosity of the ester-based electrolyte formulations described herein. In some designs, EGBE may be effective in reducing HT outgassing. In some other designs, EGBE may induce high anode and cathode charge-transfer resistances which may be less preferable for fast charge and low temperature cycling. In some designs, EGBE may induce increased DCR. In some other designs, EGBE may decrease capacity retention during room temperature cycling. In some other designs, EGBE may be effective in reducing transition metal dissolution and Li plating on the anode. In some preferred mole fraction range, EGBE may have a minimal effect on ionic conductivity and viscosity of the ester-based electrolyte formulations described herein. In some designs, ETCN may be effective in reducing HT outgassing. In some designs, ETCN may induce high anode and cathode charge-transfer resistances which may be beneficial for fast charge applications at high temperature cycling conditions. In some other designs, ETCN may induce high anode and cathode charge-transfer resistances which may be less preferable for fast charge and low temperature cycling. In some designs, ETCN may induce increased DCR. In some designs, ETCN may decrease capacity retention during room temperature cycling. In some designs, ETCN may be effective in reducing transition metal dissolution and Li plating on the anode. In some preferred mole fraction ranges, ETCN may have a minimal effect on ionic conductivity and viscosity of the ester-based electrolyte formulations described herein. In some designs, a mole fraction of NA in the electrolyte is preferably in a range of approximately 0.1 mol. % to approximately 2.8 mol. %. In some designs, the nitrile additives (NA) may be effective in mitigating high-temperature outgassing and may be used singly or in combination with each other.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte may additionally comprise at least one lithium salt additive (LSA). In some implementations, a preferred electrolyte may additionally comprise one or more nitrile additives (NA). A mole fraction of nitrile additives (NA) in the electrolyte is approximately c(NA) mol. %. In some designs, the mole fractions c(NA) may preferably satisfy Relation 1-16:

$$0.1 \leq c(NA) \leq 2.8 \qquad \text{(Relation 1-16)}.$$

In some implementations, the NA comprises one or more of the following: adiponitrile (ADN), 1,3,6-hexanetricarbonitrile (HTCN), ethyleneglycol bis(propionitrile)ether (EGBE), and 3-{[1,3-bis(2-cyanoethoxy)propan-2-yl]oxy}propanenitrile (ETCN).

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte may additionally comprise at least one lithium salt additive (LSA). In some implementations, a preferred electrolyte may additionally comprise one or more nitrile additives (NA). In some implementations, the NA comprises ADN and a mole fraction of the ADN in the electrolyte is in a range of approximately 0.3 mol. % to approximately 1.8 mol. %. In some implementations, the NA comprises HTCN and a mole fraction of the HTCN in the electrolyte is in a range of approximately 0.1 mol. % to approximately 0.9 mol. %.

Figure 6:
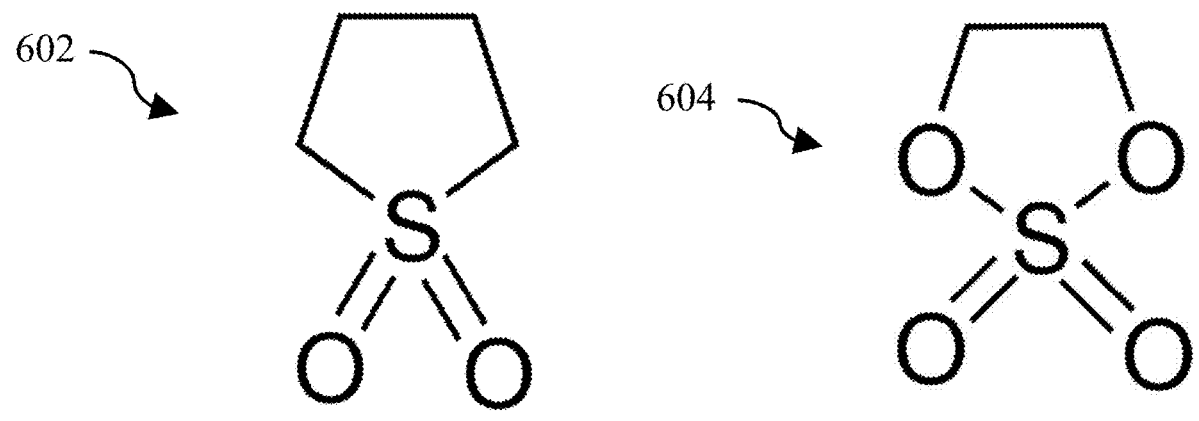
FIG. 6 illustrates examples of sulfur-comprising additive compounds.
Figure 6:
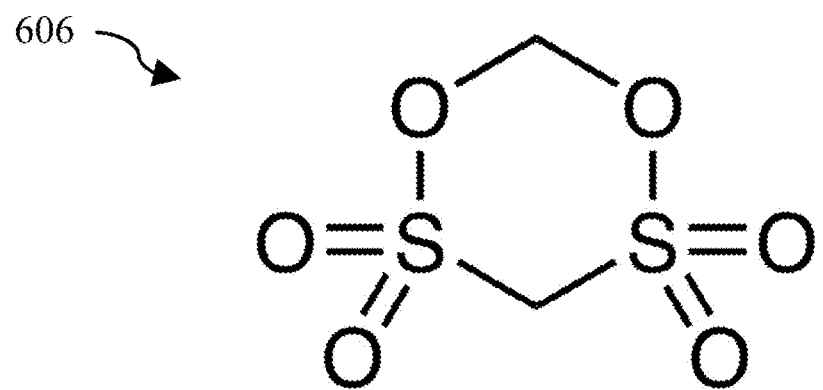
Figure 6:
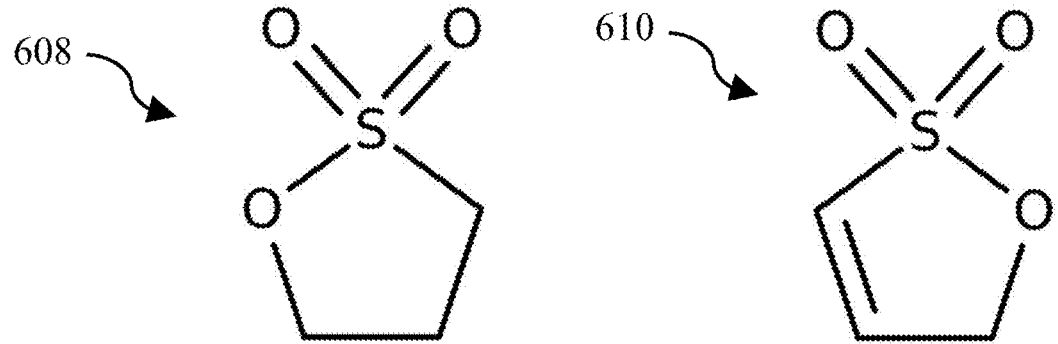

In one or more embodiments of the present disclosure, a preferred electrolyte for a Li-ion battery may additionally include one or more sulfur-comprising additives (SA). FIG. 6 shows five examples of such sulfur-comprising additives (SA): sulfolane (602), 1,3,2-dioxathiolane 2,2-dioxide (DTD) (604), methylene methanedisulfonate (MMDS) (606), propane sultone (PS) (608), and propene sultone (PES) (610). In some designs, sulfolane may be effective in reducing HT outgassing. In some designs, sulfolane may be effective in reducing anode charge-transfer resistance. In some designs, sulfolane may be effective in decreasing DCR. In some designs, sulfolane may be effective in increasing capacity retention during room temperature cycling. In some preferred mole fraction ranges, sulfolane may have a minimal effect on ionic conductivity and viscosity of the ester-based electrolyte formulations described herein. In some designs, DTD may be effective in reducing HT outgassing. In some designs, DTD may be effective in reducing anode and cathode charge-transfer resistances. In some designs, DTD may be effective in decreasing DCR. In some designs, DTD may be effective in increasing capacity retention during room temperature cycling. In some designs, DTD may be beneficial for fast charge applications at high temperature cycling conditions. In some preferred mole fraction ranges, DTD may have a minimal effect on ionic conductivity and viscosity of the ester-based electrolyte formulations described herein. In some designs, MMDS may be effective in reducing HT outgassing. In some other designs, MMDS may induce high anode and cathode charge-transfer resistances which may be less preferable for fast charge and low temperature cycling. In some designs, MMDS may induce increased DCR. In some designs, MMDS may be beneficial for fast charge applications at high temperature cycling conditions. In some other designs, MMDS may decrease capacity retention during room temperature cycling. In some preferred mole fraction ranges, MMDS may have a minimal effect on ionic conductivity and viscosity of the ester-based electrolyte formulations described herein. In some designs, PS may be effective in reducing HT outgassing. In some designs, PS may be beneficial for fast charge applications at high temperature cycling conditions. In some other designs, PS may induce high anode charge-transfer resistance which may be less preferable for low temperature cycling. In some designs, PS may induce increased DCR. In some other designs, PS may decrease capacity retention during room temperature cycling. In some other designs, PS may be effective in reducing transition metal dissolution. In some preferred mole fraction ranges, PS may have a minimal effect on ionic conductivity and viscosity of the ester-based electrolyte formulations described herein. In some designs, PES may be effective in reducing HT outgassing. In some other designs, PES may induce high anode charge-transfer resistance which may be less preferable for low temperature cycling. In some designs, PES may induce increased DCR. In some designs, PES may be beneficial for fast charge applications at high temperature cycling conditions. In some other designs, PES may decrease capacity retention during room temperature cycling. In some other designs, PES may be effective in reducing transition metal dissolution. In some preferred mole fraction range, PES may have a minimal effect on ionic conductivity and viscosity of the ester-based electrolyte formulations described herein. In some designs, a mole fraction of SA in the electrolyte is preferably in a range of approximately 0.1 mol. % to approximately 2.8 mol. %. In some designs, the sulfur-comprising additives (SA) may be effective in mitigating high-temperature outgassing and increased cell resistance and may be used singly or in combination with each other.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte may additionally comprise at least one lithium salt additive (LSA). In some implementations, a preferred electrolyte may additionally comprise one or more sulfur-comprising additives (SA). A mole fraction of sulfur-comprising additive additives (SA) in the electrolyte is approximately c(SA) mol. %. In some designs, the mole fraction c(SA) may preferably satisfy Relation 1-17:

$$0.1 \leq c(SA) \leq 2.8 \qquad \text{(Relation 1-17).}$$

In some implementations, the SA comprises one or more of the following: sulfolane, 1,3,2-dioxathiolane 2,2-dioxide (DTD), methylene methanedisulfonate (MMDS), propane sultone (PS), and propene sultone (PES).

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte may additionally comprise at least one lithium salt additive (LSA). In some implementations, a preferred electrolyte may additionally comprise one or more sulfur-comprising additives (SA). In some implementations, the SA comprises PS and a mole fraction of the PS in the electrolyte is in a range of approximately 0.1 mol. % to approximately 1.0 mol. %. In some implementations, the SA comprises PES and a mole fraction of the PES in the electrolyte is in a range of approximately 0.1 mol. % to approximately 1.5 mol. %. In some implementations, the SA comprises sulfolane and a mole fraction of the sulfolane in the electrolyte is in a range of approximately 0.1 mol. % to approximately 1.0 mol. %. In some implementations, the SA comprises DTD and a mole fraction of the DTD in the electrolyte is in a range of approximately 0.1 mol. % to approximately 1.0 mol. %.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a preferred electrolyte for a Li-ion battery may additionally include one or more other additives (OA). Herein, certain additives that are not any of the following are characterized as "other additives" (OA): lithium-salt additives (LSA), nitrile additives (NA), and sulfur-comprising additives (SA). An illustrative example of such other additives (OA) is: tris(trimethylsilyl)phosphite (TMSPi). In some designs, TMSPi may be effective in reducing HT outgassing. In some designs, TMSPi may be effective in reducing anode charge-transfer resistance. In some designs, TMSPi may be effective in decreasing DCR. In some designs, TMSPi may be effective in increasing capacity retention during room temperature cycling. In some preferred mole fraction ranges, TMSPi may have a minimal effect on ionic conductivity and viscosity of the ester-based electrolyte formulations described herein. In some designs, a mole fraction of OA in the electrolyte is preferably in a range of approximately 0.1 mol. % to approximately 2.8 mol. %. In some designs, the other additives (OA) may be effective in mitigating high-temperature outgassing and increased cell resistance and may be used singly or in combination with each other. In some designs, a mole fraction of TMSPi in the electrolyte is preferably in a range of approximately 0.1 mol. % to approximately 2.8 mol. %.

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, the preferred electrolyte may additionally comprise one, two, three, or all of the following: at least one lithium salt additive (LSA) (e.g., satisfying Relations 1-14 and/or 1-15), at least one nitrile additive (NA) (e.g., satisfying Relation 1-16), at least one sulfur-comprising additive (SA) (e.g., satisfying Relation 1-17), and at least one other additive (e.g., TMSPi or another additive, which may be present in the electrolyte at a mole fraction ranging between about 0.1 mol. % and 2.8 mol. %).

In one or more embodiments of the present disclosure, a preferred electrolyte for a lithium-ion battery may include $LiPF_6$ salt and an organic compound composition, including VC, FEC, and ES. The preferred electrolyte may be an ester-based electrolyte (including an ester-carbonate electrolyte) satisfying Relations 1-1 through 1-4 above. In some implementations, the preferred electrolyte may additionally satisfy Relations 1-5, 1-6, or 1-7. In some implementations, a density of the electrolyte may preferably be around 1.1 $g/cm^3$ or less at about 20° C. In some implementations, a viscosity of the electrolyte may preferably be around 2.6 cP or less at about 25° C. In some implementations, an ionic conductivity of the electrolyte may preferably be around 13 $mS\ cm^{-1}$ or greater at about 25° C. The beneficial effect of ester-based electrolyte formulations exhibiting lower densities may be due to a looser compaction of Li-ion solvation shell compared to linear carbonate-based and/or ethylene carbonate (EC)-based electrolyte formulations. The beneficial effect of ester-based electrolyte formulations exhibiting lower viscosities may be due to a looser compaction of Li-ion solvation shell compared to linear carbonate-based and/or EC-based electrolyte formulations, in which cases the drag force for Li-ion movement would be larger. The beneficial effect of ester-based electrolyte formulations exhibiting higher conductivity is likely due to a faster Li-ion, $PF_6^-$ ion and a free ester solvent conductivities compared to linear carbonate-based and/or EC-based electrolyte formulations, in which case more dissociated $LiPF_6$ would tend to lower conductivity.

In one or more embodiments of the present disclosure, an electrolyte for a lithium-ion battery may include $LiPF_6$ salt and an organic compound composition. In some designs, the organic compound composition includes: (1) vinylene carbonate (VC), (2) fluoroethylene carbonate (FEC), (3) ethylene carbonate (EC), and (4) at least one linear carbonate (LC). A mole fraction of the $LiPF_6$ in the electrolyte is approximately $c(LiPF_6)$ mol. %. A mole fraction of the VC in the electrolyte is approximately $c(VC)$ mol. %. A mole fraction of the FEC in the electrolyte is approximately $c(FEC)$ mol. %. A mole fraction of the EC in the electrolyte is approximately $c(EC)$ mol. %. A mole fraction of the LC in the electrolyte is approximately $c(LC)$ mol. %. As implied by the term "mole fraction", a sum of (1) the foregoing mole fractions ($c(LiPF_6)$, $c(VC)$, $c(FEC)$, $c(EC)$, and $c(LC)$) and (2) mole fractions attributable to any other components of the electrolyte (e.g., the mole fractions of other co-solvent compounds, lithium salt additives, nitrile additives, sulfur-comprising additives, and other additives) should be about 100%. In some designs, these foregoing mole fractions $c(LiPF_6)$, $c(VC)$, $c(FEC)$, $c(ES)$, and $c(LC)$ satisfy Relations 2-1 through 2-5:

$$6 \le c(LiPF_6) \le 15 \qquad \text{(Relation 2-1)};$$

$$0.3 \le c(VC) \le 3 \qquad \text{(Relation 2-2)};$$

$$5 \le c(FEC) \le 26 \qquad \text{(Relation 2-3)};$$

$$10 \le c(EC) \le 30 \qquad \text{(Relation 2-4)}; \text{ and}$$

$$50 \le c(LC) \le 75 \qquad \text{(Relation 2-5)}.$$

In some implementations, a molar average molecular weight of the LC may be 95 or lower. Consider an example in which an electrolyte contains a linear carbonate dimethyl carbonate (DMC) (MW≈90) and a linear carbonate ethyl methyl carbonate (EMC) (MW≈104), and they are present in the electrolyte in a molar ratio of DMC to EMC of 15:1. Note that this example electrolyte does not contain any linear carbonates other than DMC and EMC. A molar average molecular weight of the LC is calculated as follows: $(15 \times 90 + 1 \times 104)/(15+1) \approx 90.9$. In some implementations, a molar average molecular weight of the LC may be 93 or lower. In some implementations, a molar average molecular weight of the LC may be 92 or lower. In some implementations, a molar average molecular weight of the LC may be 91 or lower.

Electrolyte formulations that comprise $LiPF_6$ salt, VC, FEC, EC, and LC, and satisfy the foregoing Relations 2-1 through 2-5 are sometimes referred to as carbonate-based electrolytes herein because of the relatively high mole fraction of cyclic carbonates other than FEC and VC (e.g., mole fraction of EC ranges from about 10 mol. % to about 30 mol. %) and linear carbonates (e.g., mole fraction of LC ranges from about 50 mol. % to about 75 mol. %).

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, the electrolyte does not comprise any propylene carbonate (PC). In some implementations, the electrolyte may not comprise any diethyl carbonate (DEC). In some implementations, the LC comprises dimethyl carbonate (DMC) and ethyl methyl carbonate (EMC). In some implementations, the LC may comprise dimethyl carbonate (DMC) and ethyl methyl carbonate (EMC) and a molar ratio of the DMC to the EMC is in a range of 10:1 to 20:1.

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, an electrolyte may comprise at least one lithium salt additive (LSA), and a mole fraction of the LSA in the electrolyte is approximately $c(LSA)$ mol. %. In some implementations, an electrolyte may additionally be characterized by an LSA mole fraction $c(LSA)$ that satisfies Relation 2-6:

$$0.3 \le c(LSA) \le 5.0 \qquad \text{(Relation 2-6)}.$$

In some implementations, an electrolyte may additionally be characterized by an LSA mole fraction $c(LSA)$ that satisfies Relation 2-7:

$$0.3 \le c(LSA) \le 2.5 \qquad \text{(Relation 2-7)}.$$

In some implementations, the LSA comprises one or more of the following: lithium difluorophosphate (LFO), lithium difluoro(oxalato)borate (LiDFOB), lithium tetrafluoroborate ($LiBF_4$), and lithium bis(fluorosulfonyl)imide (LiFSI).

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, an electrolyte may additionally comprise at least one lithium salt additive (LSA). In some implementations, an electrolyte may additionally comprise one or more nitrile additives (NA). A mole fraction of nitrile additives (NA) in the electrolyte is approximately $c(NA)$ mol. %. In some designs, the mole fractions $c(NA)$ may preferably satisfy Relation 16:

$$0.1 \le c(NA) \le 2.8 \qquad \text{(Relation 2-8)}.$$

In some implementations, the NA comprises one or more of the following: adiponitrile (ADN), 1,3,6-hexanetricarbonitrile (HTCN), ethyleneglycol bis(propionitrile)ether (EGBE), and 3-{[1,3-bis(2-cyanoethoxy)propan-2-yl]oxy}propanenitrile (ETCN).

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, an electrolyte may additionally comprise at least one lithium salt additive (LSA). In some implementations, an electrolyte may additionally comprise one or more sulfur-comprising additives (SA). A mole fraction of sulfur-comprising additive additives (SA) in the electrolyte is approximately c(SA) mol. %. In some designs, the mole fraction c(SA) may preferably satisfy Relation 2-9:

$$0.1 \leq c(SA) \leq 2.8 \qquad \text{(Relation 2-9).}$$

In some implementations, the SA comprises one or more of the following: sulfolane, 1,3,2-dioxathiolane 2,2-dioxide (DTD), methylene methanedisulfonate (MDS), propane sultone (PS), and propene sultone (PES).

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, an electrolyte may additionally include one or more other additives (OA). Herein, certain additives that are not any of the following are characterized as "other additives" (OA): lithium-salt additives (LSA), nitrile additives (NA), and sulfur-comprising additives (SA). An example of such other additives (OA) is: tris(trimethylsilyl)phosphite (TMSPi). In some designs, a mole fraction of OA in the electrolyte is preferably in a range of approximately 0.1 mol. % to approximately 2.8 mol. %. In some designs, a mole fraction of TMSPi in the electrolyte is preferably in a range of approximately 0.1 mol. % to approximately 2.8 mol. %.

In one or more embodiments of the present disclosure, an electrolyte for a lithium-ion battery may include $LiPF_6$ salt and an organic compound composition, including VC, FEC, EC, and LC. The electrolyte may be a carbonate-based electrolyte satisfying Relations 2-1 through 2-5 above. In some implementations, the electrolyte may additionally comprise one, two, three, or all of the following: at least one lithium salt additive (LSA) (e.g., satisfying Relations 2-6 and/or 2-7), at least one nitrile additive (NA) (e.g., satisfying Relation 2-8), at least one sulfur-comprising additive (SA) (e.g., satisfying Relation 2-9), and at least one other additive (e.g., TMSPi or another additive, which may be present in the electrolyte at a mole fraction ranging between about 0.1 mol. % and about 2.8 mol. %).

In one or more embodiments of the present disclosure, any of the foregoing electrolytes (e.g., ester-based electrolytes including the ester-carbonate electrolytes, carbonate-based electrolytes) may be employed in a lithium-ion battery cell. The lithium-ion battery comprises an anode current collector (e.g., a foil of copper or copper alloy), a cathode current collector (e.g., a foil of aluminum or aluminum alloy), an anode disposed on or in the anode current collector, a cathode disposed on or in the cathode current collector, and any of the foregoing electrolytes ionically coupling the anode and the cathode. In some examples, a separator (e.g., a separator film or coating) may be disposed between the anode and the cathode, with at least some of the electrolyte infiltrating or impregnating the separator. The anode may comprise any of suitable anode materials as described herein. For example, the anode may comprise silicon-carbon composite particles comprising silicon and carbon. In some implementations, a mass of the silicon may be in a range of about 3 wt. % to about 80 wt. % of a total mass of the anode. In some cases, at least some of the silicon may be present in the silicon-carbon composite particles as nanosized or nanostructured silicon. For example, the anode may comprise graphitic carbon particles comprising carbon. In some cases, the graphitic carbon particles may be substantially free of silicon. In some cases, the silicon-carbon composite particles and the graphitic carbon particles may both be present in an anode.

In one or more embodiments of the present disclosure, incorporating an ester-based electrolyte with suitable mole fractions of $LiPF_6$, a co-solvent composition (e.g., including certain esters in suitable mole fractions), lithium salt additives (LSA), nitrile additive(s) (NA), sulfur-comprising additive(s) (SA), and other additive(s) (OA) into electrolytes may provide multiple benefits to Li or Li-ion batteries, particularly those that comprise a subclass of high-capacity moderate volume changing anodes comprising from about 5 to about 100 wt. % of (nano)composite anode powders or particles (as a fraction of all active material particles), wherein such (nano)composite anode powders or particles exhibit moderately high volume changes during the first charge-discharge cycle, moderate volume changes during the subsequent charge-discharge cycles, an average size (e.g., average diameter) in the range from about 0.2 to about 40 microns and specific surface area in the range from about 0.5 to about 50 $m^2$/g and, in the case of Si-comprising (nano)composite anode powders, specific reversible capacities in the range from about 800 to about 3000 mAh/g (when normalized by the mass of the composite anode particles only) or with the corresponding anode specific reversible capacities being in the range from about 400 to about 2800 mAh/g (when normalized by the total mass of all the active electrode particles, conductive additives and binders). In some designs (e.g., depending on cell chemistry, loading, operating conditions and/or other factors), suitable branched esters or related compounds (or their mixtures) may be added at the additive level (from about 0.05 mol. % to about 5-10 mol. %) or as a main solvent/co-solvent level (from about 10-20 to about 80 mol. %) for attaining substantial benefits.

Examples of such benefits may include one or more of the following: (i) improving high-temperature storage stability (e.g., retaining higher reversible capacity after about 1 h to about 10 years of storage at elevated temperatures (e.g., about 40-80° C. or higher) at high state of charge (SOC) (e.g., about 70-100% SOC) or reducing gas generation after storage or cycling at elevated temperatures); (ii) reducing gas generation during storage or cycling at room or low temperatures; (iii) reducing or minimizing cell swelling (or built-in stresses in cells) at the end of life (e.g., after about 20-80% of the initial capacity retention); (iv) improving cycling stability when used at different temperature conditions; (v) reducing or minimizing resistance growth during cycling; (vi) reducing or minimizing formation of undesirable (harmful) by-products during battery cell operation, among others; (vii) reducing carbon monoxide generation on the cathode; (viii) reducing carbon dioxide generation on the cathode; (ix) reducing hydrogen generation on the anode, (x) reducing methane generation on the anode; (xi) reducing C-2 hydrocarbon generation on the anode, (xii) reducing C3-hydrocarbon generation on the anode, (xiii) decreasing anode resistance, (xiv) decreasing cathode resistance, (xv) decreasing the DCR, (xvi) improving fast charge performance, (xvii) improving low temperature performance, and/ or (xviii) improving formation efficiency.

In some designs, some of such benefits may stem from the formation of more favorable or more robust cathode/electrolyte interphase (CEI) film that may, for example, help to reduce or minimize electrolyte oxidation on the cathode with the formation of gaseous species or help to reduce or minimize cathode dissolution or other unfavorable/undesirable interactions between the cathode and liquid electrolyte in a Li or Li-ion battery or help improve cathode electrolyte interphase ionic conductivity or help decrease transition metal dissolution. In some designs (for example, in case of using some of the suitable branched esters, such as ethyl isobutyrate or other suitable esters with two or three aliphatic carbons in alpha or beta position to carboxyl group, and/or others), a more robust CEI film formation may be related to having a stronger adhesion to the cathode surface. In some designs, some of such benefits may also stem from the formation of more favorable or more robust solid electrolyte interphase (SEI) film on the anode (or, for example, from helping to maintain a more stable anode SEI). In some designs, improved SEI stability may be related to the dramatically reduced diffusion of suitable branched esters and related compounds through the SEI, which may prevent or greatly reduce or minimize their reduction as well as other electrolyte components on the anode surface, particularly at elevated temperatures (e.g., battery operating temperatures, such as about 50-100° C. or higher). In some designs, improved SEI stability may be related to the reduced ability to form gaseous species upon electrolyte reduction. In some designs, improved SEI stability may be related to the reduced ability to form more elastically or plastically deformable (in the electrolyte) SEI or, for example, less resistive SEI. Such improved SEI stability or properties may, for example, help reduce or minimize electrolyte reduction on the anode (with the associated undesirable irreversible losses of cyclable Li or with the undesirable formation of gaseous species or undesirable anode swelling, etc.) or may help to reduce or minimize anode dissolution or other unfavorable/undesirable interactions between the anode and liquid electrolyte in a Li or Li-ion battery, which may lead to resistance growth or gas generation or other undesirable processes or performance degradations in cells. Some of such benefits may stem from the reduction in elastic modulus of the electrode binders upon exposure of electrodes to electrolytes during cell formation or cell operation (cycling). In some designs, it may be preferable to select an electrolyte composition based on suitable branched ester co-solvents where the binder in at least one of the electrodes does not reduce its elastic modulus by over about 30 vol. % (e.g., more preferably in some designs, by over about 10 vol. %) when exposed to electrolyte.

In some cases, some of such benefits may stem from the reduced DCR. In some designs, using a mole fraction of light-weight ester (e.g., molecular weight less than 103), such as ethyl acetate or ethyl propionate, may be advantageous to decrease bulk resistance. In some designs, using a mole fraction of LSA, such as LFO, may be advantageous to decrease charge-transfer resistance, which may be related to the improved ionic conductivity of both SEI and CEI. In some other designs, using a mole fraction of light-weight ester, such as EA or EP, might be beneficial to decrease diffusion resistance. In some designs, it might be advantageous to use ester-based electrolyte formulations described herein to lower DCR compared to carbonate-based electrolyte formulations.

In some cases, some of such benefits may stem from the decreased transference number of Li-ions. In some designs, the ester-based electrolyte formulations described herein (e.g., ester-based electrolyte formulations incorporating FEC and VC) are more amenable to additives tuning due to their lower Li-ion transference number compared to certain carbonate-based electrolyte formulations (e.g., electrolyte formulations comprising ethylene carbonate as a main co-solvent). For example, in ester-based formulations, Li ions may be less strongly bound to the ester compounds, FEC, or VC, which may allow for contribution of nitrile additives (NA), sulfur-comprising additives (SA), and other additives (OA) in the coordination sphere of a Li ion. In such designs, the ester-based formulations described herein may require much lower concentration (smaller mole fraction) of additives, such as Li salt additives (LSA), nitrile additives (NA), sulfur-comprising additives (SA), and other additives (OA) to achieve same or better performance characteristics than carbonates; these performance characteristics include: (i) improving high-temperature storage stability (e.g., retaining higher reversible capacity after about 1 h to about 10 years of storage at elevated temperatures (e.g., about 40-80° C. or higher) at high state of charge (SOC) (e.g., about 70-100% SOC) or reducing gas generation after storage or cycling at elevated temperatures); (ii) reducing gas generation during storage or cycling at room or low temperatures; (iii) reducing or minimizing cell swelling (or built-in stresses in cells) at the end of life (e.g., after about 20-80% of the initial capacity retention); (iv) improving cycling stability when used at different temperature conditions; (v) reducing or minimizing resistance growth during cycling; (vi) reducing or minimizing formation of undesirable (harmful) by-products during battery cell operation, among others; (vii) reducing carbon monoxide generation on the cathode; (viii) reducing carbon dioxide generation on the cathode; (ix) reducing hydrogen generation on the anode, (x) reducing methane generation on the anode; (xi) reducing C2-hydrocarbon generation on the anode, and/or (xii) reducing C3-hydrocarbon generation on the anode, (xiii) decreasing anode resistance, (xiv) decreasing cathode resistance, (xv) decreasing the DCR, (xvi) improving fast charge performance, (xvii) improving low temperature performance, and/or (xviii) improving formation efficiency.

In some designs, suitable branched esters (including but not limited to those examples illustrated in FIG. 4) may offer greatly reduced (e.g., compared to linear esters or certain carbonates or other commonly used electrolyte solvents/co-solvents) H (hydrogen) abstraction activity (e.g., in the alpha-position to carboxyl group).

In some designs, suitable branched esters may offer greatly reduced gassing on the anode surface (including, but not limited to the case of Li plating on the anode surface). In some designs, esters with two or three alkyl groups in the alpha position to carboxyl group of the ester may offer particularly improved performance. In some designs, esters with two or three alkyl groups in the alpha position to carboxyl group of the ester may offer reduced rates of hydrogen, methane, ethane, ethylene, propene, propane, butane and/or butene formation on the anode.

In some designs, suitable branched esters may mitigate parasitic (highly undesirable) degradation of common SEI "builders" (such as fluoroethylene carbonate, FEC, vinylene carbonate, VC, ethylene carbonate, EC, among others) present in the electrolyte due to the reduced rate of the alkoxide formation. In some designs, esters with two or three alkyl groups in the alpha position to carboxyl group of the ester may offer particularly improved performance due to the steric bulk of esters and reduced rate of the alkoxide formation.

In some designs, suitable branched esters (including but not limited to those examples illustrated in FIG. 4) may reduce or completely avoid the undesirable formation of enol from the corresponding ester (or reduce the formation of tautomeric enol form) (e.g., by shifting the equilibrium towards the ester). In some designs, by reducing or avoiding the enol presence in the electrolyte, the parasitic degradation of Li salt(s) (e.g., lithium hexafluorophosphate ($LiPF_6$)) or other electrolyte components by, for example, alcoholysis, may be greatly reduced or minimized. Similarly, in some designs, formation of hydrofluoric acid (HF) or other undesirable by-products of, e.g., $LiPF_6$ alcoholysis, may be greatly reduced or minimized.

In some designs, some suitable branched esters or suitable related compounds may be preferably used as electrolyte additives (in smaller quantities, for example, in the range from about 0.05 to about 10 mol. %; in some designs, from about 0.05 mol. % to about 0.5 mol. %; in other designs, from about 0.5 mol. % to about 1 mol. %; in other designs, from about 1 mol. % to about 2 mol. %; in other designs, from about 2 mol. % to about 4 mol. %; in other designs, from about 4 mol. % to about 10 mol. %). Some examples of such suitable branched esters include: ethyl isobutyrate, ethyl trimethylacetate and ethyl isovalerate.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an electrolyte ELY #1 comprising: about 14.7 mol. % of FEC, about 44.3 mol. % of ethyl propionate (EP) (linear ester), about 4.2 mol. % of VC, about 0.4 mol. % of LFO, about 7.4 mol. % of $LiPF_6$, about 7.3% of DEC, about 13.3% of EC, about 5.8% of PC, about 0.4% ADN, about 0.1% of HTCN, and about 1.8% of LiFSI. Herein, example electrolytes are denoted as ELY #1, ELY #2, etc. The cathode active material NMC811 is a lithium nickel manganese cobalt oxide (NCM) of approximate composition $LiNi_{0.8}Co_{0.1}Mn_{0.1}O_2$.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #2 comprising:

about 14.8 mol. % of FEC, about 54.6 mol. % of ethyl propionate (EP) (linear ester), about 4.2 mol. % of VC, about 0.4 mol. % of LFO, about 8.7 mol. % of $LiPF_6$, about 13.0% of EC, about 0.4% ADN, about 0.3% of HTCN, and about 1.7% of LiFSI.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #3 comprising: about 16.0 mol. % of FEC, about 67.1 mol. % of ethyl propionate (EP) (linear ester), about 4.5 mol. % of VC, about 0.5 mol. % of LFO, about 9.4 mol. % of $LiPF_6$, about 0.4% ADN, about 0.3% of HTCN, and about 1.9% of LiFSI.

The ester-carbonate electrolytes (ELY #1 and ELY #2) comprise FEC, VC, EP, and EC (electrolyte compositions and related data shown in Table 1 of FIG. 7). ELY #1 additionally comprises DEC (a linear carbonate) and PC (a cyclic carbonate). The ester-based electrolyte (ELY #3) comprises FEC, VC and EP. All three electrolytes ELY #1, ELY #2, and ELY #3 additionally comprise lithium-salt additives (LFO, LiFSI) and nitrile additives (ADN, HTCN). The ELY #3 which is an ester-based electrolyte comprising EP exhibited higher conductivity compared to ELY #1 and ELY #2 which are ester-carbonate electrolyte compositions. ELY #2 (56.4 mol. % EP, 13.0 mol. % EC) exhibited higher conductivity than ELY #1 (44.3 mol. % EP, 7.3 mol. % DEC, 13.3 mol. % EC, 5.8 mol. % PC). Accordingly, in some designs, higher ester mole fractions (e.g., ES mole fraction of about 50 mol. % or more) and/or lower mole fractions of DEC (e.g., DEC mole fraction lower than about 7.3 mol. %) and PC (e.g., PC mole fraction lower than about 5.8 mol. %) may contribute to higher conductivities.

Li-ion battery test cells respectively comprising ELY #1, ELY #2 and ELY #3 were tested in a cycle life test (data shown in Table 1 of FIG. 7). The test cells were fabricated, and an initial formation procedure was carried out on the test cells. Charge/discharge test conditions comprise constant current, constant potential (CCCP) at 2 C charge to 4.0V and taper to 1 C, followed by the CCCP at 1 C charge to 4.2V and taper to 0.05 C, followed by 1 C discharge. The test cells comprise blended anodes of graphite and Si—C composite particles. The ELY #3 cells (ELY #3 is an ester-based electrolyte comprising EP) exhibited lower DCR, higher relative discharge capacity at 2 C, and longer cycle life compared to the ELY #1 and ELY #2 cells (ELY #1 and ELY #2 are ester-carbonate electrolytes). ELY #2 (56.4 mol. % EP, 13.0 mol. % EC) cells exhibited lower DCR and higher relative discharge capacity at 2 C than ELY #1 (44.3 mol. % EP, 7.3 mol. % DEC, 13.3 mol. % EC, 5.8 mol. % PC). Accordingly, higher ester mole fractions (e.g., ES mole fraction of about 50 mol. % or more) and/or lower mole fractions of DEC (e.g., DEC mole fraction lower than about 7.3 mol. % including zero DEC) and PC (e.g., PC mole fraction lower than about 5.8 mol. % including zero PC) may contribute to lower DCR and higher relative discharge capacities at 2 C.

Table 1 of FIG. 7, as well as subsequent tables, report battery performance characteristics of example battery cells. Herein, the direct current resistance (sometimes referred to as DCR herein) was measured in the 4th cycle during a 0.2 C discharge by applying a 2 C pulse discharge current at 50% SOC and measuring the difference in voltage after 10 seconds compared to immediately before the 2 C current was applied. DCR may be expressed in either units of $\Omega cm^2$ or units of $\Omega Ah$. When DCR is expressed in $\Omega cm^2$, DCR normalizes for different cell capacities, assuming similar capacity loadings [$mAh/cm^2$]. When DCR is expressed in $\Omega Ah$, DCR normalizes using the actual cell capacity in Ah. For conductivity, a conductivity probe was used to measure a total or bulk solution conductivity of ions at 25° C., expressed in $mS\ cm^{-1}$. Relative discharge capacity at 2 C discharge is defined as a ratio (expressed in %) of discharge capacity of the cell measured after 2 C discharge to discharge capacity of the cell measured after 0.5 C discharge. Cycle life is defined as the number of cycles at which the cell reaches 80% SOH (state-of-health) during 250 C cycling. The state-of-health is an indication of the difference between a fresh and aged battery. The state-of-health is defined as the ratio (expressed in %) of the maximum battery charge, at a certain cycle number, to the battery's rated capacity. The rated battery capacity is measured at the cycling start by applying 0.5 C charge to maximum voltage $V_{max}$ and a taper to 0.05 C.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 $mAh/cm^2$, charge voltage of about 4.2V, (iii) a polymer-ceramic separator, and (iv) an ELY #3 comprising: about 16.0 mol. % of FEC, about 67.1 mol. % of ethyl propionate (EP) (linear ester), about 4.5 mol. % of VC, about 0.5 mol. % of LFO, about 9.4 mol. % of LiPF$_6$, about 0.4% ADN, about 0.3% of HTCN, and about 1.9% of LiFSI.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 $mAh/cm^2$, charge voltage of about 4.2V, (iii) a polymer-ceramic separator, and (iv) an ELY #4 comprising: about 16.0 mol. % of FEC, about 69.3 mol. % of ethyl propionate (EP) (linear ester), about 2.2 mol. % of VC, about 0.5 mol. % of LFO, about 9.5 mol. % of LiPF$_6$, about 0.4% ADN, about 0.3% of HTCN, and about 1.8% of LiFSI.

Li-ion battery test cells respectively comprising ELY #3 and ELY #4 were tested in a cycle life test (electrolyte compositions and related data shown in Table 2 of FIG. 8). The test cells were fabricated, and an initial formation procedure was carried out on the test cells. Charge/discharge test conditions comprise CCCP at 2 C charge to 4.0V and taper to 1 C, followed by the CCCP at 1 C charge to 4.2V and taper to 0.05 C, followed by 1 C discharge. Both ELY #3 and ELY #4 are ester-based electrolytes comprising FEC, VC, EP, lithium salt additives (LFO, LiFSI), and nitrile additives (ADN, HTCN). ELY #4 comprises a lower mole fraction of VC (2.2 mol. % compared to 4.5 mol. %) than ELY #3. The test cells comprise blended anodes of graphite and Si—C composite particles. The ELY #4, which comprises a lower mole fraction of VC, exhibited a lower DCR and a higher relative discharge capacity at 2 C compared to ELY #4 which comprises a higher mole fraction of VC. Accordingly, in some implementations, it may be preferable to select a VC mole fraction in the ester-based electrolyte in a range of about 0.5 mol. % to about 3 mol. %.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 $mAh/cm^2$, charge voltage of about 4.2V, (iii) a polymer-ceramic separator, and (iv) an ELY #5 comprising: about 15.5 mol. % of FEC, about 70.5 mol. % of ethyl propionate (EP) (linear ester), about 2.2 mol. % of VC, about 0.9 mol. % of LFO, and about 10.8 mol. % of LiPF$_6$.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #6 comprising: about 14.5 mol. % of FEC, about 33.1 mol. % of ethyl propionate (EP) (linear ester), about 39.2 mol. % of ethyl acetate (EA) (linear ester), about 2.1 mol. % of VC, about 0.9 mol. % of LFO, and about 10.2 mol. % of LiPF$_6$.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #7 comprising: about 7.7 mol. % of FEC, about 56.4 mol. % of dimethyl carbonate (DMC) (linear carbonate), about 3.5 mol. % of ethyl methyl carbonate (EMC) (linear carbonate), about 1.9 mol. % of VC, about 20.9 mol. % of ethylene carbonate (EC), about 0.8 mol. % of LFO, and about 8.8 mol. % of LiPF$_6$.

The ester-based electrolytes (ELY #5 and ELY #6) comprise FEC, VC, EP or EP:EA, respectively, and lithium salt additives (LFO). The carbonate electrolyte (ELY #7) comprises FEC, VC, DMC, EMC, EC, and lithium salt additives (LFO). ELY #5, ELY #6, and ELY #7 compositions and related data are shown in Table 3 of FIG. 9. Ester-based electrolytes ELY #5 and ELY #6, which comprise EP and EA:EP esters, respectively, exhibited higher conductivities, lower densities, and lower viscosities compared to carbonate-based electrolyte ELY #7. ELY #6 is characterized by (a) a mole fraction of EA:EP in the electrolyte of about 72.3 mol. %, hence EA:EP mole fraction ranging between about 70 mol. % and about 75 mol. %, and (b) molar ratio of EA to EP being about 1.18:1, hence a molar ratio of EA to EP being in a range of about 1:1.2 to about 1.2 to 1. On the other hand, ELY #5 is characterized by a mole fraction of EP in the electrolyte of about 70.5 mol. %, hence EP mole fraction ranging between about 70 mol. % and about 75 mol. %. ELY #6 exhibited a higher conductivity and a lower viscosity than ELY #5.

Li-ion battery test cells respectively comprising ELY #5, ELY #6 and ELY #7 were tested in a cycle life test (data shown in Table 3 of FIG. 9). The test cells were fabricated, and an initial formation procedure was carried out on the test cells. Charge/discharge test conditions comprise CCCP at 2 C charge to 4.0V and taper to 1 C, followed by the CCCP at 1 C charge to 4.2V and taper to 0.05 C, followed by 1 C discharge. The ester-based electrolytes (ELY #5 and ELY #6) comprise FEC, VC, and EP or EP:EA, respectively. The carbonate-based electrolyte (ELY #7) comprises FEC, VC, DMC, EMC, and EC. The test cells comprise blended anodes of graphite and Si—C composite particles. ELY #5 and ELY #6 cells (ester-based) exhibited lower DCR and longer cycle life values compared to ELY #7 cells (carbonate-based).

In one illustrative example, Li-ion battery cell with capacity of about 0.540 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #4 comprising: about 16.0 mol. % of FEC, about 69.3 mol. % of ethyl propionate (EP) (linear ester), about 2.2 mol. % of VC, about 0.5 mol. % of LFO, about 9.5 mol. % of LiPF$_6$, about 0.4% ADN, about 0.3% of HTCN, and about 1.8% of LiFSI.

In one illustrative example, Li-ion battery cell with capacity of about 0.540 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #8 comprising: about 14.9 mol. % of FEC, about 33.0 mol. % of ethyl propionate (EP) (linear ester), about 38.5 mol. % of ethyl acetate (EA) (liner ester), about 2.0 mol. % of VC, about 0.5 mol. % of LFO, about 8.7 mol. % of LiPF$_6$, about 1.7 mol. % of LiFSI, about 0.4 mol. % of ADN and about 0.2 mol. % of HTCN.

In one illustrative example, Li-ion battery cell with capacity of about 0.540 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #9 comprising: about 7.9 mol. % of FEC, about 56.0 mol. % of dimethyl carbonate (DMC) (linear carbonate), about 3.5 mol. % of ethyl methyl carbonate (EMC) (linear carbonate), about 1.8 mol. % of VC, about 20.6 mol. % of ethylene carbonate (EC), about 0.8 mol. % of LFO, about 8.7 mol. % of LiPF₆, and about 0.7 mol. % of ADN.

ELY #4, ELY #8, and ELY #9 compositions and related data are shown in Table 4 of FIG. 10. The ester-based electrolytes (ELY #4 and ELY #8) comprise FEC, VC, EP or EP:EA, respectively, lithium salt additives (LFO, LiFSI), and nitrile additives (ADN, HTCN). The carbonate-based electrolyte (ELY #9) comprises FEC, VC, DMC, EMC, EC, lithium salt additives (LFO), and nitrile additives (ADN). Ester-based electrolytes ELY #4 and ELY #8, which comprise EP and EA:EP esters, respectively, exhibited higher conductivities, lower densities, and lower viscosities compared to carbonate-based electrolyte ELY #9. ELY #8 is characterized by (a) a mole fraction of EA:EP in the electrolyte of about 71.5 mol. %, hence EA:EP mole fraction ranging between about 70 mol. % and about 75 mol. %, and (b) molar ratio of EA to EP being about 1.17:1, hence a molar ratio of EA to EP being in a range of about 1:1.2 to about 1.2 to 1. On the other hand, ELY #4 is characterized by a mole fraction of EP in the electrolyte of about 69.3 mol. %, hence EP mole fraction ranging between about 60 mol. % and about 70 mol. %, or between about 60 mol. % and about 70 mol. %. ELY #8 exhibited a higher conductivity and a lower viscosity than ELY #4.

Li-ion battery test cells respectively comprising ELY #4, ELY #8 and ELY #9 were tested in a cycle life test (data shown in Table 4 of FIG. 10). The test cells were fabricated, and an initial formation procedure was carried out on the test cells. Charge/discharge test conditions comprise CCCP at 2 C charge to 4.0V and taper to 1 C, followed by the CCCP at 1 C charge to 4.2V and taper to 0.05 C, followed by 1 C discharge. The ester-based electrolytes (ELY #4 and ELY #8) comprise FEC, VC, and EP or EP:EA, respectively. The carbonate-based electrolyte (ELY #9) comprises FEC, VC, DMC, EMC, and EC. The test cells comprise blended anodes of graphite and Si—C composite particles. ELY #4 and ELY #8 cells (ester-based) exhibited higher relative discharge capacity at 2 C and longer cycle life values compared to ELY #9 cells (carbonate-based).

In one illustrative example, Li-ion battery cell with capacity of about 0.028 Ah may comprise: (i) an anode with Si-based nanocomposite active material (with specific reversible capacity of ~1520 mAh/g when normalized by the weight of active materials in the anode) casted on Cu current collector foil from an aqueous suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #1 comprising about 14.7 mol. % of FEC, about 44.3 mol. % of ethyl propionate (EP) (linear ester), about 4.2 mol. % of VC, about 0.4 mol. % of LFO, about 7.4 mol. % of LiPF₆, about 7.3% of DEC, about 13.3% of EC, about 5.8% of PC, about 0.4% ADN, about 0.1% of HTCN, and about 1.8% of LiFSI.

In one illustrative example, Li-ion battery cell with capacity of about 0.028 Ah may comprise: (i) an anode with Si-based nanocomposite active material (with specific reversible capacity of ~1520 mAh/g when normalized by the weight of active materials in the anode) casted on Cu current collector foil from an aqueous suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #7 comprising: about 7.7 mol. % of FEC, about 56.4 mol. % of dimethyl carbonate (DMC) (linear carbonate), about 3.5 mol. % of ethyl methyl carbonate (EMC) (linear carbonate), about 1.9 mol. % of VC, about 20.9 mol. % of ethylene carbonate (EC), about 0.8 mol. % of LFO, and about 8.8 mol. % of LiPF₆.

In one illustrative example, Li-ion battery cell with capacity of about 0.028 Ah may comprise: (i) an anode with Si-based nanocomposite active material (with specific reversible capacity of ~1520 mAh/g when normalized by the weight of active materials in the anode) casted on Cu current collector foil from an aqueous suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm², charge voltage of about 4.2V, (iii) a polymer-ceramic separator, and (iv) an ELY #10 comprising: about 17.0 mol. % of FEC, about 34.8 mol. % of ethyl propionate (EP) (linear ester), about 33.6 mol. % of ethyl acetate (EA) (linear ester), about 2.3 mol. % of VC, about 0.5 mol. % of LFO, about 0.4 mol. % of ADN, about 0.3 mol. % of HTCN, and about 11.1 mol. % of LiPF₆.

ELY #1, ELY #7, and ELY #10 compositions and related data are shown in Table 5 of FIG. 11. The ester-based electrolyte (ELY #10) comprises FEC, VC, EP:EA, lithium salt additives (LFO), and nitrile additives (ADN, HTCN). The ester-carbonate electrolyte (ELY #1) comprises FEC, VC, EP, DEC, PC, EC, lithium salt additives (LFO, LiFSI), and nitrile additives (ADN, HTCN). The carbonate-based electrolyte (ELY #7) comprises FEC, VC, DMC, EMC, EC, and lithium salt additives (LFO). Ester-based electrolyte ELY #10, which comprises EA:EP esters, exhibited higher conductivity and lower density compared to ester-carbonate electrolyte ELY #1 and carbonate-based electrolyte ELY #7. ELY #10 is characterized by (a) a mole fraction of EA:EP in the electrolyte of about 68.4 mol. %, hence EA:EP mole fraction ranging between about 60 mol. % and about 75 mol. %, or ranging between about 60 mol. % and about 70 mol. %, and (b) molar ratio of EA to EP being about 1:1.04, hence a molar ratio of EA to EP being in a range of about 1:1.2 to about 1.2 to 1.

Li-ion battery test cells respectively comprising ELY #1, ELY #7 and ELY #10 were tested in a cycle life test (data shown in Table 5 of FIG. 11). The test cells were fabricated, and an initial formation procedure was carried out on the test cells. Charge/discharge test conditions comprise CCCP at 2 C charge to 4.0V and taper to 1 C, followed by the CCCP at 1 C charge to 4.2V and taper to 0.05 C, followed by 1 C discharge. The ester-based electrolyte ELY #10 comprises FEC, VC, and EA:EP. The ester-carbonate electrolyte ELY #1 comprises FEC, VC, EP, DEC, PC, and EC. The carbonate-based electrolyte ELY #7 comprises FEC, VC, DMC, EMC, and EC. The ELY #10 cells (ester-based) exhibited lower DCR, higher relative discharge capacity at 2 C discharge, and longer cycle life compared ELY #1 (ester-carbonate) and ELY #7 (carbonate-based) cells.

In one illustrative example, a consumer Li-ion battery cell (Li-ion battery cell for use in consumer electronics products) with capacity of about 0.9 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage LCO (with the approximate composition of $LiCoO_2$) active material (with specific reversible capacity of ~190 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.08:1 and areal reversible capacity loading of about 2.9 $mAh/cm^2$, charge voltage of ~4.4V, (iii) a polymer separator and (iv) an ELY #11 comprising: about 15.1 mol. % of FEC, about 66.5 mol. % of ethyl propionate (EP) (linear ester), about 4.4 mol. % of VC, about 1.0 mol. % of LiDFOB, about 0.8 mol. % of ADN, about 0.5 mol. % of HTCN, about 1.1 mol. % PES, and about 10.6 mol. % of $LiPF_6$.

In one illustrative example, a consumer Li-ion battery cell (Li-ion battery cell for use in consumer electronics products) with capacity of about 0.9 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage LCO (with the approximate composition of $LiCoO_2$) active material (with specific reversible capacity of ~190 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.08:1 and areal reversible capacity loading of about 2.9 $mAh/cm^2$, charge voltage of ~4.4V, (iii) a polymer separator and (iv) an ELY #12 comprising: about 18.4 mol. % of FEC, about 25.3 mol. % of propyl propionate (PP) (linear ester), about 0.6 mol. % of VC, about 41.5 mol. % of DEC, about 0.3 mol. % of ADN, about 0.2 mol. % of HTCN, about 0.4 mol. % of PS, about 0.5 mol. % succinonitrile (SN), about 0.3 mol. % of ethylene glycol bis(propionitrile) ether (EGBE), about 0.4 mol. % of citraconic anhydride (CA) and about 12.0 mol. % of $LiPF_6$.

Li-ion battery test cells respectively comprising ELY #11 and ELY #12 were tested in a cycle life test (electrolyte composition and related data shown in Table 6 of FIG. 12). The test cells were fabricated, and an initial formation procedure was carried out on the test cells. The ester-based electrolyte ELY #11 comprises FEC, VC, and EP. The ester-carbonate electrolyte ELY #12 comprises FEC, VC, PP, and DEC. The ELY #11 cells (ester-based) exhibited a higher relative discharge capacity at 0.2 C discharge, (at −20° C.) and longer cycle life compared to ELY #12 (ester-carbonate). Relative discharge capacity at 0.2 C discharge (at −20° C.) is defined as a ratio (expressed in %) of discharge capacity of the cell measured after 0.2 C discharge at −20° C. to discharge capacity of the cell measured after 0.2 C discharge at 25° C.

In one illustrative example, a consumer Li-ion battery cell (Li-ion battery cell for use in consumer electronics products) with capacity of about 0.7 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage LCO (with the approximate composition of $LiCoO_2$) active material (with specific reversible capacity of ~190 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.08:1 and areal reversible capacity loading of about 2.9 $mAh/cm^2$, charge voltage of ~4.4V, (iii) a polymer separator and (iv) an ELY #13 comprising: about 16.4 mol. % of FEC, about 34.3 mol. % of ethyl propionate (EP) (linear ester), about 29.7 mol. % of ethyl isobutyrate (EI) (branched ester), about 4.7 mol. % of VC, about 1.0 mol. % of LiDFOB, about 0.9 mol. % of ADN, about 0.6 mol. % of HTCN, about 1.2 mol. % PES, and about 11.2 mol. % of $LiPF_6$.

In one illustrative example, a consumer Li-ion battery cell (Li-ion battery cell for use in consumer electronics products) with capacity of about 0.7 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage LCO (with the approximate composition of $LiCoO_2$) active material (with specific reversible capacity of ~190 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.08:1 and areal reversible capacity loading of about 2.9 $mAh/cm^2$, charge voltage of ~4.4V, (iii) a polymer separator and (iv) an ELY #14 comprising: about 16.3 mol. % of FEC, about 35.2 mol. % of ethyl propionate (EP) (linear ester), about 30.1 mol. % of ethyl isobutyrate (EI) (branched ester), about 4.6 mol. % of VC, about 1.0 mol. % of LiDFOB, about 1.7 mol. % of ADN, and about 11.1 mol. % of $LiPF_6$.

ELY #13 and ELY #14 electrolyte composition and related data are shown in Table 7 of FIG. 13. ELY #13 is characterized by (a) a mole fraction of EP:EI in the electrolyte of about 64.0 mol. %, hence EA:EP mole fraction ranging between about 60 mol. % and about 75 mol. % or ranging between about 60 mol. % and 70 mol. %, and (b) molar ratio of EP to EI being about 1.15:1, hence a molar ratio of EP to EI being in a range of about 1:1.2 to about 1.2 to 1. ELY #14 is characterized by (a) a mole fraction of EP:EI in the electrolyte of about 65.3 mol. %, hence EA:EP mole fraction ranging between about 60 mol. % and about 75 mol. % or ranging between about 60 mol. % and 70 mol. %, and (b) molar ratio of EP to EI being about 1.17:1, hence a molar ratio of EP to EI being in a range of about 1:1.2 to about 1.2 to 1. Li-ion battery test cells respectively comprising ELY #13 and ELY #14 were tested in cycle life tests at 45° C. and 10° C. The test cells were fabricated, and an initial formation procedure was carried out on the test cells. Both ester-based electrolytes ELY #13 and ELY #14 comprise FEC, VC, and EP:EI. ELY #13 comprises lithium salt additives (LiDFOB), nitrile additives (ADN, HTCN), and sulfur-comprising additives (PES). ELY #14 comprises lithium salt additives (LiDFOB) and nitrile additives (HTCN). ELY #13 cells (which comprises HTCN, PES) exhibited longer cycle life than ELY #14 cells (which does not comprise HTCN, PES) at 45° C. On the other hand, ELY #14 cells (which does not comprise HTCN, PES) exhibited longer cycle life than ELY #13 cells (which comprises HTCN, PES) at 10° C. Both ELY #13 and ELY #14 cells exhibited longer cycle life data at 10° C. than at 45° C.

Cycle life at 45° C. is defined as the number of cycles at which the cell reaches 80% SOH (state-of-health) during 45° C. cycling. Cycle life at 10° C. is defined as the number of cycles at which the cell reaches 80% SOH (state-of-health) during 10° C. cycling.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #15 comprising: about 16.1 mol. % of FEC, about 69.4 mol. % of ethyl propionate (EP) (linear ester), about 2.2 mol. % of VC, about 0.9 mol. % of LFO, about 0.5% sulfolane, and about 10.9 mol. % of LiPF$_6$.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #16 comprising: about 16.2 mol. % of FEC, about 69.2 mol. % of ethyl propionate (EP) (linear ester), about 2.2 mol. % of VC, about 0.9 mol. % of LFO, about 10.9 mol. % of LiPF$_6$, and about 0.6% of DTD.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #17 comprising: about 16.0 mol. % of FEC, about 69.6 mol. % of ethyl propionate (EP) (linear ester), about 2.2 mol. % of VC, about 1.0 mol. % of LFO, about 10.9 mol. % of LiPF$_6$, and about 0.3% of TMSPi.

In one illustrative example, Li-ion battery cell with capacity of about 0.028 Ah may comprise: (i) an anode with about 80% by capacity Si—C nanocomposite active material (with specific reversible capacity of about 1520 mAh/g when normalized by the weight of active materials in the anode), which corresponds to about 50 wt. % of Si—C nanocomposite in a blended anode composition, and graphite casted on Cu current collector foil from a water-based suspension comprising a polyacrylic acid binder and a carbon black conductive additive, (ii) a cathode with high-voltage NMC811 active material (with specific reversible capacity of about 200 mAh/g when normalized by the weight of active materials in the cathode) casted on Al current collector foil from an organic solvent suspension comprising a polyvinylidene fluoride (PVDF)-based binder and a carbon black conductive additive, anode:cathode areal capacity ratio of about 1.15:1 and areal reversible capacity loading of about 4.8 mAh/cm$^2$, charge voltage of about 4.2V, (iii) a polymer-ceramic separator, and (iv) an ELY #5 comprising: about 15.5 mol. % of FEC, about 70.5 mol. % of ethyl propionate (EP) (linear ester), about 2.2 mol. % of VC, about 0.9 mol. % of LFO, and about 10.8 mol. % of LiPF$_6$.

ELY #5, ELY #15, ELY #16, and ELY #17 are ester-based electrolytes comprising FEC, VC, EP, and lithium salt additives LFO. The differences among these electrolytes include: ELY #1 does not comprise any additives other than LFO, ELY #15 comprises LFO and sulfolane (a sulfur-comprising additive), ELY #16 comprises LFO and DTD (a sulfur-comprising additive), and ELY #17 comprises LFO and TMSPi (an additive that is not a lithium salt additive, nitrile additive, or sulfur-comprising additive). Li-ion battery test cells respectively comprising ELY #5, ELY #15, ELY #16 and ELY #17 were tested in a cycle life test (electrolyte composition and related data shown in Table 8 of FIG. 14). The test cells were fabricated, and an initial formation procedure was carried out on the test cells. Charge/discharge test conditions comprise CCCP at 2 C charge to 4.0V and taper to 1 C, followed by the CCCP at 1 C charge to 4.2V and taper to 0.05 C, followed by 1 C discharge. Because of the high mole fractions of EP (e.g., mole fractions of EP in a range of about 60 mol. % to about 75 mol. %) and the presence of lithium salt additives LFO, ELY #5, ELY #15, ELY #16, and ELY #17 cells exhibit relatively long cycle life characteristics (e.g., cycle life of at least 1261 cycles). ELY #15 and ELY #16 cells, which comprise sulfur-comprising additives sulfolane and DTD, respectively, exhibit lower DCR, lower outgassing (volume change), and longer cycle life characteristics than ELY #5 cells which do not comprise sulfur-comprising additives. The ELY #16 cells (DTD) are notable for a low volume change (low outgassing) of about 6.9%. ELY #17 cells, which other additives TMSPi, exhibit lower DCR, lower outgassing (volume change), and longer cycle life characteristics than ELY #5 cells which do not comprise TMSPi. The ELY #17 cells (TMSPi) are notable for a long cycle life of about 1310 cycles.

High-temperature outgassing in a battery cell is an undesirable phenomenon that is observed to result from a heat treatment (also referred to as high-temperature storage treatment) of the battery cell after it has been charged to a high state-of-charge (SOC) (e.g., about 70-100% SOC). The temperature of the heat treatment may vary depending on the specific heat treatment implementation, e.g., about 80° C., about 72° C., about 60° C., and other temperatures in a range of about 50° C. to about 90° C. The duration of the heat treatment may also vary depending on the specific heat treatment implementation, e.g., about 10 days, about 7 days, about 3 days, about 2.5 days, about 2 days, and other durations. For the Li-ion battery test results as discussed herein, the heat treatment was conducted at a temperature of 60° C. for a duration of 72 hours. In a specific example, the volume of the cell ("final volume") measured 1 h after the cell has been cooled to 25° C. after the high-temperature storage treatment under a high state-of-charge (SOC) is compared to the initial volume of the cell before the high-temperature storage treatment under a high state-of-charge (SOC). The difference between the final volume and the initial volume, expressed as a % of the initial volume, is referred to as "volume change." In some implementations, the volume change preferably does not exceed about 15 vol. % of the initial cell volume. In some implementations, the volume change preferably does not exceed about 10 vol. % of the initial cell volume. In some implementations, the volume change preferably does not exceed about 3 vol. % of the initial cell volume. In some implementations, the volume change preferably does not exceed about 1 vol. % of the initial cell volume.

The above-described exemplary electrode particles (e.g., anode or cathode particles) may generally be of any shape (e.g., near-spherical or a spheroidal or an ellipsoid (e.g., including oblate spheroid), cylindrical, plate-like, have a random shape, etc.) and of any size. In some designs, the maximum size of the particle may depend on the rate performance requirements, on the rate of the ion diffusion into the partially filled particles, and/or on other parameters. For most applications, the average diffusion distance from the solid-electrolyte interphase (e.g., from the surface of the composite particles) to the inner core of the composite particles may be smaller than about 10 microns for optimal performance.

Some aspects of this disclosure may also be applicable to other intercalation-type cathodes (e.g., lithium iron phosphate (LFP), lithium manganese oxide (LMO), lithium manganese nickel oxide (LMNO), lithium iron manganese phosphate (LFMP), etc.) and more conventional intercalation-type (e.g., carbonaceous—such as synthetic or artificial graphites, soft carbons, hard carbons and their various mixtures) anodes and may provide benefits of improved rate performance or improved stability, particularly for electrodes with medium and high capacity loadings (e.g., greater than about 3-4 mAh/cm$^2$).

Battery cell modules or battery cell packs may advantageously comprise cells with electrode and/or electrolyte compositions provided in this disclosure. Such cell modules or packs may offer improved performance characteristics, simplified designs, better safety features or lower cost.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A lithium-ion battery electrolyte, comprising: LiPF$_6$; and an organic compound composition comprising (1) vinylene carbonate (VC), (2) fluoroethylene carbonate (FEC), and (3) at least one ester (ES); wherein a mole fraction of the LiPF$_6$ in the lithium-ion battery electrolyte is approximately c(LiPF$_6$) mol. %; wherein a mole fraction of the VC in the lithium-ion battery electrolyte is approximately c(VC) mol. %; wherein a mole fraction of the FEC in the lithium-ion battery electrolyte is approximately c(FEC) mol. %; wherein a mole fraction of the ES in the lithium-ion battery electrolyte is approximately c(ES) mol. %; wherein c(LiPF$_6$), c(VC), c(FEC), and c(ES) satisfy Relations A1 through A4: 8≤c(LiPF$_6$)≤16 (Relation A1), 0.5≤c(VC)≤5 (Relation A2), 10≤c(FEC)≤26 (Relation A3), and 40≤c(ES)≤75 (Relation A4).

Clause 2. The lithium-ion battery electrolyte of clause 1, wherein: c(ES) satisfies Relation A5: 50≤c(ES)≤75 (Relation A5).

Clause 3. The lithium-ion battery electrolyte of clause 2, wherein: c(ES) satisfies Relation A6: 60≤c(ES)≤75 (Relation A6).

Clause 4. The lithium-ion battery electrolyte of any of clauses 1 to 3, wherein: the ES comprises one or more of methyl acetate (MA), methyl propionate (MP), ethyl acetate (EA), ethyl propionate (EP), propyl propionate (PP), ethyl isobutyrate (EI), methyl isobutyrate (MI), and methyl butyrate (MB).

Clause 5. The lithium-ion battery electrolyte of clause 4, wherein: the ES comprises the EA and the EP; and a molar ratio of the EA to the EP is in a range of 1:4 to 4:1.

Clause 6. The lithium-ion battery electrolyte of clause 5, wherein: the molar ratio of the EA to the EP is in a range of 1:2 to 2:1.

Clause 7. The lithium-ion battery electrolyte of clause 6, wherein: the molar ratio of the EA to the EP is in a range of 1:1.2 to 1.2:1.

Clause 8. The lithium-ion battery electrolyte of any of clauses 4 to 7, wherein: the ES comprises the EP and the EI; and a molar ratio of the EP to the EI is in a range of 1:4 to 4:1.

Clause 9. The lithium-ion battery electrolyte of clause 8, wherein: the molar ratio of the EP to the EI is in a range of 1:2 to 2:1.

Clause 10. The lithium-ion battery electrolyte of clause 9, wherein: the molar ratio of the EP to the EI is in a range of 1:1.2 to 1.2:1.

Clause 11. The lithium-ion battery electrolyte of any of clauses 4 to 10, wherein: the ES comprises the ethyl propionate (EP); and a mole fraction of the EP in the lithium-ion battery electrolyte is in a range of approximately 26 mol. % to 75 mol. %.

Clause 12. The lithium-ion battery electrolyte of any of clauses 4 to 11, wherein: the ES comprises the ethyl isobutyrate (EI); and a mole fraction of the EI in the lithium-ion battery electrolyte is in a range of approximately 26 mol. % to 75 mol. %.

Clause 13. The lithium-ion battery electrolyte of any of clauses 4 to 12, wherein: the ES comprises the ethyl acetate (EA); and a mole fraction of the EA in the lithium-ion battery electrolyte is in a range of approximately 26 mol. % to approximately 60 mol. %.

Clause 14. The lithium-ion battery electrolyte of any of clauses 1 to 13, wherein: the ES comprises a first ester compound and a second ester compound; the first ester compound has a molecular weight of 90 or less; the second ester compound has a molecular weight of greater than 90; and a molar ratio of the first ester compound to the second ester compound is in a range of 1:2 to 2:1.

Clause 15. The lithium-ion battery electrolyte of clause 14, wherein: the molar ratio of the first ester compound to the second ester compound is in a range of 1:1.2 to 1.2:1.

Clause 16. The lithium-ion battery electrolyte of any of clauses 1 to 15, wherein: c(FEC) satisfies Relation A7: 14≤c(FEC)≤20 (Relation A7).

Clause 17. The lithium-ion battery electrolyte of any of clauses 1 to 16, wherein: c(VC) satisfies Relation A8: 0.5≤c(VC)≤3 (Relation A8).

Clause 18. The lithium-ion battery electrolyte of any of clauses 1 to 17, wherein: the lithium-ion battery electrolyte does not comprise any cyclic carbonate that is neither VC nor FEC.

Clause 19. The lithium-ion battery electrolyte of any of clauses 1 to 18, wherein: the organic compound composition comprises a cyclic carbonate (CC) that is neither VC nor FEC; a mole fraction of the CC in the lithium-ion battery electrolyte is approximately c(CC) mol. %; and c(CC) satisfies Relation A9: c(CC)≤20 (Relation A9).

Clause 20. The lithium-ion battery electrolyte of clause 19, wherein: the CC comprises propylene carbonate (PC) and/or ethylene carbonate (EC).

Clause 21. The lithium-ion battery electrolyte of any of clauses 1 to 20, wherein: the lithium-ion battery electrolyte does not comprise any linear carbonate (LC).

Clause 22. The lithium-ion battery electrolyte of any of clauses 1 to 21, wherein: the organic compound composition comprises a linear carbonate (LC); a mole fraction of the LC in the lithium-ion battery electrolyte is approximately c(LC) mol. %; and c(LC) satisfies Relation A10: c(LC)≤15 (Relation A10).

Clause 23. The lithium-ion battery electrolyte of clause 22, wherein: c(LC) satisfies Relation A11: c(LC)≤10 (Relation A11).

Clause 24. The lithium-ion battery electrolyte of any of clauses 22 to 23, wherein: the LC comprises one or more of the following: dimethyl carbonate (DMC), ethyl methyl carbonate (EMC), and diethyl carbonate (DEC).

Clause 25. The lithium-ion battery electrolyte of any of clauses 1 to 24, wherein: the lithium-ion battery electrolyte comprises at least one lithium salt additive (LSA); a mole fraction of the LSA in the lithium-ion battery electrolyte is approximately c(LSA) mol. %; and c(LSA) satisfies Relation A12: 0.3≤c(LSA)≤5.0 (Relation A12).

Clause 26. The lithium-ion battery electrolyte of clause 25, wherein: c(LSA) satisfies Relation A13: 0.3≤c(LSA)≤2.5 (Relation A13).

Clause 27. The lithium-ion battery electrolyte of any of clauses 25 to 26, wherein: the LSA comprises one or more of the following: lithium difluorophosphate (LFO), lithium difluoro(oxalato)borate (LiDFOB), lithium tetrafluoroborate (LiBF$_4$), and lithium bis(fluorosulfonyl)imide (LiFSI).

Clause 28. The lithium-ion battery electrolyte of clause 27, wherein: the LSA comprises the LFO; and a mole fraction of the LFO in the lithium-ion battery electrolyte is in a range of approximately 0.3 mol. % to approximately 1.0 mol. %.

Clause 29. The lithium-ion battery electrolyte of any of clauses 27 to 28, wherein: the LSA comprises the LiFSI; and a mole fraction of the LiFSI in the lithium-ion battery electrolyte is in a range of approximately 1.6 mol. % to approximately 2.0 mol. %.

Clause 30. The lithium-ion battery electrolyte of any of clauses 27 to 29, wherein: the LSA comprises the LiDFOB; and a mole fraction of the LiDFOB in the lithium-ion battery electrolyte is in a range of approximately 0.8 mol. % to approximately 2.0 mol. %.

Clause 31. The lithium-ion battery electrolyte of any of clauses 1 to 30, wherein: the lithium-ion battery electrolyte additionally comprises one or more nitrile additives (NA); a mole fraction of the NA in the lithium-ion battery electrolyte is approximately c(NA) mol. %; and c(NA) satisfies Relation A14: 0.1≤c(NA)≤2.8 (Relation A14).

Clause 32. The lithium-ion battery electrolyte of clause 31, wherein: the NA comprises one or more of the following: adiponitrile (ADN), 1,3,6-hexanetricarbonitrile (HTCN), ethyleneglycol bis(propionitrile)ether (EGBE), and 3-{[1,3-bis(2-cyanoethoxy)propan-2-yl]oxy}propanenitrile (ETCN).

Clause 33. The lithium-ion battery electrolyte of clause 32, wherein: the NA comprises the ADN; and a mole fraction of the ADN in the lithium-ion battery electrolyte is in a range of approximately 0.3 mol. % to approximately 1.8 mol. %.

Clause 34. The lithium-ion battery electrolyte of any of clauses 32 to 33, wherein: the NA comprises the HTCN; and a mole fraction of the HTCN in the lithium-ion battery electrolyte is in a range of approximately 0.1 mol. % to approximately 0.9 mol. %.

Clause 35. The lithium-ion battery electrolyte of any of clauses 1 to 34, wherein: the lithium-ion battery electrolyte additionally comprises one or more sulfur-comprising additives (SA); a mole fraction of the SA in the lithium-ion battery electrolyte is approximately $c(SA)$ mol. %; and $c(SA)$ satisfies Relation A15: $0.1 \leq c(SA) \leq 2.8$ (Relation A15).

Clause 36. The lithium-ion battery electrolyte of clause 35, wherein: the SA comprises one or more of the following: sulfolane, 1,3,2-dioxathiolane 2,2-dioxide (DTD), methylene methanedisulfonate (MMDS), propane sultone (PS), and propene sultone (PES).

Clause 37. The lithium-ion battery electrolyte of clause 36, wherein: the SA comprises the PS; and a mole fraction of the PS in the lithium-ion battery electrolyte is in a range of approximately 0.1 mol. % to approximately 1.0 mol. %.

Clause 38. The lithium-ion battery electrolyte of any of clauses 36 to 37, wherein: the SA comprises the PES; and a mole fraction of the PES in the lithium-ion battery electrolyte is in a range of approximately 0.1 mol. % to approximately 1.5 mol. %.

Clause 39. The lithium-ion battery electrolyte of any of clauses 36 to 38, wherein: the SA comprises the sulfolane; and a mole fraction of the sulfolane in the lithium-ion battery electrolyte is in a range of approximately 0.1 mol. % to approximately 1.0 mol. %.

Clause 40. The lithium-ion battery electrolyte of any of clauses 36 to 39, wherein: the SA comprises the DTD; and a mole fraction of the DTD in the lithium-ion battery electrolyte is in a range of approximately 0.1 mol. % to approximately 1.0 mol. %.

Clause 41. The lithium-ion battery electrolyte of any of clauses 1 to 40, wherein: the lithium-ion battery electrolyte comprises tris(trimethylsilyl)phosphite (TMSPi); and a mole fraction of the TMSPi in the lithium-ion battery electrolyte is in a range of approximately 0.1 mol. % to approximately 2.8 mol. %.

Clause 42. The lithium-ion battery electrolyte of any of clauses 1 to 41, wherein: a density of the lithium-ion battery electrolyte is 1.1 g/cm$^3$ or less at 20° C.

Clause 43. The lithium-ion battery electrolyte of any of clauses 1 to 42, wherein: a viscosity of the lithium-ion battery electrolyte is 2.6 cP or less at 25° C.

Clause 44. The lithium-ion battery electrolyte of any of clauses 1 to 43, wherein: an ionic conductivity of the lithium-ion battery electrolyte is 13 mS cm$^{-1}$ or greater at 25° C.

Clause 45. A lithium-ion battery, comprising: an anode current collector; a cathode current collector; an anode disposed on or in the anode current collector; a cathode disposed on or in the cathode current collector; and the lithium-ion battery electrolyte of clause 1 ionically coupling the anode and the cathode.

Clause 46. The lithium-ion battery of clause 45, wherein: the anode comprises silicon-carbon composite particles comprising silicon and carbon; and a mass of the silicon is in a range of about 3 wt. % to about 80 wt. % of a total mass of the anode.

Clause 47. The lithium-ion battery of clause 46, wherein: the anode additionally comprises graphitic carbon particles comprising carbon and being substantially free of silicon; and the silicon-carbon composite particles and the graphitic carbon particles are present in the anode as a mixture.

Clause 48. The lithium-ion battery of any of clauses 46 to 47, wherein: at least some of the silicon is present in the silicon-carbon composite particles as nanosized silicon.

Clause 49. A lithium-ion battery electrolyte, comprising: LiPF$_6$; and an organic compound composition comprising (1) vinylene carbonate (VC), (2) fluoroethylene carbonate (FEC), (3) ethylene carbonate (EC), and (4) at least one linear carbonate (LC); wherein a molar average molecular weight of the LC is 95 or lower; wherein a mole fraction of the LiPF$_6$ in the lithium-ion battery electrolyte is approximately $c(LiPF_6)$ mol. %; wherein a mole fraction of the VC in the lithium-ion battery electrolyte is approximately $c(VC)$ mol. %; wherein a mole fraction of the FEC in the lithium-ion battery electrolyte is approximately $c(FEC)$ mol. %; wherein a mole fraction of the EC in the lithium-ion battery electrolyte is approximately $c(EC)$ mol. %; wherein a mole fraction of the LC in the lithium-ion battery electrolyte is approximately $c(LC)$ mol. %; and wherein $c(LiPF_6)$, $c(VC)$, $c(FEC)$, $c(EC)$, and $c(LC)$ satisfy Relations B1 through B5: $6 \leq c(LiPF_6) \leq 15$ (Relation Bi), $0.3 \leq c(VC) \leq 3$ (Relation B2), $5 \leq c(FEC) \leq 26$ (Relation B3), $10 \leq c(EC) \leq 30$ (Relation B4), and $50 \leq c(LC) \leq 75$ (Relation B5).

Clause 50. The lithium-ion battery electrolyte of clause 49, wherein: the molar average molecular weight of the LC is 93 or lower.

Clause 51. The lithium-ion battery electrolyte of any of clauses 49 to 50, wherein: the lithium-ion battery electrolyte does not comprise any propylene carbonate (PC).

Clause 52. The lithium-ion battery electrolyte of any of clauses 49 to 51, wherein: the lithium-ion battery electrolyte does not comprise any diethyl carbonate (DEC).

Clause 53. The lithium-ion battery electrolyte of any of clauses 49 to 52, wherein: the LC comprises dimethyl carbonate (DMC) and ethyl methyl carbonate (EMC); and a molar ratio of the DMC to the EMC is in a range of 10:1 to 20:1.

Clause 54. The lithium-ion battery electrolyte of any of clauses 49 to 53, wherein: the lithium-ion battery electrolyte comprises at least one lithium salt additive (LSA); a mole fraction of the LSA in the lithium-ion battery electrolyte is approximately $c(LSA)$ mol. %; and $c(LSA)$ satisfies Relation B6: $0.3 \leq c(LSA) \leq 5.0$ (Relation B6).

Clause 55. The lithium-ion battery electrolyte of clause 54, wherein: $c(LSA)$ satisfies Relation B7: $0.3 \leq c(LSA) \leq 2.5$ (Relation B7).

Clause 56. The lithium-ion battery electrolyte of any of clauses 54 to 55, wherein: the LSA comprises one or more of the following: lithium difluorophosphate (LFO), lithium difluoro(oxalato)borate (LiDFOB), lithium tetrafluoroborate (LiBF$_4$), and lithium bis(fluorosulfonyl)imide (LiFSI).

Clause 57. The lithium-ion battery electrolyte of any of clauses 49 to 56, wherein: the lithium-ion battery electrolyte additionally comprises one or more nitrile additives (NA); a mole fraction of the NA in the lithium-ion battery electrolyte is approximately c(NA) mol. %; and c(NA) satisfies Relation B8: 0.1≤c(NA) ≤2.8 (Relation B8).

Clause 58. The lithium-ion battery electrolyte of clause 57, wherein: the NA comprises one or more of the following: adiponitrile (ADN), 1,3,6-hexanetricarbonitrile (HTCN), ethyleneglycol bis(propionitrile)ether (EGBE), and 3-{[1,3-bis(2-cyanoethoxy)propan-2-yl]oxy}propanenitrile (ETCN).

Clause 59. The lithium-ion battery electrolyte of any of clauses 49 to 58, wherein: the lithium-ion battery electrolyte additionally comprises one or more sulfur-comprising additives (SA); a mole fraction of the SA in the lithium-ion battery electrolyte is approximately c(SA) mol. %; and c(SA) satisfies Relation B9: 0.1≤c (SA)≤2.8 (Relation B9).

Clause 60. The lithium-ion battery electrolyte of clause 59, wherein: the SA comprises one or more of the following: sulfolane, 1,3,2-dioxathiolane 2,2-dioxide (DTD), methylene methanedisulfonate (MMDS), propane sultone (PS), and propene sultone (PES).

Clause 61. The lithium-ion battery electrolyte of any of clauses 49 to 60, wherein: the lithium-ion battery electrolyte comprises tris(trimethylsilyl)phosphite (TMSPi); and a mole fraction of the TMSPi in the lithium-ion battery electrolyte is in a range of approximately 0.1 mol. % to approximately 2.8 mol. %.

Clause 62. A lithium-ion battery, comprising: an anode current collector; a cathode current collector; an anode disposed on or in the anode current collector; a cathode disposed on or in the cathode current collector; and the lithium-ion battery electrolyte of clause 49 ionically coupling the anode and the cathode.

Clause 63. The lithium-ion battery of clause 62, wherein: the anode comprises silicon-carbon composite particles comprising silicon and carbon; and a mass of the silicon is in a range of about 3 wt. % to about 80 wt. % of a total mass of the anode.

Clause 64. The lithium-ion battery of clause 63, wherein: the anode additionally comprises graphitic carbon particles comprising carbon and being substantially free of silicon; and the silicon-carbon composite particles and the graphitic carbon particles are present in the anode as a mixture.

Clause 65. The lithium-ion battery of any of clauses 63 to 64, wherein: at least some of the silicon is present in the silicon-carbon composite particles as nanosized silicon.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A lithium-ion battery electrolyte, comprising:
LiPF$_6$; and
an organic compound composition comprising (1) vinylene carbonate (VC), (2) fluoroethylene carbonate (FEC), and (3) at least one ester (ES);
wherein:
a mole fraction of the LiPF$_6$ in the lithium-ion battery electrolyte is approximately c(LiPF$_6$) mol. %;
a mole fraction of the VC in the lithium-ion battery electrolyte is approximately c(VC) mol. %;
a mole fraction of the FEC in the lithium-ion battery electrolyte is approximately c(FEC) mol. %;
a mole fraction of the ES in the lithium-ion battery electrolyte is approximately c(ES) mol. %; and
c(LiPF$_6$), c(VC), c(FEC), and c(ES) satisfy Relations A1, A2, A3, and A5:

$$8 \le c(\text{LiPF}_6) \le 16 \qquad \text{(Relation A1);}$$

$$0.5 \le c(\text{VC}) \le 5 \qquad \text{(Relation A2);}$$

$$10 \le c(\text{FEC}) \le 26 \qquad \text{(Relation A3); and}$$

$$50 \le c(\text{ES}) \le 75 \qquad \text{(Relation A5).}$$

2. The lithium-ion battery electrolyte of claim 1, wherein: c(ES) satisfies Relation A6:

$$60 \le c(\text{ES}) \le 75 \qquad \text{(Relation A6).}$$

3. The lithium-ion battery electrolyte of claim 1, wherein: the ES comprises one or more of methyl acetate (MA), methyl propionate (MP), ethyl acetate (EA), ethyl propionate (EP), propyl propionate (PP), ethyl isobutyrate (EI), methyl isobutyrate (MI), and methyl butyrate (MB).

4. The lithium-ion battery electrolyte of claim 3, wherein: the ES comprises the EA and the EP; and a molar ratio of the EA to the EP is in a range of 1:4 to 4:1.

5. The lithium-ion battery electrolyte of claim 4, wherein: the molar ratio of the EA to the EP is in a range of 1:2 to 2:1.

6. The lithium-ion battery electrolyte of claim 5, wherein: the molar ratio of the EA to the EP is in a range of 1:1.2 to 1.2:1.

7. The lithium-ion battery electrolyte of claim 3, wherein: the ES comprises the EP and the EI; and a molar ratio of the EP to the EI is in a range of 1:4 to 4:1.

8. The lithium-ion battery electrolyte of claim 7, wherein: the molar ratio of the EP to the EI is in a range of 1:2 to 2:1.

9. The lithium-ion battery electrolyte of claim 8, wherein: the molar ratio of the EP to the EI is in a range of 1:1.2 to 1.2:1.

10. The lithium-ion battery electrolyte of claim 3, wherein:
the ES comprises the ethyl propionate (EP); and
a mole fraction of the EP in the lithium-ion battery electrolyte is in a range of approximately 26 mol. % to 75 mol. %.

11. The lithium-ion battery electrolyte of claim 3, wherein:
the ES comprises the ethyl isobutyrate (EI); and
a mole fraction of the EI in the lithium-ion battery electrolyte is in a range of approximately 26 mol. % to 75 mol. %.

12. The lithium-ion battery electrolyte of claim 3, wherein:

the ES comprises the ethyl acetate (EA); and a mole fraction of the EA in the lithium-ion battery electrolyte is in a range of approximately 26 mol. % to approximately 60 mol. %.

13. The lithium-ion battery electrolyte of claim 1, wherein:

the ES comprises a first ester compound and a second ester compound;

the first ester compound has a molecular weight of 90 or less;

the second ester compound has a molecular weight of greater than 90; and a molar ratio of the first ester compound to the second ester compound is in a range of 1:2 to 2:1.

14. The lithium-ion battery electrolyte of claim 13, wherein:

the molar ratio of the first ester compound to the second ester compound is in a range of 1:1.2 to 1.2:1.

15. The lithium-ion battery electrolyte of claim 1, wherein: c(FEC) satisfies Relation A7:

$$14 \le c(FEC) \le 20 \qquad \text{(Relation A7)}.$$

16. The lithium-ion battery electrolyte of claim 1, wherein:

c(VC) satisfies Relation A8:

$$0.5 \le c(VC) \le 3 \qquad \text{(Relation A8)}.$$

17. The lithium-ion battery electrolyte of claim 1, wherein:

the lithium-ion battery electrolyte does not comprise any cyclic carbonate (CC) that is neither VC nor FEC.

18. The lithium-ion battery electrolyte of claim 1, wherein:

the organic compound composition comprises a cyclic carbonate (CC) that is neither VC nor FEC;

a mole fraction of the CC in the lithium-ion battery electrolyte is approximately c(CC) mol. %; and c(CC) satisfies Relation A9:

$$c(CC) \le 20 \qquad \text{(Relation A9)}.$$

19. The lithium-ion battery electrolyte of claim 18, wherein:

the CC comprises propylene carbonate (PC) and/or ethylene carbonate (EC).

20. The lithium-ion battery electrolyte of claim 1, wherein:

the lithium-ion battery electrolyte does not comprise any linear carbonate (LC).

21. The lithium-ion battery electrolyte of claim 1, wherein:

the organic compound composition comprises a linear carbonate (LC);

a mole fraction of the LC in the lithium-ion battery electrolyte is approximately $c(LC)$ mol. %; and c(LC) satisfies Relation A10:

$$c(LC) \le 15 \qquad \text{(Relation A10)}.$$

22. The lithium-ion battery electrolyte of claim 21, wherein:

c(LC) satisfies Relation A11:

$$c(LC) \le 10 \qquad \text{(Relation A11)}.$$

23. The lithium-ion battery electrolyte of claim 21, wherein:

the LC comprises one or more of the following: dimethyl carbonate (DMC), ethyl methyl carbonate (EMC), and diethyl carbonate (DEC).

24. The lithium-ion battery electrolyte of claim 1, wherein:

the lithium-ion battery electrolyte comprises at least one lithium salt additive (LSA);

a mole fraction of the LSA in the lithium-ion battery electrolyte is approximately c(LSA) mol. %; and c(LSA) satisfies Relation A12:

$$0.3 \le c(LSA) \le 5.0 \qquad \text{(Relation A12)}.$$

25. The lithium-ion battery electrolyte of claim 24, wherein:

c(LSA) satisfies Relation A13:

$$0.3 \le c(LSA) \le 2.5 \qquad \text{(Relation A13)}.$$

26. The lithium-ion battery electrolyte of claim 24, wherein:

the LSA comprises one or more of the following: lithium difluorophosphate (LFO), lithium difluoro(oxalato)borate (LiDFOB), lithium tetrafluoroborate (LiBF$_4$), and lithium bis(fluorosulfonyl)imide (LiFSI).

27. The lithium-ion battery electrolyte of claim 26, wherein:

the LSA comprises the LFO; and a mole fraction of the LFO in the lithium-ion battery electrolyte is in a range of approximately 0.3 mol. % to approximately 1.0 mol. %.

28. The lithium-ion battery electrolyte of claim 26, wherein:

the LSA comprises the LiFSI; and a mole fraction of the LiFSI in the lithium-ion battery electrolyte is in a range of approximately 1.6 mol. % to approximately 2.0 mol. %.

29. The lithium-ion battery electrolyte of claim 26, wherein:

the LSA comprises the LiDFOB; and a mole fraction of the LiDFOB in the lithium-ion battery electrolyte is in a range of approximately 0.8 mol. % to approximately 2.0 mol. %.

30. The lithium-ion battery electrolyte of claim 1, wherein:

the lithium-ion battery electrolyte additionally comprises one or more nitrile additives (NA);

a mole fraction of the NA in the lithium-ion battery electrolyte is approximately c(NA) mol. %; and c(NA) satisfies Relation A14:

$$0.1 \le c(NA) \le 2.8 \qquad \text{(Relation A14)}.$$

31. The lithium-ion battery electrolyte of claim 30, wherein:

the NA comprises one or more of the following: adiponitrile (ADN), 1,3,6-hexanetricarbonitrile (HTCN), ethyleneglycol bis(propionitrile)ether (EGBE), and 3-{[1,3-bis(2-cyanoethoxy)propan-2-yl]oxy}propanenitrile (ETCN).

32. The lithium-ion battery electrolyte of claim 31, wherein:

the NA comprises the ADN; and a mole fraction of the ADN in the lithium-ion battery electrolyte is in a range of approximately 0.3 mol. % to approximately 1.8 mol. %.

33. The lithium-ion battery electrolyte of claim 31, wherein:

the NA comprises the HTCN; and a mole fraction of the HTCN in the lithium-ion battery electrolyte is in a range of approximately 0.1 mol. % to approximately 0.9 mol. %.

34. The lithium-ion battery electrolyte of claim 1, wherein:

the lithium-ion battery electrolyte additionally comprises one or more sulfur-comprising additives (SA);

a mole fraction of the SA in the lithium-ion battery electrolyte is approximately $c$(SA) mol. %; and c(SA) satisfies Relation A15:

$$0.1 \le c(SA) \le 2.8 \tag{Relation A15}.$$

35. The lithium-ion battery electrolyte of claim 34, wherein:

the SA comprises one or more of the following: sulfolane, 1,3,2-dioxathiolane 2,2-dioxide (DTD), methylene methanedisulfonate (MMDS), propane sultone (PS), and propene sultone (PES).

36. The lithium-ion battery electrolyte of claim 35, wherein:

the SA comprises the PS; and a mole fraction of the PS in the lithium-ion battery electrolyte is in a range of approximately 0.1 mol. % to approximately 1.0 mol. %.

37. The lithium-ion battery electrolyte of claim 35, wherein:

the SA comprises the PES; and a mole fraction of the PES in the lithium-ion battery electrolyte is in a range of approximately 0.1 mol. % to approximately 1.5 mol. %.

38. The lithium-ion battery electrolyte of claim 35, wherein:

the SA comprises the sulfolane; and a mole fraction of the sulfolane in the lithium-ion battery electrolyte is in a range of approximately 0.1 mol. % to approximately 1.0 mol. %.

39. The lithium-ion battery electrolyte of claim 35, wherein:

the SA comprises the DTD; and a mole fraction of the DTD in the lithium-ion battery electrolyte is in a range of approximately 0.1 mol. % to approximately 1.0 mol. %.

40. The lithium-ion battery electrolyte of claim 1, wherein:

the lithium-ion battery electrolyte comprises tris(trimethylsilyl)phosphite (TMSPi); and a mole fraction of the TMSPi in the lithium-ion battery electrolyte is in a range of approximately 0.1 mol. % to approximately 2.8 mol. %.

41. The lithium-ion battery electrolyte of claim 1, wherein:

a density of the lithium-ion battery electrolyte is 1.1 g/cm$^3$ or less at 20° C.

42. The lithium-ion battery electrolyte of claim 1, wherein:

a viscosity of the lithium-ion battery electrolyte is 2.6 cP or less at 25° C.

43. The lithium-ion battery electrolyte of claim 1, wherein:

an ionic conductivity of the lithium-ion battery electrolyte is 13 mS cm$^{-1}$ or greater at 25° C.

44. A lithium-ion battery, comprising:

an anode current collector;

a cathode current collector;

an anode disposed on or in the anode current collector;

a cathode disposed on or in the cathode current collector; and the lithium-ion battery electrolyte of claim 1 ionically coupling the anode and the cathode.

45. The lithium-ion battery of claim 44, wherein:

the anode comprises silicon-carbon composite particles comprising silicon and carbon; and a mass of the silicon is in a range of about 3 wt. % to about 80 wt. % of a total mass of the anode.

46. The lithium-ion battery of claim 45, wherein:

the anode additionally comprises graphitic carbon particles comprising carbon and being substantially free of silicon; and the silicon-carbon composite particles and the graphitic carbon particles are present in the anode as a mixture.

47. The lithium-ion battery of claim 45, wherein:

at least some of the silicon is present in the silicon-carbon composite particles as nanosized silicon.

\* \* \* \* \*